US007269006B2

(12) United States Patent
Miyamoto et al.

(10) Patent No.: US 7,269,006 B2
(45) Date of Patent: Sep. 11, 2007

(54) STORAGE DEVICE, AND STORAGE PART AND DUMMY UNIT FOR STORAGE DEVICE

(75) Inventors: Kenich Miyamoto, Odawara (JP); Yoji Okabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 343 days.

(21) Appl. No.: 11/046,434

(22) Filed: Jan. 27, 2005

(65) Prior Publication Data
US 2006/0120192 A1 Jun. 8, 2006

(30) Foreign Application Priority Data
Dec. 6, 2004 (JP) ............................. 2004-352734

(51) Int. Cl.
H05K 7/20 (2006.01)
H05K 5/00 (2006.01)
A47F 3/04 (2006.01)

(52) U.S. Cl. ...................... 361/687; 361/695; 454/184; 312/236

(58) Field of Classification Search ........ 361/687–688, 361/690, 694–695; 454/184; 312/236
See application file for complete search history.

(56) References Cited
U.S. PATENT DOCUMENTS

| 4,399,485 | A | * | 8/1983 | Wright et al. ............... 361/693 |
| 5,343,357 | A | * | 8/1994 | Driscoll et al. ............. 361/685 |
| 5,410,448 | A | * | 4/1995 | Barker et al. ............... 361/695 |
| 5,477,416 | A | * | 12/1995 | Schkrohowsky et al. ... 361/695 |
| 6,234,591 | B1 | * | 5/2001 | Driscoll et al. ............ 312/9.56 |
| 6,459,571 | B1 | * | 10/2002 | Carteau ...................... 361/684 |
| 6,480,379 | B1 | * | 11/2002 | Dickey et al. .............. 361/687 |
| 6,927,976 | B1 | * | 8/2005 | Malone et al. .............. 361/690 |
| 2003/0030978 | A1 | * | 2/2003 | Garnett et al. ............. 361/687 |
| 2004/0145869 | A1 | * | 7/2004 | Tanaka et al. .............. 361/695 |
| 2004/0252453 | A1 | * | 12/2004 | Brooks et al. .............. 361/687 |
| 2005/0195699 | A1 | * | 9/2005 | Nishiyama et al. ...... 369/30.27 |
| 2006/0227505 | A1 | * | 10/2006 | Miyamoto et al. .......... 361/695 |
| 2007/0025076 | A1 | * | 2/2007 | Matsushima et al. ....... 361/687 |

FOREIGN PATENT DOCUMENTS
JP 11-145658 5/1999

* cited by examiner

Primary Examiner—Jayprakash Gandhi
Assistant Examiner—Zachary M Pape
(74) Attorney, Agent, or Firm—Townsend and Townsend and Crew LLP

(57) ABSTRACT

The present invention provides a dummy canister which can cool canisters with good efficiency. Canisters 2A and dummy canisters 2B are attached in a mixed configuration to the storage part 1C of a storage device 1. Each dummy canister 2B can expand and contract in two stages in the attachment direction. Among these dummy canisters 2B, the dummy canister 2B (1) that is adjacent to a canister 2A is set in a first shape, and has a shorter length. The other dummy canisters 2B (2) through 2B (5) are respectively set in a second shape, so that the length dimension of these dummy canisters is lengthened.

19 Claims, 39 Drawing Sheets

FIG. 1
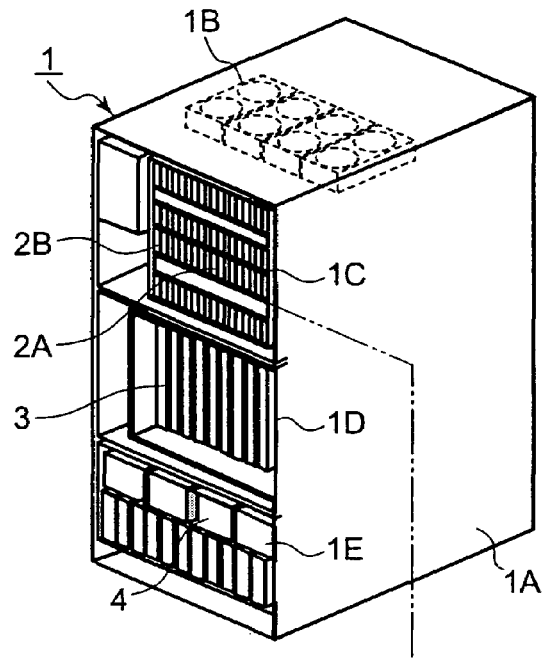
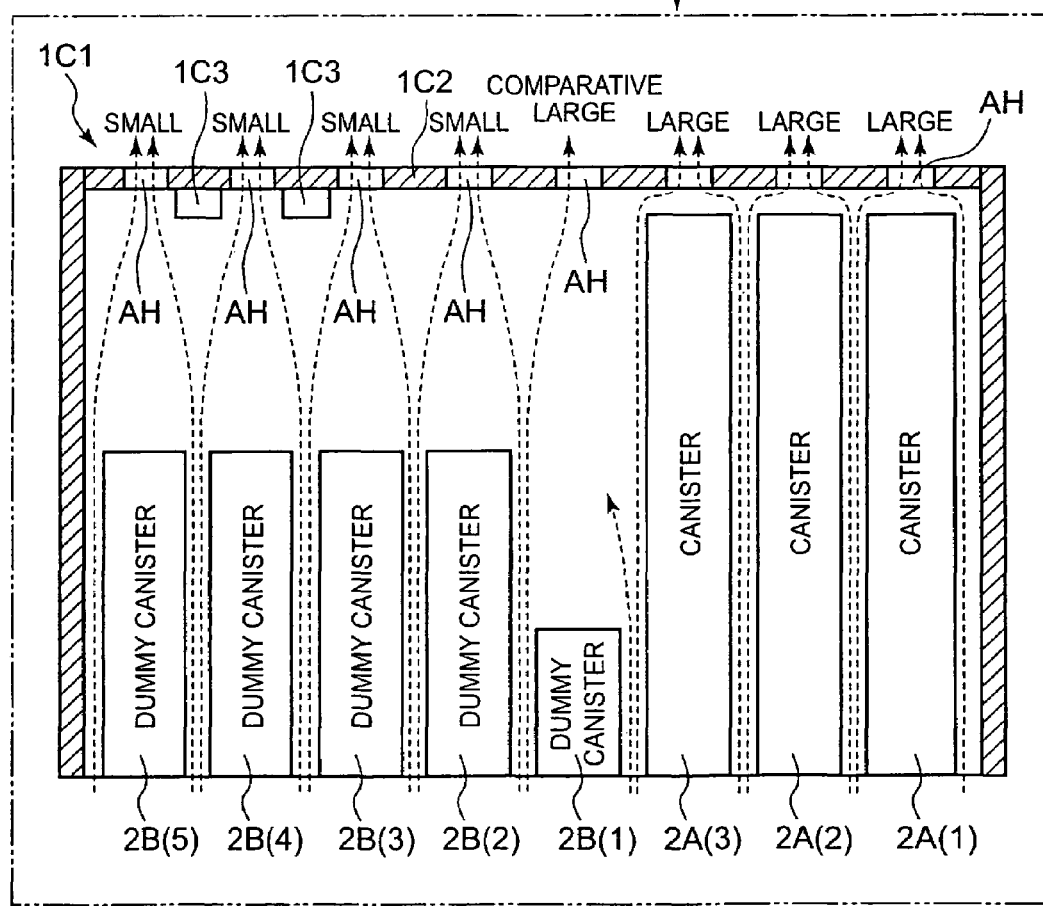

FIG. 18

DRAFT AMOUNT TABLE (T1)

| No. | DUMMY CANISTER MOUNTING RATE | AMOUNT OF DRAFT REQUIRED FOR COOLING |
|---|---|---|
| 0 | 0.0 | 100.0 |
| 1 | 6.3 | 97.8 |
| 2 | 12.5 | 94.3 |
| 3 | 18.8 | 90.8 |
| 4 | 25.0 | 87.3 |
| 5 | 31.3 | 83.8 |
| 6 | 37.5 | 80.3 |
| 7 | 43.8 | 76.8 |
| 8 | 50.0 | 73.3 |
| 9 | 56.3 | 69.8 |
| 10 | 62.5 | 66.8 |
| 11 | 68.8 | 62.8 |
| 12 | 75.0 | 59.3 |
| 13 | 81.3 | 55.8 |
| 14 | 87.5 | 52.3 |
| 15 | 93.8 | 48.8 |
| 16 | 100.0 | 45.3 |

| L | γ |
|---|---|
| 205 | 0.83 |
| 175 | 0.42 |
| 125 | 0.23 |
| 75 | 0.15 |
| 25 | 0.10 |

| Wr | δ (L=175) | δ (L=140) |
|------|-----------|-----------|
| 1.00 | 0.42 | 0.22 |
| 0.97 | 0.54 | 0.46 |
| 0.95 | 0.75 | 0.65 |
| 0.91 | 1.13 | 1.04 |
| 0.87 | 1.42 | 1.25 |
| 0.80 | 2.04 | 1.88 |
| 0.73 | 2.33 | 2.29 |

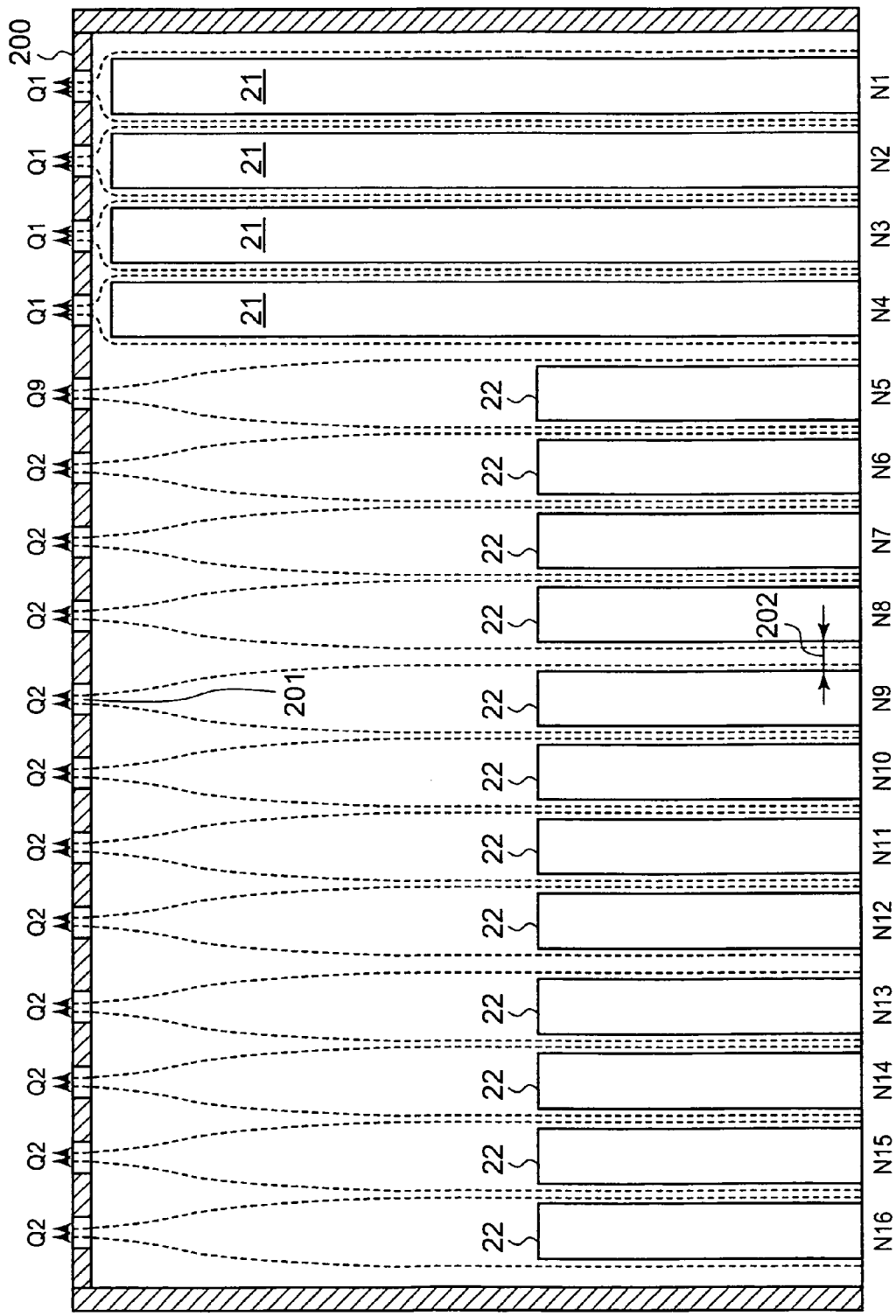

FIG. 29

| | DRAFT AMOUNT TABLE — T1A | | |
|---|---|---|---|
| No. | DUMMY CANISTER MOUNTING RATE | AMOUNT OF DRAFT REQUIRED FOR COOLING (L = 175) | AMOUNT OF DRAFT REQUIRED FOR COOLING (L = 140) |
| 0 | 0.0 | 100.0 | 100.0 |
| 1 | 6.3 | 100.6 | 100.6 |
| 2 | 12.5 | 97.1 | 95.8 |
| 3 | 18.8 | 93.6 | 90.9 |
| 4 | 25.0 | 90.1 | 86.0 |
| 5 | 31.3 | 86.6 | 81.1 |
| 6 | 37.5 | 83.1 | 76.3 |
| 7 | 43.8 | 79.6 | 71.4 |
| 8 | 50.0 | 76.1 | 66.5 |
| 9 | 56.3 | 72.6 | 61.6 |
| 10 | 62.5 | 69.1 | 56.8 |
| 11 | 68.8 | 65.6 | 51.9 |
| 12 | 75.0 | 62.1 | 47.0 |
| 13 | 81.3 | 58.6 | 42.1 |
| 14 | 87.5 | 55.1 | 37.3 |
| 15 | 93.8 | 51.6 | 32.4 |
| 16 | 100.0 | 48.1 | 27.5 |

STORAGE DEVICE, AND STORAGE PART AND DUMMY UNIT FOR STORAGE DEVICE

CROSS-REFERENCE TO RELATED APPLICATIONS

This application relates to and claims priority from Japanese Patent Application No. 2004-352734 filed on Dec. 6, 2004, the entire disclosure of which is incorporated herein by reference.

BACKGROUND OF THE INVENTION

1. Field of the Invention

The present invention relates to a storage device such as (for example) a disk array device or the like, a storage part for such a storage device, and a dummy unit for such a storage device.

2. Description of the Related Art

In storage devices, for example, large-capacity storage volumes are formed by disposing storage devices such as hard disk drives or the like in the form of an array, and providing these storage volumes to higher devices such as main frames, servers or the like.

Storage devices are modulized together with circuit boards, signal connectors and the like, and a plurality of storage devices are attached inside storage boxes. Inside such storage boxes, the respective storage devices are respectively connected to back boards, and the respective storage devices are respectively connected to control modules via these back boxes.

The respective storage devices are respective heat radiating bodies. Accordingly, the flow of a cooling air draft is created by air intake fans installed inside the storage devices, and the respective storage devices are respectively cooled by supplying this cooling air draft to the respective storage devices. Connectors that are respectively connected to the respective storage devices, and a plurality of exhaust ports that are used to discharge the cooling air drafts flowing into the storage boxes, are respectively installed on the back boards.

The number of storage devices that are mounted is not a fixed number; since storage devices are mounted as required, empty slots may be generated inside the storage boxes. If such empty slots are left "as is", dust adheres to the empty connectors mounted on the back boards; furthermore, the appearance is also poor. Accordingly, dummy modules are mounted in empty slots.

In conventional techniques, air intake ports and connector caps are respectively provided in such dummy modules. External air is taken into the storage box from the air intake ports, and empty connectors and exhaust ports in the back board are covered with these connector caps (Japanese Patent Application Laid-Open No. 11-145658).

In the technique described in Japanese Patent Application Laid-Open No. 11-145658, the amount of the cooling air draft that flows around the dummy modules is reduced by covering some or all of the exhaust ports in the back board with connector caps. As a result, in the prior art, an increase in the cooling air draft that flows around the storage devices is achieved.

However, in this prior art, a construction that uniformly lowers the amount of the cooling air draft that flows around the dummy modules is used; no consideration is given to the cooling of the boundary portions where dummy modules and storage devices are adjacent. When the amount of the cooling air draft that flows around the dummy modules is lowered, the amount of the cooling draft that flows around the storage devices that are adjacent to these dummy modules also drops, so that a sufficient cooling air draft cannot be supplied to storage devices that are positioned in these boundary portions. Accordingly, in order to supply a sufficient cooling air draft to the storage devices positioned in these boundary portions as well, it is necessary to improve the performance of the cooling fans or the like, so that the energy consumption is increased.

On the other hand, in cases where the amount of the cooling air draft that flows around the dummy modules is set at an amount that is comparable to the amount of the cooling air draft that flows around the storage devices, the overall amount of the cooling air draft is increased by an amount equal to the cooling air draft that is supplied to dummy modules that do not require cooling, so that the cooling efficiency drops.

SUMMARY OF THE INVENTION

The present invention was devised in light of the abovementioned problems; it is one object of the present invention to provide a storage device that can be efficiently cooled, a storage part for use in this storage device and a dummy unit for use in this storage device. It is another object of the present invention to provide a storage device, a storage part for use in this storage device and a dummy unit for use in this storage device which ensure the cooling performance in boundary portions where the storage units and dummy units are adjacent, so that efficient cooling is possible. Other objects of the present invention will become clear from the following description of embodiments.

In order to solve the abovementioned problems, the storage device of the present invention comprises a storage part that is used to store data, a control part that respectively controls the exchange of data between the abovementioned storage part and a higher device, and a cooling part that supplies a cooling air draft to at least the abovementioned storage part; furthermore, the abovementioned storage part comprises a housing, one or a plurality of storage units that are respectively detachably attached to the abovementioned housing, and that respectively provide storage regions, and one or a plurality of dummy units that are detachably attached to empty locations in the abovementioned housing, the abovementioned dummy units are constructed so that these dummy units are deformable in at least two stages, i.e., a first shape and a second shape, and in cases where the abovementioned dummy units are attached adjacent to the abovementioned storage units, the abovementioned dummy units are set in the abovementioned first shape, while in cases where the abovementioned dummy units are attached without being adjacent to the abovementioned storage units, the abovementioned dummy units are set in the abovementioned second shape.

For example, the storage units are units in which a storage device such as a hard disk, semiconductor memory or the like, and a circuit board, connector or the like are integrated, and are also called canisters. The dummy units are modeled after storage units, and may be called dummy canisters. The dummy units are mounted in empty slots instead of storage units. The dummy units need not have storage devices, circuit boards or the like. Storage units whose contents have been removed may be used as dummy units, or dummy units may be constructed from a synthetic resin, metal, ceramic or the like.

The dummy units are used to embed empty slots in which storage units are not mounted. Except in cases where storage units are respectively attached to all of the slots in the storage part, one or more dummy slots are disposed in the storage part. Accordingly, in some positions inside the storage part, dummy slots and storage units may be adjacent.

The dummy slots may have a plurality of shapes (configurations). Specifically, the dummy units are constructed so as to be deformable, and can be set in at least two types of shapes, i.e., a first shape and a second shape. Furthermore, in cases where dummy units are attached inside the storage part adjacent to storage units, these dummy units are set in the first shape. In cases where dummy units are attached inside the storage part so that these units are not adjacent to storage units, these dummy units are set in the second shape. Here, for example, a statement that "dummy units and storage units are adjacent" means that the respective units are adjacent in the direction of disposition.

The first shape can be set so that the volume of this shape is smaller than that of the second shape. Accordingly, since dummy units that are adjacent to storage units are set in the first shape, the volume of these dummy units is reduced in relative terms. As a result, the size of the spaces between the dummy units and storage units varies, so that the inflow resistance of the cooling air draft varies. Furthermore, in cases where dummy units are stored, the size of the dummy units can be reduced so that the space required for the storage of these dummy units can be reduced by setting the shape of the dummy units as the first shape.

The first shape can be set as a shape which is such that the amount of the cooling air draft that flows around the dummy units is increased in relative terms, and the second shape can be set so that the amount of the cooling air draft that flows around the dummy units drops in relative terms.

By setting the dummy units that are adjacent to storage units in the first shape, it is possible to cause a relative increase in the amount of the cooling air draft that flows between the dummy units and the storage units. As a result, a larger cooling air draft can be supplied to the storage units that are positioned in the boundary portions with dummy units, and to ensure a draft amount that is comparable to that of the other storage units. On the other hand, other dummy units that are not adjacent to storage units, i.e., dummy units whose neighboring units on both sides are also dummy units, are set in the second shape. As a result, the amount of the cooling air draft that flows around these dummy units can be reduced in relative terms, so that the amount of the cooling air draft that is supplied to the storage units can be increased.

The housing can be constructed so as to comprise a tubular chassis and a board which is disposed so that this board covers one open surface of this chassis, and which has exhaust ports that are respectively formed corresponding to the respective storage units. Furthermore, the first shape and second shape can be respectively set so that the distance between the dummy units and the board is longer than the distance between the storage units and the board.

The dummy units can be constructed so that these units can expand and contract in the direction of attachment to the housing, and the first shape can be set so that the length dimension of this first shape in the attachment direction is shorter than that of the second shape. Specifically, the length dimension in the attachment direction of dummy units that are adjacent to storage units can be set so that this length dimension is shorter than the length dimension of other dummy units that are not adjacent to storage units.

The dummy units can be constructed so that these units can expand and contract in the disposition direction inside the housing, and the first shape can be set so that the width dimension of this first shape in the disposition direction is shorter than that of the second shape. Specifically, the width dimension in the disposition direction of dummy units that are adjacent to storage units can be set so that this width dimension is shorter than that of other dummy units that are not adjacent to storage units.

At least two surfaces among the respective surfaces of the dummy units can be constructed so that these surfaces are covered by the housing. Specifically, for example, in cases where the upper sides and lower sides of the dummy units are respectively covered by the upper surface and lower surface of the housing, the upper surfaces and lower surfaces of the dummy units can be formed as open surfaces, and portions of the housing can be utilized as covers. As a result, the manufacturing cost of the dummy units can be reduced.

The system can also be constructed so that this system further comprises a shape display part which is used to check the shape in which the dummy units are set, i.e., either the first shape or second shape, from the outside according to the state in which these dummy units are attached to the housing. For example, the shape display part notifies the user of the shape (first shape or second shape) in which the dummy units are set by a color variation, partial variation of the shape or the like. As a result, the user can check this shape without removing the dummy units from the attachment slots, so that the convenience of the system is improved.

The system may further comprise a monitoring part which monitors whether or not storage units are added to or removed from the storage part, and a display part which displays a specified message according to the monitoring results of this monitoring part. The display part can be constructed so that in cases where the addition of storage units is detected by the monitoring part, the display part displays a specified addition message relating to dummy units that are adjacent to these added storage units, and so that in cases where the removal of storage units is detected by the monitoring part, the display part displays a specified removal message relating to the dummy units that are attached instead of the storage units that are removed.

"Addition" refers to the attachment of new storage units to attachment slots of the housing. Conversely, "removal" refers to the removal of storage units that have already been attached from attachment slots of the housing. By causing either an addition message or a removal message to be displayed on the basis of the monitoring results of the monitoring part, it is possible to reduce the extent to which shape settings of the dummy units are forgotten by users such as the system manager or the like, so that the convenience of the system is improved.

The system may further comprise a cooling control part that controls the operating state of the cooling part in accordance with the number of dummy units that are attached to the storage part. For example, this cooling control part can perform a control action so that the output of the cooling part is lowered as the number of dummy units mounted increases. The reason for this is that the required draft amount drops as the number of dummy units mounted increases.

The housing may be constructed so that this housing comprises a tubular chassis, and a board which is disposed so that this board covers one open surface of this chassis, and which has exhaust ports and signal connectors formed in positions respectively corresponding to the respective attachment slots. Furthermore, the dummy units may have duct parts that are used to allow the cooling air draft to flow through, and may be constructed so that the outlet ports of these duct parts are connected to the exhaust ports, and so that the inlet ports of these duct parts open in the open surface of the housing. Furthermore, the inlet ports may be covered when the shape is set as the first shape, and the inlet ports may be opened when the shape is set as the second shape.

When the dummy units are set in the first shape, the inlet ports of the duct parts are closed; accordingly, a cooling air draft cannot flow into the duct parts, and instead flows around the storage units. As a result, the amount of the cooling air draft that flows around the storage units adjacent to the dummy units is increased. On the other hand, in cases where the dummy units are set in the second shape, the cooling air draft from the outside flows into the duct parts from the inlet ports, and flows out of the outlet ports via the exhaust ports. In such cases, since the cooling air draft flows into the exhaust ports from the outlet ports, the cooling air draft makes almost no contact with the signal connectors mounted in the board. As a result, the amount of dust that adheres to the signal connectors as a result of contact with the cooling air draft can be reduced.

According to another aspect of the present invention, storage device storage parts or dummy units can be grasped. Furthermore, for example, as will be described below, the method can also be grasped as a storage device storage part control method.

The storage device storage part control method of the present invention is a method for controlling the storage parts of a storage device comprising storage parts that are used to store data, a control part that respectively controls the exchange of data between said storage parts and higher devices, and a cooling part that provides a cooling air draft to at least the abovementioned storage parts, wherein said storage parts each comprise a housing, a plurality of attachment slots that are disposed in this housing, one or a plurality of storage units that are respectively detachably attached to these respective attachment slots, and that respectively provide storage regions, and one or a plurality of dummy units that are respectively detachably attached to empty attachment slots among the abovementioned respective attachment slots, and the abovementioned dummy units are constructed so that these dummy units can be deformed in at least two stages, i.e., a first shape and a second shape, this method comprising a step in which it is ascertained whether or not the abovementioned dummy units are attached to the abovementioned attachment slots adjacent to the abovementioned storage units, a step in which instructions are given to set the abovementioned dummy units in the abovementioned first shape in cases where it is ascertained that these dummy units are attached adjacent to the abovementioned storage units, a step in which dummy units set in the abovementioned first shape in accordance with these instructions are attached, and a step in which the output of the abovementioned cooling part is lowered in cases where the number of the abovementioned dummy units attached to the abovementioned storage part is equal to or greater than a specified value.

BRIEF DESCRIPTION OF THE DRAWINGS

FIG. 1 is an explanatory diagram showing the overall concept of an embodiment of the present invention;

FIG. 18 is an explanatory diagram which shows the draft amount table;

FIG. 28 is an explanatory diagram which shows the draft amount distribution inside the chassis in model form;

FIG. 29 is an explanatory diagram which shows the draft amount table;

DESCRIPTION OF THE PREFERRED EMBODIMENTS

Figure 2:
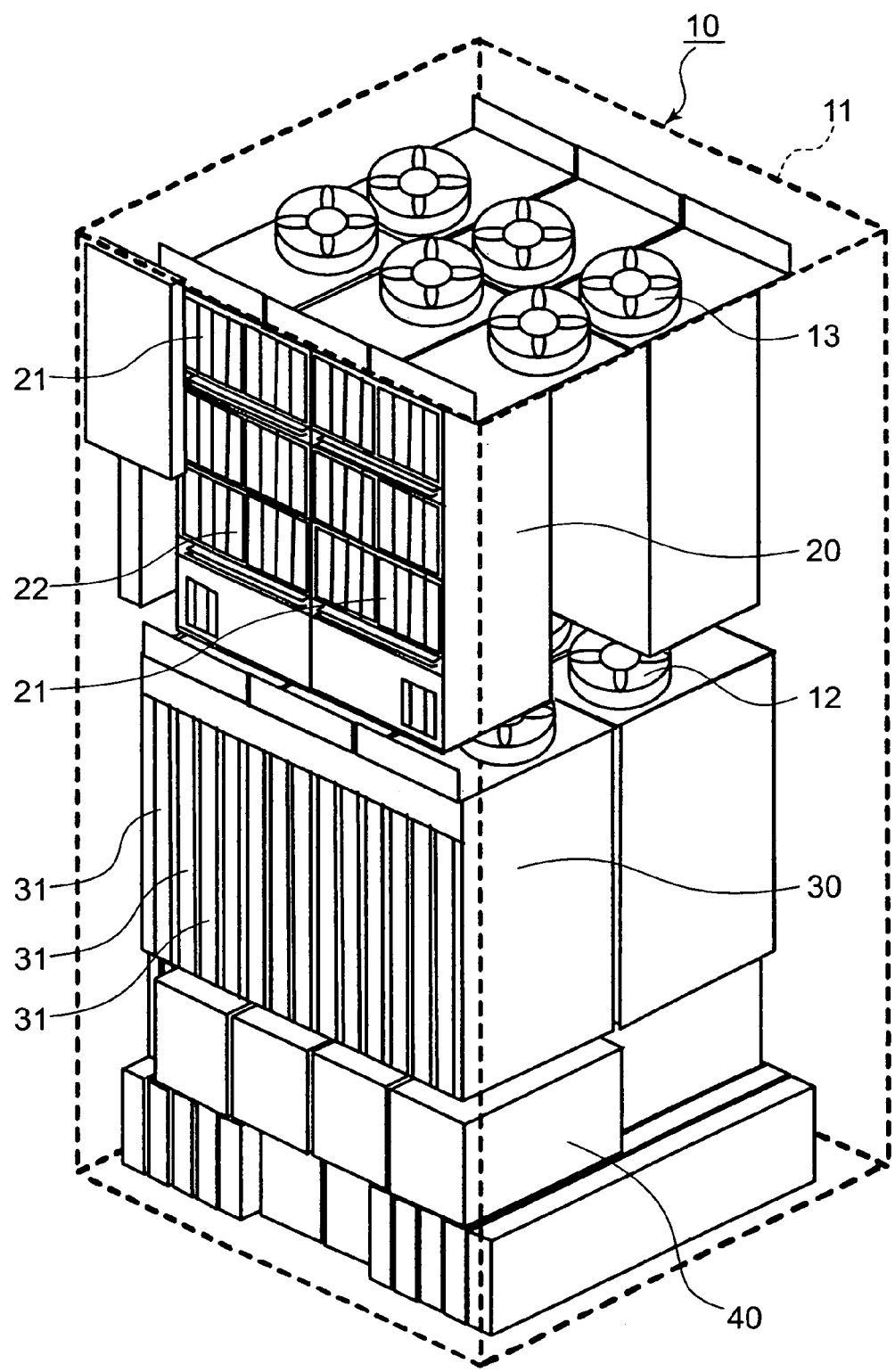
FIG. 2 is a perspective view of the storage device.

Embodiments of the present invention will be described below with reference to the attached figures. As will be described below, the storage device of the present embodiment uses deformable dummy canisters. FIG. 1 is an explanatory diagram showing the overall concept of the present embodiment. A fan 1B, storage part 1C, control part 1D and power supply part 1E are disposed inside the housing 1A of the storage device 1. Furthermore, although this is omitted from FIG. 1, a separate fan can be installed between the control part 1D and the power supply part 1C.

For example, the storage part 1C can accommodate a plurality of canisters 2A and a plurality of dummy canisters 2B. In each canister 2A, for example, a storage device such as a hard disk, semiconductor memory, optical disk or the like, a circuit board that is used to control this storage device, a connector that is used for the electrical connection of this circuit board to a back board inside the storage part 1C and the like are integrated; accordingly, this canister is one example of a "storage unit". The canisters 2A are formed with a large external shape in order to accommodate circuit boards and the like; these canisters have a structure that is used to take in a larger cooling air draft. For example, a plurality of air intake holes are formed in the front surface side of each canister 2A, and a flow passage that is used to allow the cooling air draft to flow through is ensured in the interior.

The dummy canisters 2B are mounted in empty slots of the storage part 1C instead of canisters 2A, and are one example of "dummy units". Since the dummy canisters 2B do not require any substantial cooling, the front surface sides of the dummy canisters 2B are completely closed off, and no flow passage for the cooling air draft is formed inside the dummy canisters 2B. Since the dummy canisters 2B need not have the function of providing a storage region, these dummy canisters 2B may be constructed substantially from a case alone. However, there is a possibility that electrical constituent parts or mechanical constituent parts such as (for example) flow rate sensors, temperature sensors, limit switches, signal processing circuits or the like may be installed in the dummy canisters 2B in order to realize a draft amount adjustment function or the like by means of the dummy canisters 2B. Even in the case of such dummy canisters equipped with such electrical or mechanical constituent parts, canisters that are deformable in multiple stages or the like are included in the scope of the present invention, as will be descried later.

The control part 1D comprises a plurality of logical boards 3. Examples of such logical boards 3 include higher interface control boards that control the exchange of data with higher devices such as servers or the like, lower interface control boards that control the exchange of data with disk drives inside the canisters 2A, memory boards and the like. The power supply part 1E supplies a specified power to the respective power consuming parts of the cooling fan 1B, storage part 1C and control part 1D, and comprises an AC/DC power supply box 4 and the like.

The lower side in FIG. 1 is a partial sectional view which shows the cooling structure of the storage part 1C in model form. A back board 1C2 is disposed on the back surface side of the chassis 1C1 of the storage part 1C. This back board 1C2 is a printed wiring board that is used for the electrical connection of the respective canisters 2A. One or more exhaust ports AH and connectors 1C3 (only some of the are shown in the figures) are formed on the back board 1C2 in positions respectively corresponding to the attachment slots. The connectors 1C3 are used for electrical connections with the canisters 2A. In the case of slots to which dummy canisters 2B are attached instead of canisters 2A, the connectors 1C3 corresponding to these slots are empty connectors.

A pressure difference is created between the interior of the housing 1A and the exterior of the housing 1A by the cooling fan 1B; as a result of this pressure difference, a cooling air draft flows into the storage part 1C. The cooling air draft that flows into the storage part 1C captures heat from the respective canisters 2A, and flows into the housing 1A via the exhaust ports AH. The cooling air draft that flows into the housing 1A is discharged to the outside from the upper side of the housing 1A by the cooling fan 1B.

Canisters 2A and dummy canisters 2B are attached in a mixed distribution to the chassis 1C1 of the storage part 1C. It is also possible to attach only canisters 2A to the chassis 1C1; the number of canisters 2A that are mounted fluctuates variously according to the conditions of use by the user and the like. Accordingly, one or more dummy canisters 2B are mounted inside the chassis 1C1. Furthermore, for example, there may be cases in which the storage part 1C has a plurality of stages such as two stages in a vertical configuration, four stages in a vertical configuration or the like, so that canisters 2A can be respectively mounted in the respective stages. In such cases, there may be instances in which only canisters 2A are mounted in a certain stage, and only dummy canisters 2B are mounted in another stage.

On the lower side of FIG. 1, three canisters 2A (1) through 2A (3) are attached in that order from the right side, and five dummy canisters 2B (1) through 2B (5) are attached adjacent to these canisters 2A. For example, a construction in which the canisters 2A and dummy canisters 2B are erroneously attached with respect to each other is possible; however, in the present embodiment, the canisters 2A are attached together, so that a group of dummy canisters 2B are attached adjacent to a group of canisters 2A.

The canister 2A (3) positioned at one end of the canister group and the dummy canister 2B (1) positioned at the other end of the dummy canister group are adjacent to each other inside the chassis 1C1. In the boundary area where this canister 2A (3) and dummy canister 2B (1) are adjacent, the length of the dummy canister 2B (1) is set at a short value. Here, the term "length" refers to the length in the direction in which the canisters 2A or dummy canisters 2B are attached inside the chassis 1C1 (i.e., the vertical direction in FIG. 1); this direction substantially coincides with the direction of flow of the cooling air draft.

The length dimension of the canisters 2A (1) through 2A (3) is set at a longer value than the length dimension of the dummy canisters 2B (2) through 2B (5); as was described above, the respective canisters 2A (1) through 2A (3) have a structure that is used to take in a larger cooling air draft. A cooling air draft respectively flows into the interiors of the respective canisters 2A (1) through 2A (3); furthermore, a cooling air draft also flows between the respective canisters 2A. Accordingly, the amount of the cooling air draft that is supplied to the canisters 2A is greater than the amount of the draft that flows between the dummy canisters 2B.

The amount of the draft that flows around the dummy canisters 2B (2) through 2B (5) is smaller (in relative terms) than the amount of the draft that is supplied to the canisters 2A (1) and 2A (2). Accordingly, in a case where the length dimension of the dummy canister 2B (1) positioned in the boundary area is equal to the length dimensions of the other dummy canisters 2B (2) through 2B (5), the amount of the cooling air draft that flows between the canister 2A (3) and the dummy canister 2B (1) also drops. Consequently, the amount of the draft that flows over the left side surface of the canister 2A (3) positioned in the boundary area (the surface that faces the dummy canister 2B (1)) drops, so that the cooling performance with respect to this canister 2A (3) drops.

Accordingly, in the present embodiment, the dummy canisters 2B (1) through 2B (3) are formed so that these dummy canisters can expand and contract in the attachment direction. Furthermore, in the present embodiment, the length dimension of the dummy canister 2B (1) attached in the boundary area adjacent to the canister 2A (3) is set shorter than the length dimensions of the other dummy canisters 2B (2) through 2B (5).

By setting the length dimension of the dummy canister 2B (1) positioned in the boundary area shorter than the length dimensions of the other dummy canisters 2B (2) through 2B (5), and attaching these dummy canisters to the chassis 1C1, it is possible to reduce the inflow resistance, and thus increase the amount of the cooling air draft that flows through the gap (cooling air draft passage) in this boundary area.

As a result, the canister 2A (3) positioned in the boundary area can be cooled to the same extent as the other canisters 2A (1) and 2A (2), so that the occurrence of a large variation in the cooling performance within the canister group can be prevented. By making the cooling performance within the canister group substantially uniform, it is possible to cool the canisters 2A (1) through 2A (3) efficiently without increasing the output of the cooling fan 1B or the like.

In the present embodiment, the amount of the draft flowing through the dummy canisters 2B (2) through 2B (5) can be reduced, so that the amount of the draft that flows through the canisters 2A (1) through 2A (3) is increase in relative terms, thus making it possible to improve the cooling efficiency by concentrating a larger cooling air draft in places requiring cooling.

In the present embodiment, since the amount of the draft that flows through the dummy canisters 2B (2) through 2B (5) outside the boundary area can be lowered, the overall draft amount that is required for the cooling of the storage part 1C can be reduced. Accordingly, the storage part 1C can be cooled with the output of the cooling fan 1B lowered, or with a small fan being used. Consequently, the energy and cost required for cooling can be reduced, and the noise generated by the fan can be lowered.

In the present embodiment, since the amount of the draft flowing through the dummy canisters 2B (2) through 2B (5) can be lowered, the amount of the cooling air draft passing through the vicinity of connectors 1C3 that are not used can be reduced. Accordingly, the adhesion of dust carried by the cooling air draft to the empty connectors 1C3 can be suppressed, so that the possibility of faulty electrical connections and the like can be reduced, thus making it possible to improve the dust-proof performance.

In the present embodiment, the dummy canisters 2B can be stored with these dummy canisters folded into a small size during storage (since the respective dummy canisters 2B are constructed so that these canisters are respectively deformable). Accordingly, the storage space of the dummy canisters 2B can be reduced in size, so that the maintenance characteristics can be improved. Furthermore, since the respective dummy canisters 2B are respectively constructed with the same deformable structure, the manufacturing cost of the dummy canisters 2B can be reduced.

Moreover, as will be described in detail below, various modifications of the present embodiment are possible. The dummy canisters 2B are not limited to deformation in the vertical direction shown in FIG. 1; these dummy canisters may also be deformed in the left-right direction. Furthermore, appropriate precautions may be given to the user at the time of the mounting of the dummy canisters 2B along with alterations in the construction of the storage part 1C. Moreover, the output of the cooling fan 1B can be controlled in accordance with the number of dummy canisters 2B that are mounted.

1. First Embodiment

FIG. 2 is a schematic diagram showing the external appearance of the storage device 10. The storage device 10 may also be called a disk array device. For example, an intermediate-stage fan 12 and an upper-stage fan 13, a storage part 20, a control part 30 and a power supply part 40 can be disposed inside the housing 11 of the storage device 10.

The intermediate-stage fan 12 is positioned between the control part 30 and the storage part 20, and can be disposed on the upper side of the control part 30. The upper-stage fan 13 can be disposed on the upper side of the storage part 20. The intermediate-stage fan 12 that is positioned in substantially the central portion of the housing 11 takes in the air inside the control part 30, and discharges this air into the housing 11. The air that has been discharged into the housing 11 is discharged to the outside from the upper part of the housing 11 by the fan 13. Similarly, the upper-stage fan 13 can be disposed on the upper side of the storage part 20; this fan 13 takes in the air inside the storage part 20, and discharges this air to the outside from the upper part of the housing 11.

A plurality of canisters 21 and dummy canisters 22 can be disposed in the storage part 20. A plurality of control modules 31 can be mounted in the control part 30. The respective control modules 31 respectively correspond to the CHAs, DKAs, cache memory and the like described later.

Figure 3:
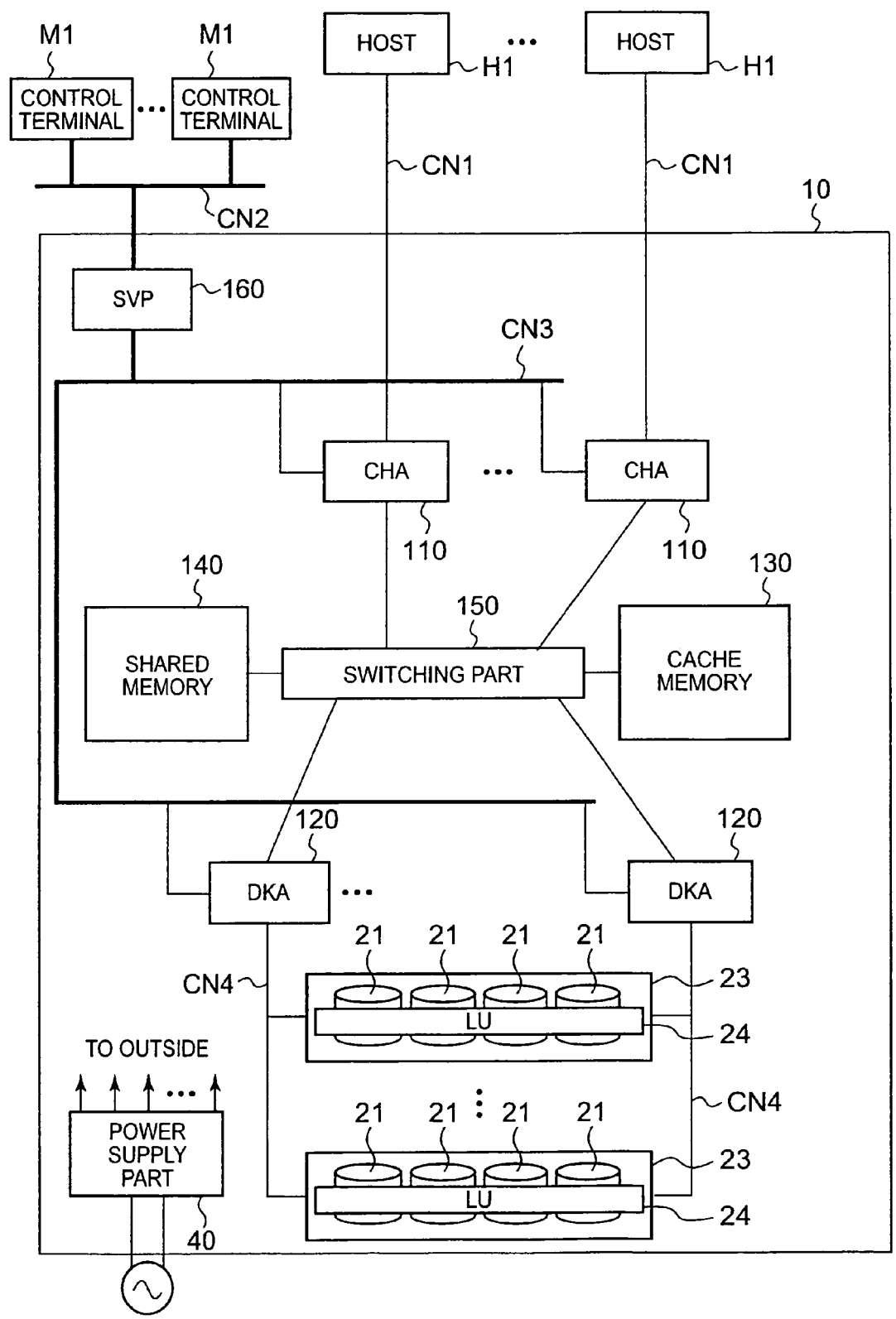
FIG. 3 is a block diagram focusing on the hardware construction of the storage device.

FIG. 3 is a block diagram which focuses on the hardware construction of the storage device 10. The storage device 10 can be connected to a plurality of host computers (hereafter abbreviated to "hosts") H1 via a communications network CN1 so that two-way communications are possible.

Here, for example, an LAN (local area network), SAN (storage area network), the internet, a dedicated circuit or the like can be used as the communications network CN1. In case where an LAN is used, for example, the transfer of data between the host H1 and the storage device 10 is performed according to a TCP/IP (transmission control protocol/internet protocol). In cases where an SAN is used, the host H1 and storage device 10 perform data transfer according to an FCP (fiber channel protocol).

The host H1 is one example of a higher device. Besides servers, for example, main frames, personal computers, workstations or the like can be used as the host H1. In cases where a main frame is used, for example, data transfer is performed according to a communications protocol such as FICON (Fiber Connection: registered trademark), ESCON (Enterprise System Connection: registered trademark), ACONARC (Advanced Connection Architecture: registered trademark), FIBARC (Fiber Connection Architecture: registered trademark) or the like.

The respective hosts H1 are connected to a plurality of client terminals positioned outside the figure via a separate communications network (not shown in the figures). For example, the respective hosts H1 provide a service to the respective client terminals by reading and writing data from and into the storage device 10 in response to requests from the respective client terminals.

For example, one or a plurality of control terminals M1 can be connected to the storage device 10 via a communications network CN2 such as an LAN or the like. The control terminals M1 can acquire various types of status information for the storage device 10, and can display this information on the terminal screen, and can be used to set the construction of the storage device 10 or the like. As will be described later, the control terminals M1 can be caused to display specified messages at the time of canister addition and removal.

As will be respectively described later, the storage device 10 comprises a plurality of channel adapters (hereafter abbreviated to "CHAs") 110, a plurality of disk adapters (hereafter abbreviated to "DKAs") 120, a cache memory 130, a shared memory 140, a switching part 150, numerous canisters 21, an SVP 160 and the like.

The CHAs 110 can be respectively prepared in accordance with the types of the connection destination hosts (types of OS, communications protocols and the like). For example, one CHA 110 can control the exchange of data in block units utilizing an SAN, while another CHA 110 can control the exchange of data in file units with an NAS (network attached storage) server using an IP network.

The respective CHAs 110 receive data and commands requesting the reading or writing of data from the respectively connected hosts H1, and operate in accordance with the commands received from the hosts H1. Describing the operation of the DKAs 120 as well in advance, for example, when a CHA 110 receives a read command from a host H1, the CHA 110 stores this read command in the shared memory 140. Each DKA 120 occasionally refers to the shared memory 140, and when an unprocessed read command is discovered, the DKA 120 reads out the data from the canister 21, and stores this data in the cache memory 130. The CHA 110 reads out the data that has been transferred to the cache memory 130, and transmits this data to the host H1.

Furthermore, for example, when the CHA 110 receives a write command from the host H1, the CHA 110 stores this write command in the shared memory 140, and stores the received data in the cache memory 130. After the CHA 110 stores the data in the cache memory 130, the CHA 110 notifies the host H1 of the completion of writing. Then, the DKA 120 reads out the data stored in the cache memory 130 in accordance with the write command stored in the shared memory 140, and stores this data in a specified canister 21.

The respective DKAs 120 are adapters that control data communications with the respective canisters 21 (or more accurately, the disks contained in the canisters). For example, the respective DKAs 120 and the respective canisters 21 are connected via a communications network CN4 such as an SAN or the like, and perform data transfer in block units according to an FCP.

The DKAs 120 occasionally monitor the states of the canisters 21, and the results of this monitoring are transmitted to the SVP 160 via the internal communications network CN3. Furthermore, the DKAs 120 need not be directly connected to the SVP 160. For example, the exchange of information between the DKAs 120 and the SVP 160 can also be performed via the shared memory 140 or cache memory 130.

For example, the respective CHAs 110 and respective DKAs 120 respectively comprise a printed board on which a processor, memory and the like are mounted, and a control program that is stored in the memory. Specified functions can be realized by a cooperative operation between such hardware and software. The control functions of these CHAs 110 and DKAs 120 are one example of the "control part". In FIG. 3, the CHAs 110 and DKAs 120 are indicated as respectively separate control packages. However, the present invention is not limited to this; the CHA functions and DKA functions can be disposed in one or a plurality of controllers.

For example, the cache memory 130 stores data and the like. For instance, the cache memory 130 can be constructed from a volatile or nonvolatile memory. The cache memory 130 can be constructed from a plurality of memories, and can control data in a multiplex manner.

For example, the shared memory (or control memory) 140 can be constructed from a volatile or nonvolatile memory. For instance, control information or the like is stored in the shared memory 140. Furthermore, information such as control information and the like can be controlled in a multiplex manner by a plurality of shared memories 140.

The shared memory 140 and cache memory 130 can be constructed as respectively separate memory packages, or can be stored inside a single memory package. Furthermore, a portion of one memory can be used as a cache region, and another portion of the same memory can be used as a control information region.

The switching part 150 connects the respective CHAs 110, the respective DKAs 120, the cache memory 130 and the shared memory 140 to each. As a result, all of the CHAs 110, the DKAs 120, the cache memory 130 and the shared memory 140 can be respectively accessed.

The SVP (service processor) 160 collects information from the respective CHAs 110 and the respective DKAs 120 via the communications network CN3. For example, information collected by the SVP 160 includes device constructions (closed state of the canisters (disk drives) and the like), power supply alarms, temperature alarms, input-output speed (IOPS) and the like. The SVP 160 is connected to the control terminals M1 via the communications network CN2.

The storage device 10 comprises numerous canisters 21. For example, each canister 21 is constructed so as to contain a storage device such as a hard disk drive, a semiconductor memory device, an optical disk drive, an optical-magnetic disk drive or the like. Furthermore, for example, one RAID group 23 can be constructed by a specified number of canisters 21 such as four canisters or the like. One or more logical volumes (logical units) 24 which are logical storage regions can be set in the physical storage region provided by this RAID group 23.

The power supply part 40 shown in FIG. 3 respectively supplies a specified electric power to the respective packages 110, 120, 130 and 140, the fans 12 and 13 and the like.

Figure 4:
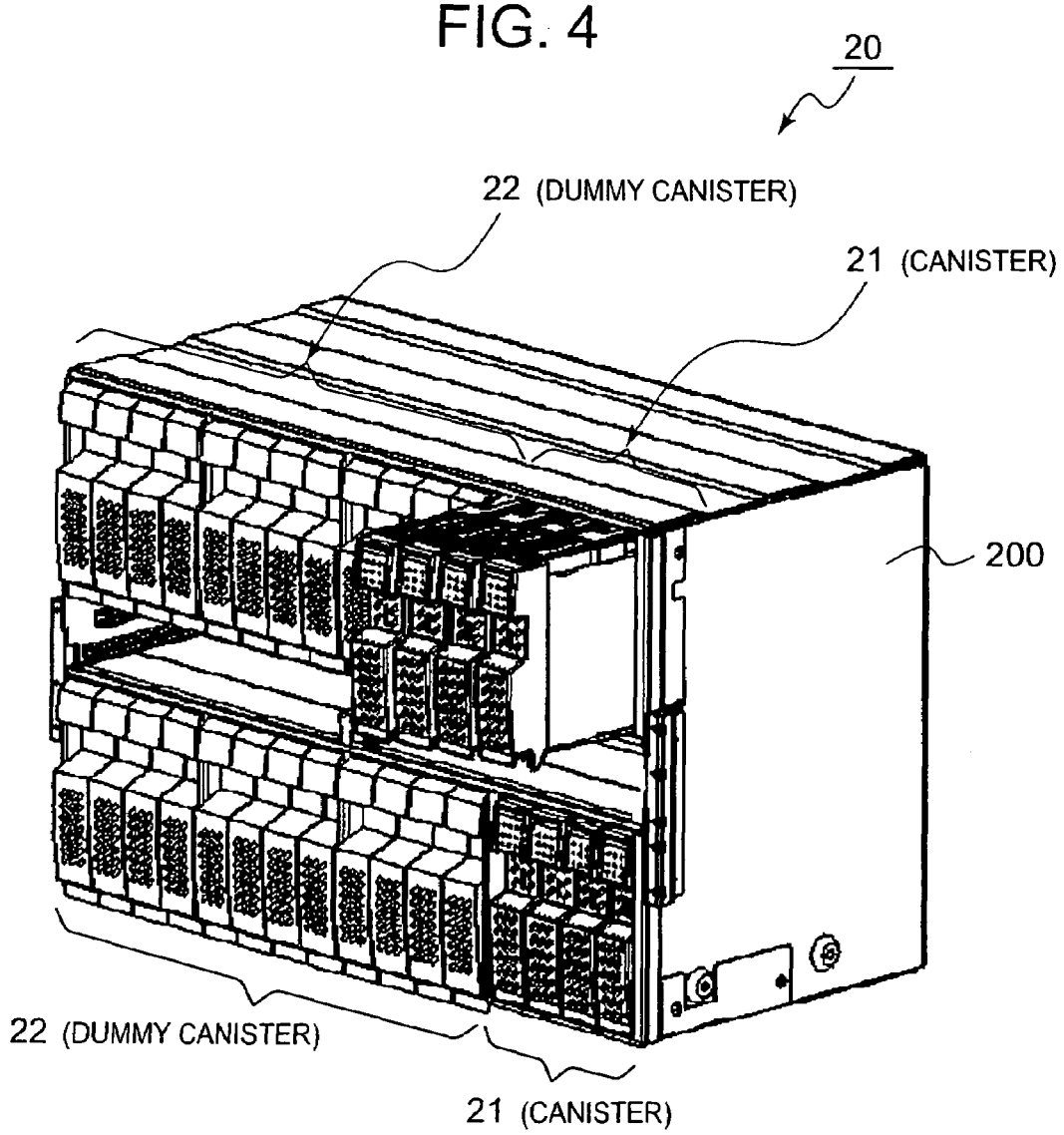
FIG. 4 is an external view showing an enlargement of the storage part.

FIG. 4 is a perspective view showing an enlargement of the storage part 20. For example, the chassis 200 of the storage part 20 is formed in the shape of a square tube from a metal material such as stainless steel or the like. As is also shown in the front view shown in FIG. 5, slots which are used for the detachable attachment of either canisters 21 or dummy canisters 22 in respective stages are formed in two stages (upper and lower) inside the chassis 200.

Figure 5:
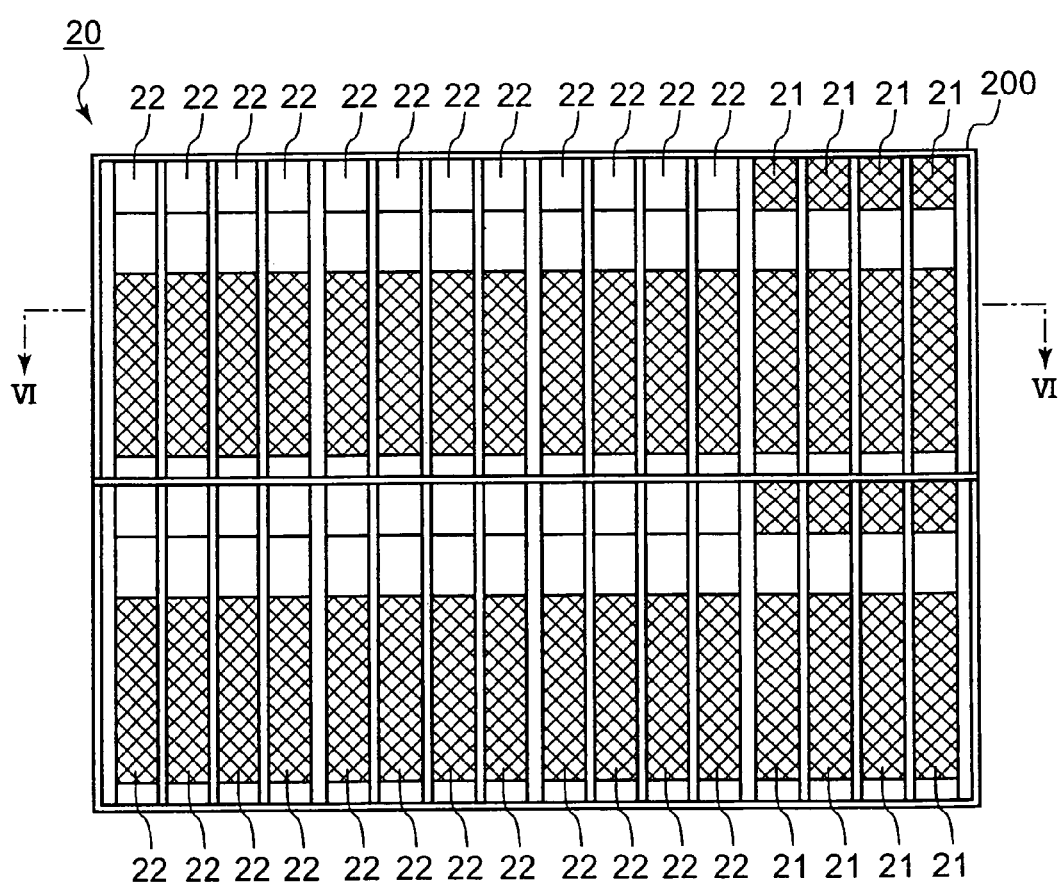
FIG. 5 is a front view of the storage part.

In the example shown in FIG. 5, four canisters 21 are attached on the right side, and twelve dummy canisters 22 are attached adjacent to this canister group, in both the upper and lower stages. The number of canisters 21 disposed in the respective stages may differ according to the wishes of the user and the like; dummy canisters 22 are attached to the empty slots.

Figure 6:
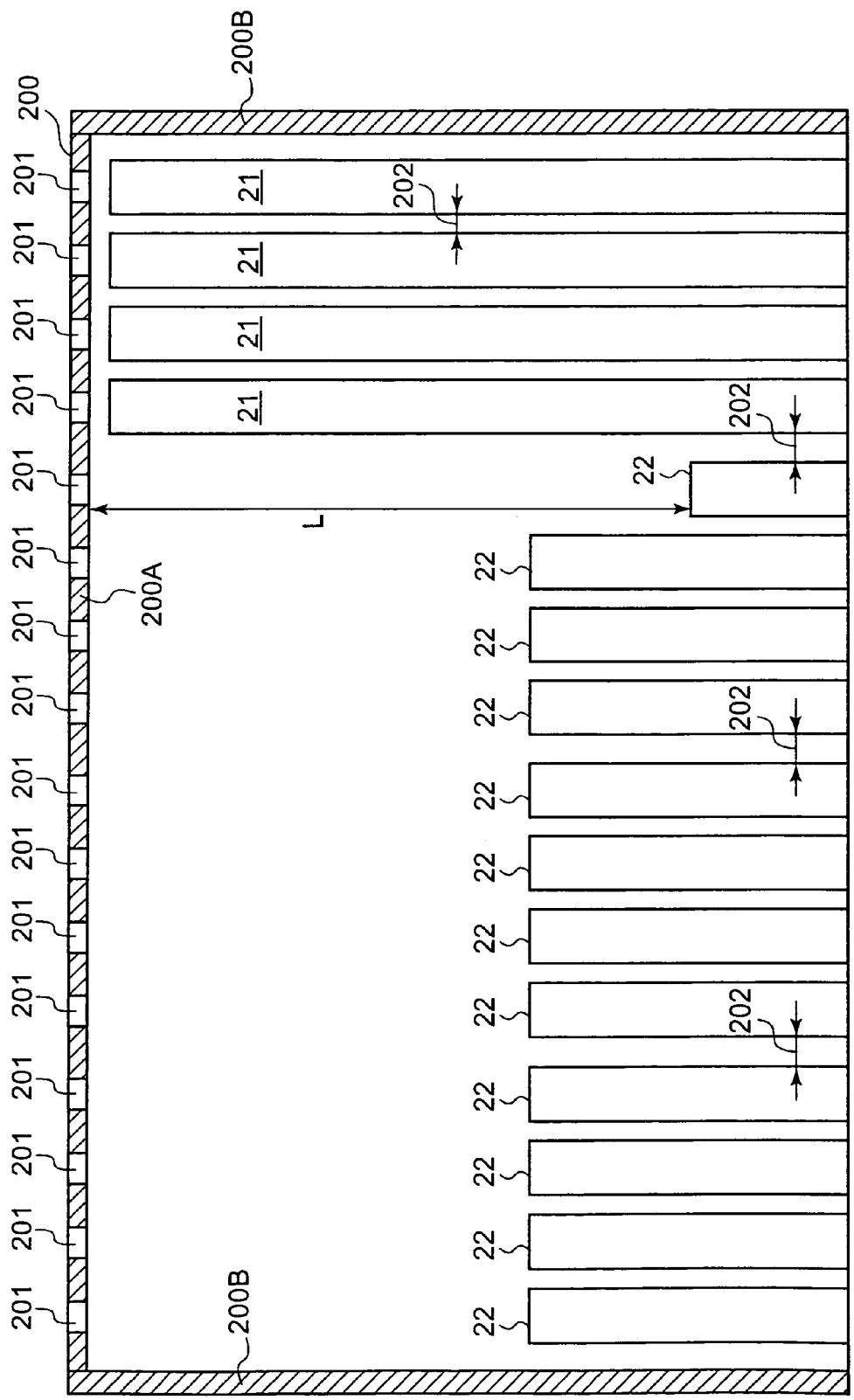
FIG. 6 is a model diagram showing a cross section of the chassis of the storage part.

FIG. 6 is a partial sectional view from the direction of the arrow VI-VI in FIG. 5. Since the internal structure of the canisters 21 is not an essential part of the present invention, a graphic illustration of this internal structure is omitted. The structure of the dummy canisters 22 will be described later with reference to other figures.

The chassis 200 is formed in the shape of a square tube which has four surfaces 200B (only two of these surfaces are shown in FIG. 6). One open surface of the chassis 200 (the surface on the lower side in FIG. 6) is used for the attachment of canisters 21 or dummy canisters 22 and the like. The other open surface of the chassis 200 (the surface on the upper side in FIG. 6) is covered by the back board 200A. The back board 200A is used to make electrical connections with the respective canisters 21; exhaust ports 201 and connectors 203 (see FIG. 10) are respectively disposed in the back board 200A for each slot. Furthermore, the terminals of the respective connectors 203 are connected by printed wiring formed on the back board 200A. The respective canisters 21 are connected to the DKAs 120 via printed wiring or the like from the connectors 203. Furthermore, as will be described later, a plurality of connectors 203A and 203B can be provided; for convenience of description, however, both connectors are referred to in common as connectors 203 in some cases.

The canisters 21 are manufactured so that the length dimension of the canisters 21 in the direction of attachment to the chassis 200 is longer than that of the respective dummy canisters 22. Accordingly, the dimension of the separation between the back surface sides of the respective canisters 21 and the back board 200A is relatively short.

On the other hand, since the length dimension of the dummy canisters 22 is shorter than that of the canisters 21, the dimension of the separation between the back surface sides of the dummy canisters 22 and the back board 200A is relatively long. Furthermore, in particular, since the dummy canisters 22 that are adjacent to canisters 21 are folded so that the length dimension of these dummy canisters 22 is minimal, the dimension L of the separation to the back board 200A is maximized.

Gaps 202 of specified dimensions are respectively formed between the respective canisters 21, between the respective dummy canisters 22, and between adjacent canisters 21 and dummy canisters 22. These gaps 202 function as cooling air draft passages, and cooling air drafts from the outside respectively flow into the interior of the chassis 200 via these respective gaps 202.

Furthermore, the respective cooling air drafts that flow around the canisters 21 capture heat from the canisters 21, and flow into the housing 11 from the exhaust ports 201. Furthermore, as will be described later, cooling air drafts also flow into the interiors of the canisters 21. After cooling the interiors of the canisters 21, these cooling air drafts flow into the interior of the housing 11 from the exhaust ports 201. The cooling air drafts that thus flow through the interiors and around the exteriors of the canisters 21 and then flow into the housing 11 are discharged to the outside from the upper part of the housing 11 by the fan 13.

Figure 7:
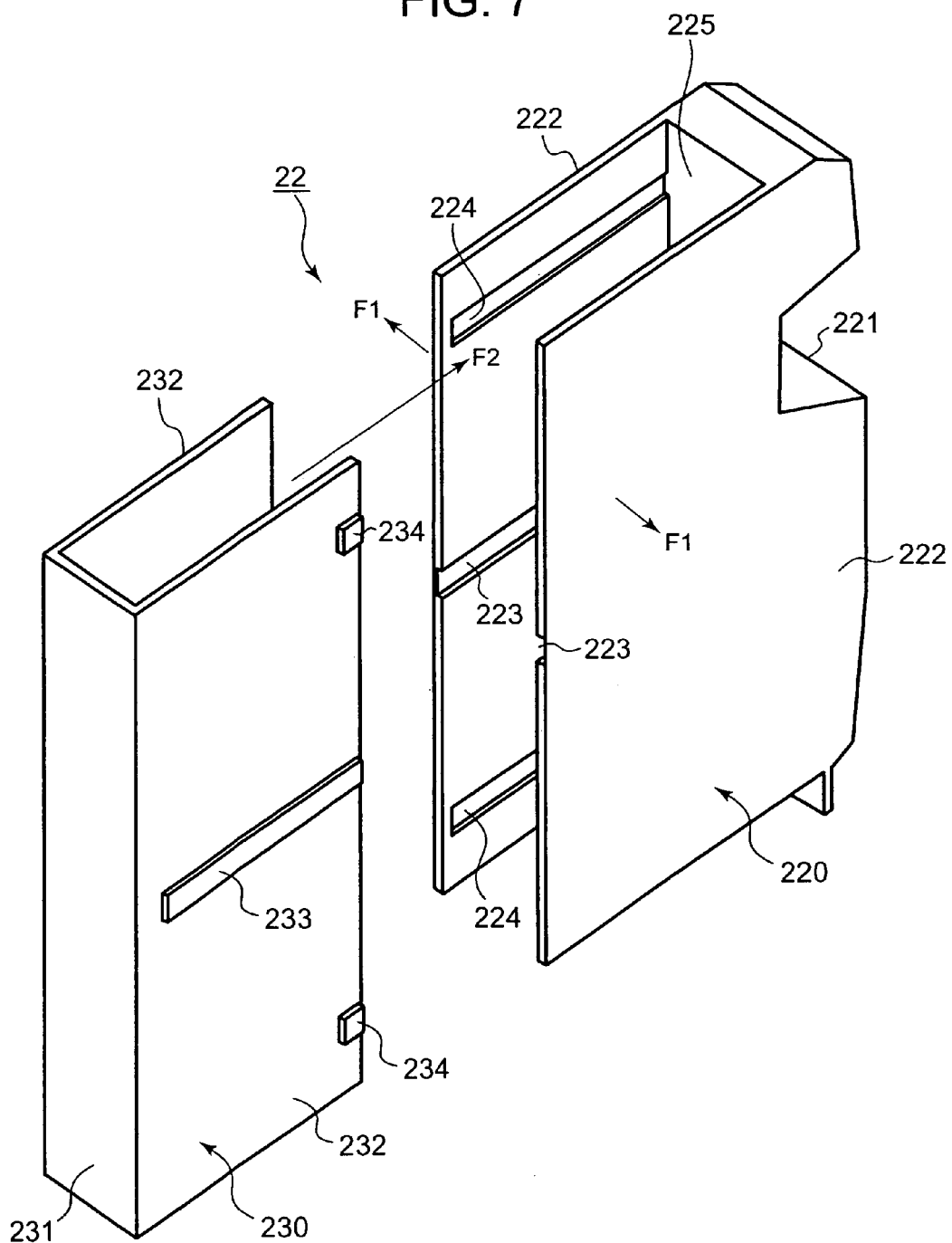
FIG. 7 is a perspective view of a dummy canister in an exploded state.

The detailed structure of the dummy canisters 22 will be described with reference to FIGS. 7 through 10. FIG. 7 is a perspective view showing the dummy canisters 22 in an exploded state.

Each dummy canister 22 can be constructed from two main parts. One part is a front part 220, and the other part is a rear part 230. Each dummy canister 22 can be constructed from the front part 220 and rear part 230 so that this dummy canister 22 can expand and contract in the attachment direction. For example, the respective parts 220 and 230 can each be integrally molded from a synthetic resin material or the like. Furthermore, the respective parts 220 and 230 can also be constructed from metal materials, ceramic materials or the like.

The front part 220 comprises a front wall 221 which is exposed to the outside from the open surface of the chassis 200, and two side walls 222 that are integrally disposed on both sides of the front wall 221. Specifically, the upper surface and lower surface of the front part 220 are respectively open. Since the upper surface and lower surface of the front part 220 are both substantially covered by the side surfaces 200B of the chassis 200, there is no need to installed wall parts [on these surfaces]. However, the present invention is not limited to this; it would also be possible to use a construction in which wall parts are respectively disposed on the upper surface and lower surface of the front part 220.

A plurality of guide grooves 223 and 224 that are separated in the vertical direction are respectively integrally formed in the inside surfaces of the respective side walls 222 so that these grooves extend in the forward-rearward direction (i.e., the dummy canister attachment direction). Here, the respective guide grooves 223 that are positioned substantially in the center in the vertical direction engage with guide projections 233 on the rear part 230 so that sliding movement is possible; these grooves are formed throughout the inside surfaces of the side walls 222 in the forward-rearward direction.

The other guide grooves 224 formed in the vertical direction are formed in the inside surfaces of the side walls 222 with dimensions that are shorter than those of the guide grooves 223. Respective stoppers 234 formed in the rear part 230 are respectively engaged with the respective guide grooves 224 so that sliding movement is possible. Unlike the guide grooves 223, the rear ends of the respective guide grooves 224 do not open at the rear ends of the side walls 222. The rear ends of the respective guide grooves 224 restrict the movement of the stoppers 234.

The rear part 230 comprises a rear wall 231, and two side walls 232 that are integrally formed on both sides of the rear wall 231. Like the front part 220, the rear part 230 has an open upper surface and lower surface, and this upper surface and lower surface are substantially covered by the side surfaces 200B of the chassis 200.

On the surfaces of both side walls 232, guide projections 233 are formed in substantially the central parts so that these guide projections 233 extend in the forward-rearward direction. These respective guide projections 233 respectively engage with the respective guide grooves 223 of the front part 220 so that sliding movement is possible, and are respectively formed so that these projections extend along the entire surfaces of the side walls 232 in the forward-rearward direction.

Stoppers 234 are respectively integrally formed on the upper parts and lower parts of the surfaces of both wall parts 232. These respective stoppers 234 respectively engage with the respective guide grooves 224 of the front part 220 so that sliding movement is possible. When the rear part 230 is caused to move rearward (in the opposite direction from the direction F2 in FIG. 7) in a state in which the rear part 230 is inserted into the front part 220, the respective stoppers 234 contact the rear end parts of the respective guide grooves 224, so that the movement of the rear part 230 is restricted. The length dimension of the dummy canisters 22 reaches a maximum in this state. This shape is one example of the "second shape".

Conversely, when the rear part 230 is moved forward (in the direction F2 in FIG. 7), the stoppers 234 contact the back surface 225 of the front wall of the front part 220, so that the forward movement of the rear part 230 is restricted. In this state, the length dimension of the dummy canisters 22 shows a minimum value. This shape is one example of the "first shape".

When the dummy canisters 22 are assembled, both side walls 222 of the front part 220 are respectively pushed open to a slight degree in the direction indicated by the arrow F1, and the front end portion of the rear part 230 is inserted into the space between the respective side walls 222. When the rear part 230 is inserted into the front part 220, the positions of the respective guide projections 233 and the respective guide grooves 223 are aligned, and the positions of the respective stoppers 234 and the respective guide grooves 224 are aligned.

In a case where the dummy canisters 22 are set in the first shape, the rear part 230 is inserted as far as the deep end of the front part 220. In a case where the dummy canisters 22 are set in the second shape, the rear part 230 is inserted into the front part 220 as far as a position where the respective stoppers 234 contact the rear end parts of the respective guide grooves 224 and stop.

Figure 8:
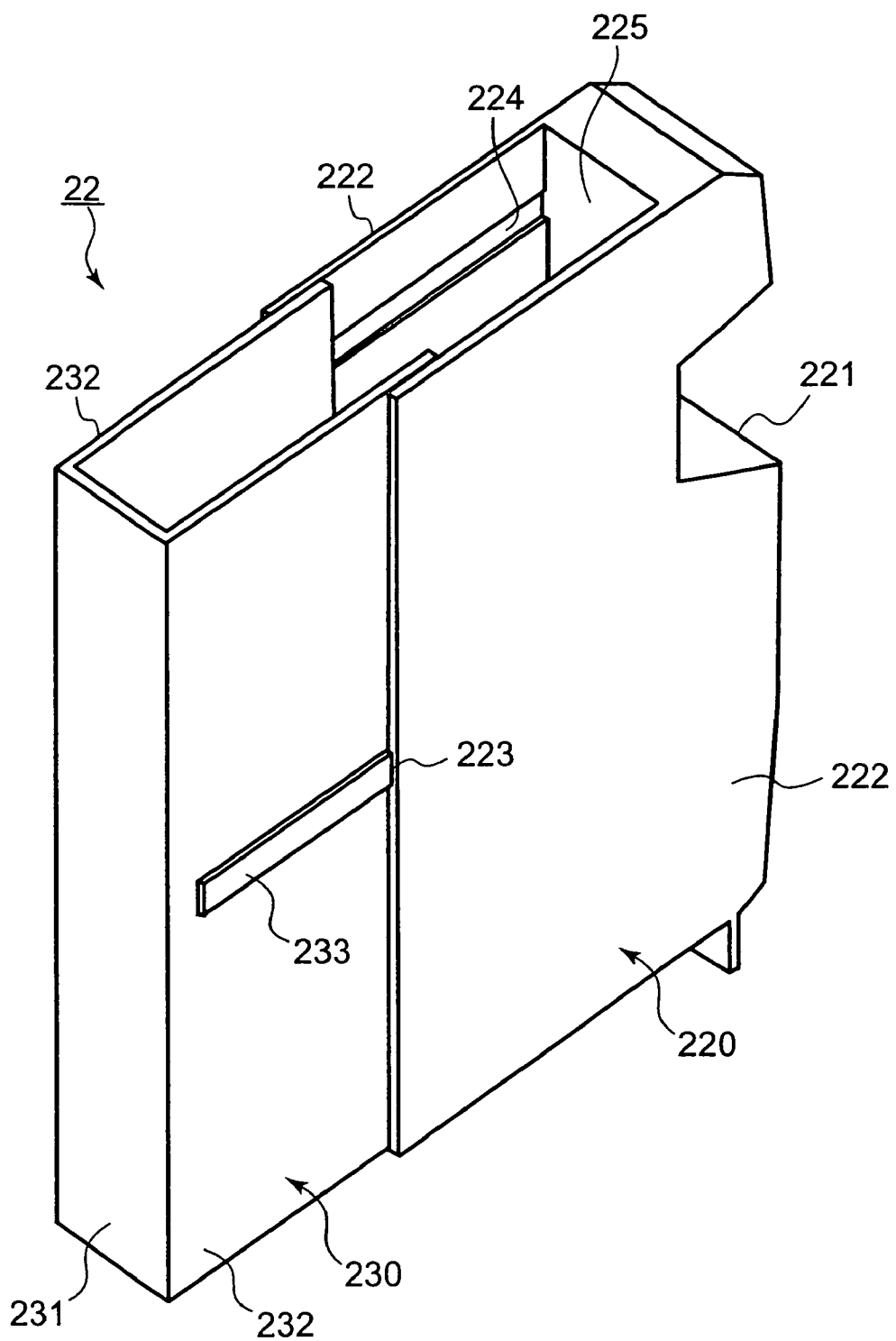
FIG. 8 is a perspective view showing a case in which a dummy canister is assembled and set in the second shape.
Figure 9:
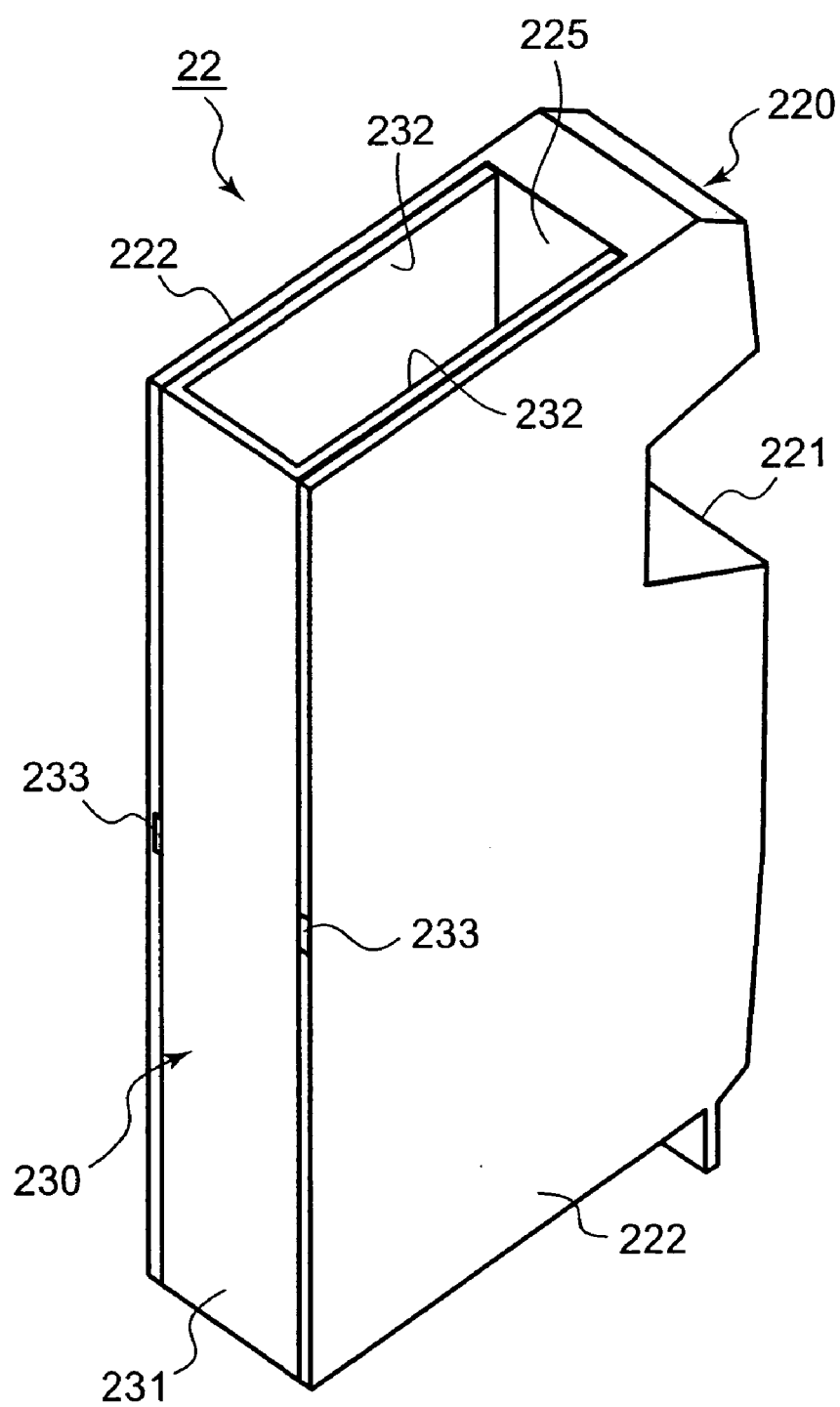
FIG. 9 is a perspective view showing a case in which a dummy canister is set in the first shape.

FIG. 8 shows a perspective view of a state in which the dummy canisters 22 have assumed the second shape, and FIG. 9 shows a perspective view of a state in which the dummy canisters 22 have assumed the first shape. The dummy canisters 22 are thus constructed so that these dummy canisters can be caused to expand and contract in the forward-rearward direction (dummy canister attachment direction) by the front part 220 and rear part 230.

Furthermore, in the present embodiment, the dummy canisters 22 are constructed so that these dummy canisters are deformable in two stages, i.e., a first shape with a short length dimension and a second shape with a long length dimension. However, the present invention is not limited to this; it would also be possible to construct the dummy canisters so that these dummy canisters are deformable in three or more stages. Furthermore, in the present embodiment, a construction is used in which positioning is performed by means of stoppers 234, guide grooves 224 and the like. However, the present invention is not limited to this; for example, it would also be possible to use a construction in which the front part 220 and rear part 230 are attached using other means such as magnetic force or the like.

Figure 10:
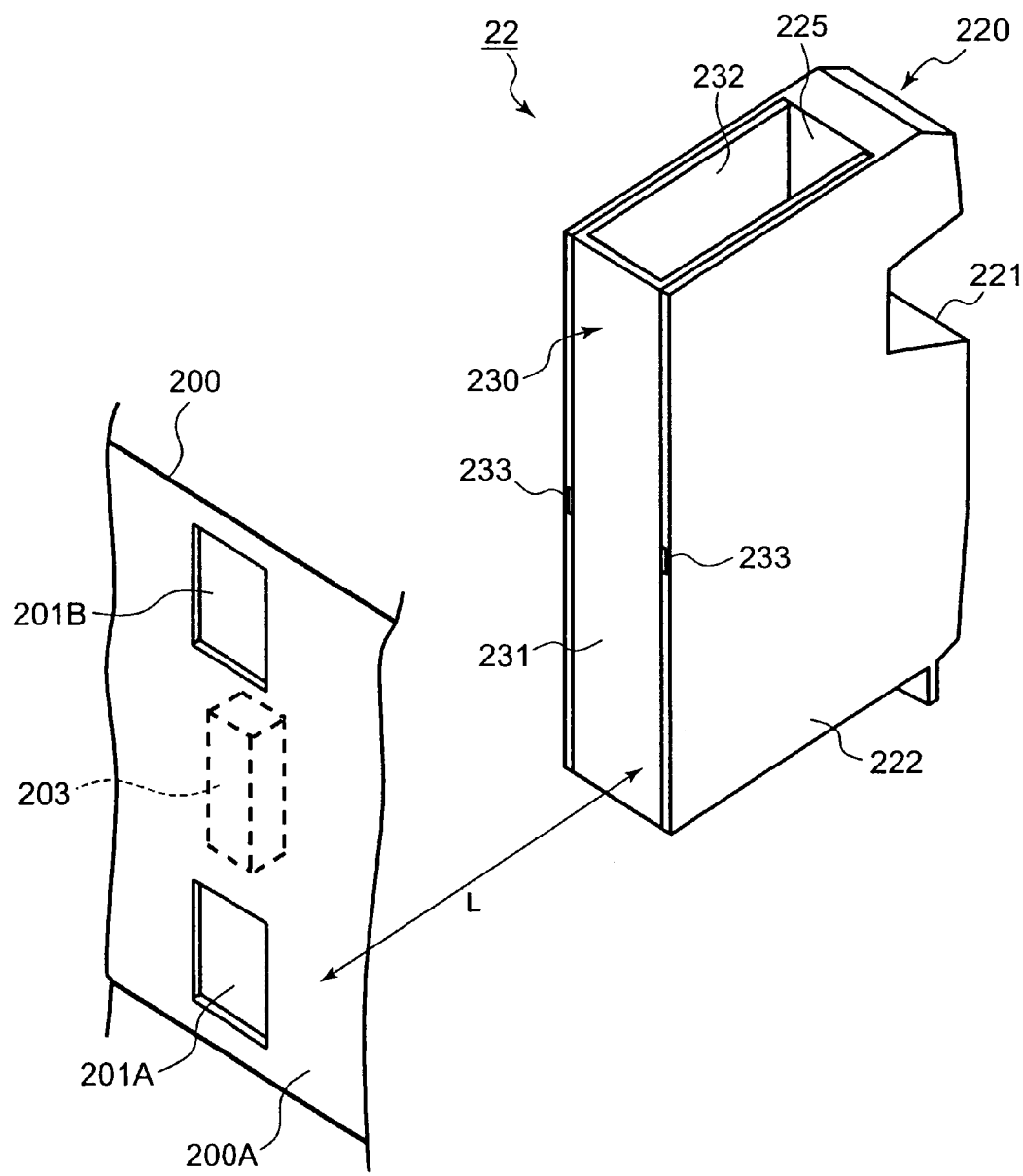
FIG. 10 is a perspective view showing the relationship between the dummy canister and the back board in model form.

Next, FIG. 10 is a perspective view which shows the relationship between the dummy canisters 22 and the back board 200A. As was described with reference to FIG. 6, connectors 203 that are connected to the respective canisters 21, and exhaust ports 201A and 201B that are respectively disposed above and below these connectors 203, are disposed in the back board 200A. Below, the exhaust ports 201A and 201B will be referred to collectively as "exhaust ports 201" in some cases. These connectors 203 and exhaust ports 201 are respectively disposed for each of the respective slots. For example, in cases where a maximum of 16 canisters 21 can be attached inside the chassis 200, 16 sets of exhaust ports 201 and connectors 203 are disposed in the back board 200A.

Furthermore, as is shown in FIG. 10, the dimension L of the separation between the back surface sides (wall parts 231) of the dummy canisters 22 and the front surface side of the back board 200A differs according to the shape of the dummy canisters 22.

Next, the construction of the canisters 21 will be described with reference to FIGS. 11 through 15. As will be described below, the canisters 21 have a structure that is used to obtain a larger cooling air draft. Accordingly, in spite of the fact that the canisters 21 have a longer length dimension in the attachment direction than the dummy canisters 22, the amount of the cooling air draft that flows through the canisters 21 and is discharged is greater than the amount of the cooling air draft that flows between the dummy canisters 22.

Figure 11:
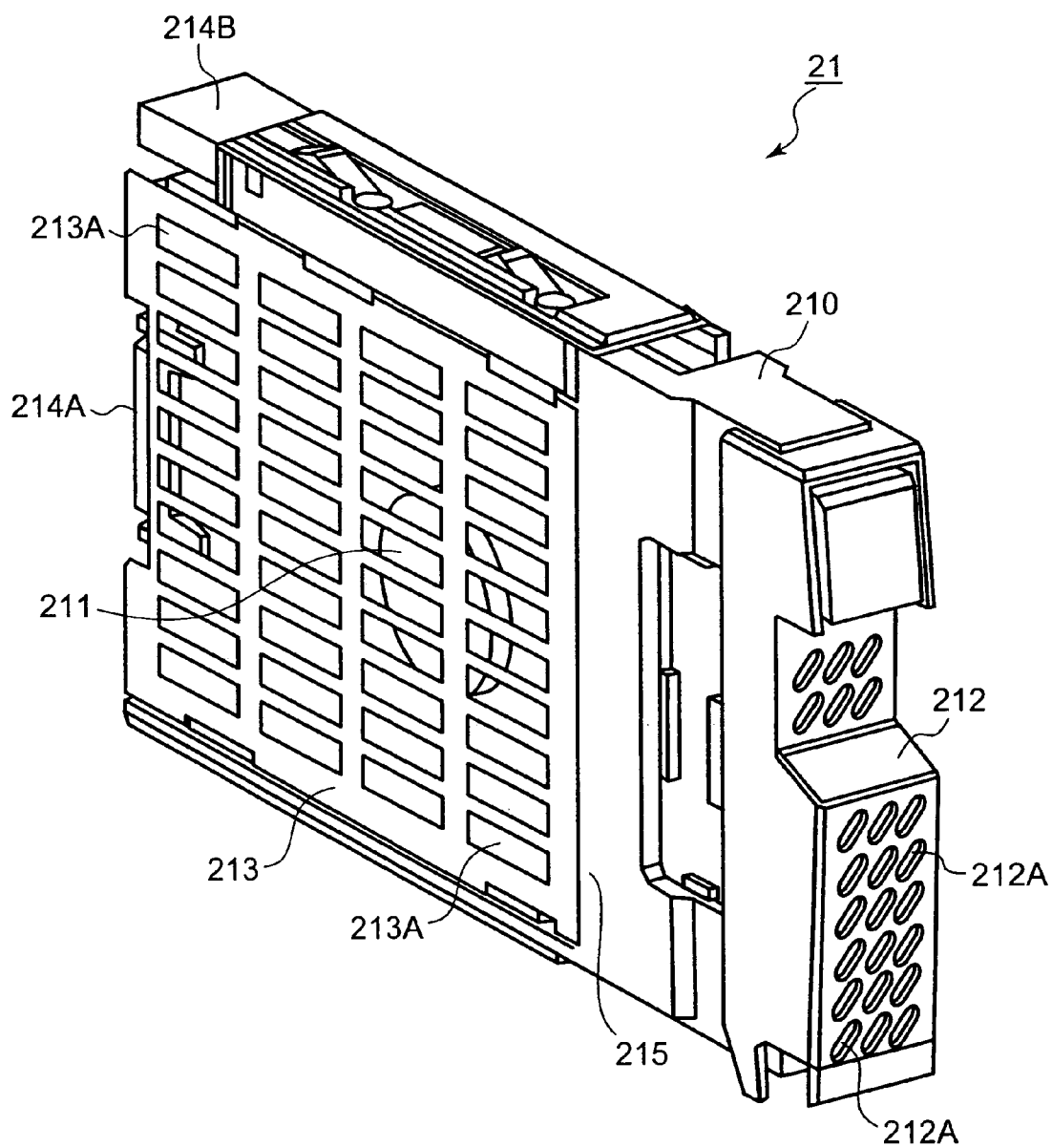
FIG. 11 is a perspective view showing an enlargement of the canister.

FIG. 11 is a perspective view showing the external appearance of the canisters 21. For example, each of the canisters 21 can be constructed so as to comprise a chassis 210, a disk drive 211, a front panel 212, a side panel 213 and a connector 214.

A disk drive 211 is attached to the chassis 210. For example, the disk drive 211 is constructed as a hard disk drive, semiconductor memory drive, optical disk drive or the like.

A front panel 212 is disposed on the front side of the chassis 210. The user can remove the canister 21 from the slot of the chassis 200, or attach the canister 21 to this slot, by grasping the front panel 212. Furthermore, a plurality of air holes 212A are formed in the front panel 212. The cooling air draft positioned in front of the front panel 212 flows into the canister 21 via the respective air holes 212A.

A side panel 213 is attached to one side surface of the disk drive 211 (the left side surface of the canister 21). A plurality of air holes 213A are formed in the side panel 213. Furthermore, for example, a gap 215 with a width of a few millimeters is maintained between the side pane 213 and the disk drive 211. A portion of the cooling air draft that flows in from the respective air holes 212A of the front panel 212 passes through this gap 215, and flows out to the rear of the canister 21. Furthermore, a portion of the cooling air draft that is positioned on the outside of the side panel 213 also flows into the gap 215 via the respective air hole 213A, and flows out to the rear.

A connector 214A and a connector 214B are respectively disposed on the rear side of the canister 21. The connector 214A is connected to the connector 203A shown in FIG. 19. The connector 214B is connected to the connector 203B shown in FIG. 19. The connectors 214A and 214B may also be referred to collectively as the "connectors 214".

Figure 12:
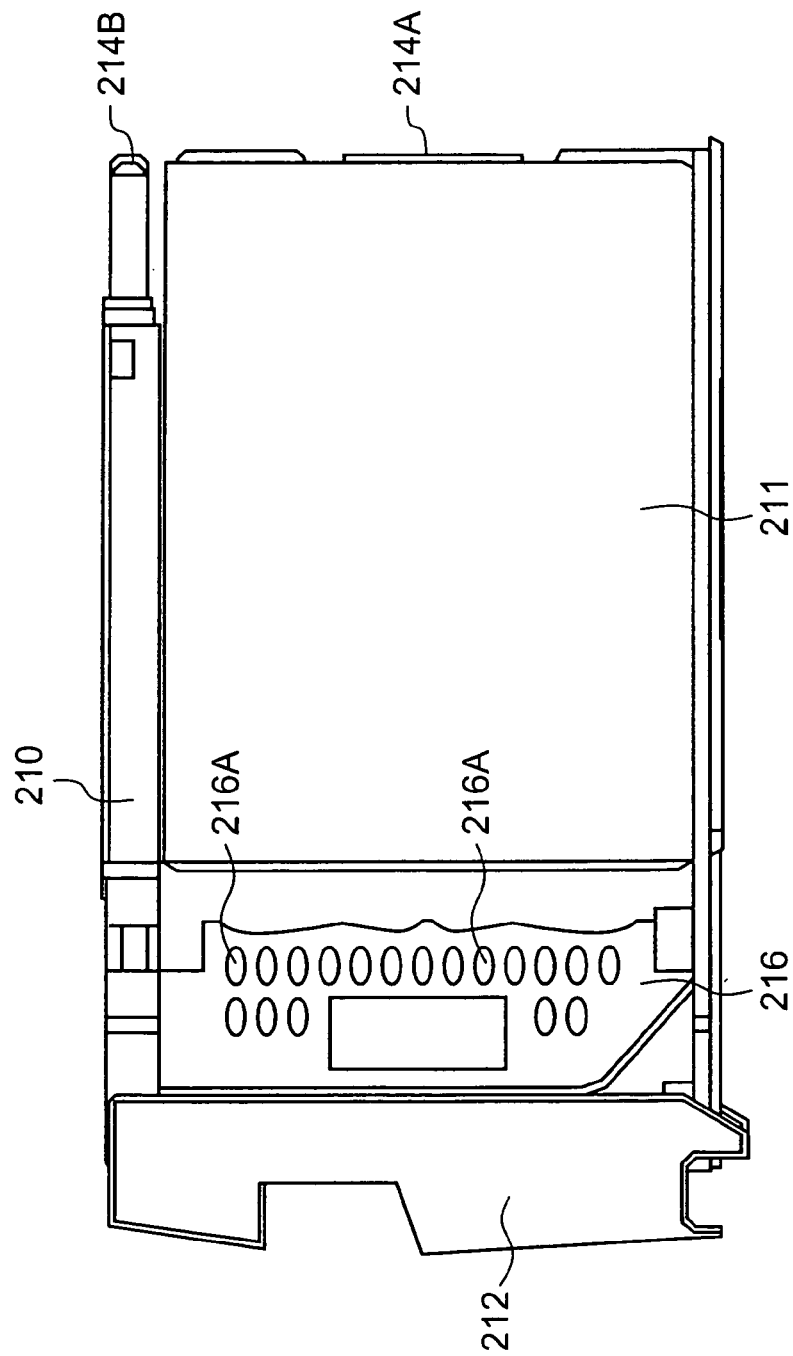
FIG. 12 is a right side view of the canister.

FIG. 12 is a right side view of the canister 21 shown in FIG. 11. A separate panel 216 is disposed to the rear of the front panel 212, and a plurality of air holes 216A are formed in this panel 216. Furthermore, the panel 216 may also be formed as an integral part of the chassis 210.

Figure 13:
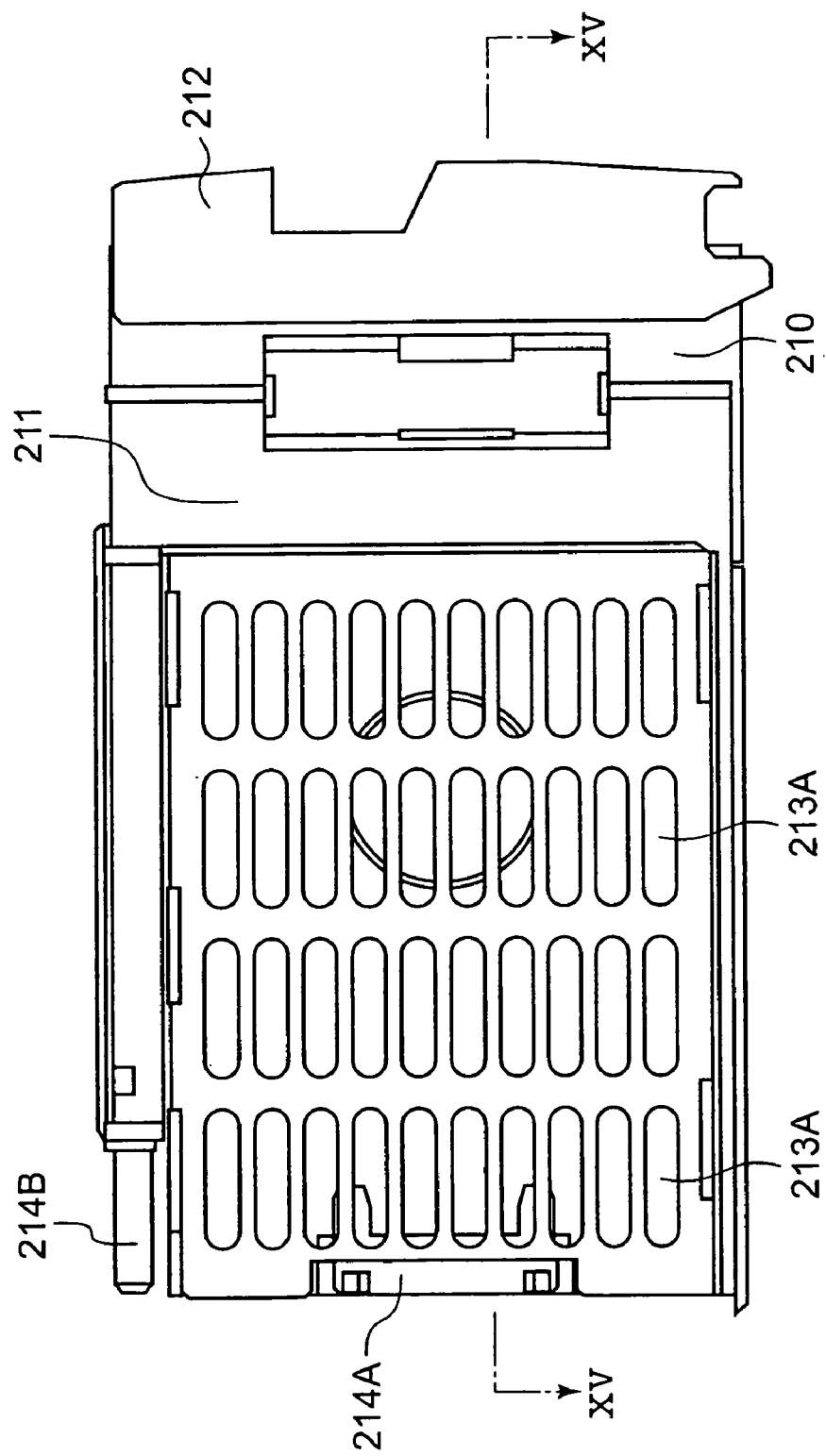
FIG. 13 is a left side view of the canister.
Figure 14:
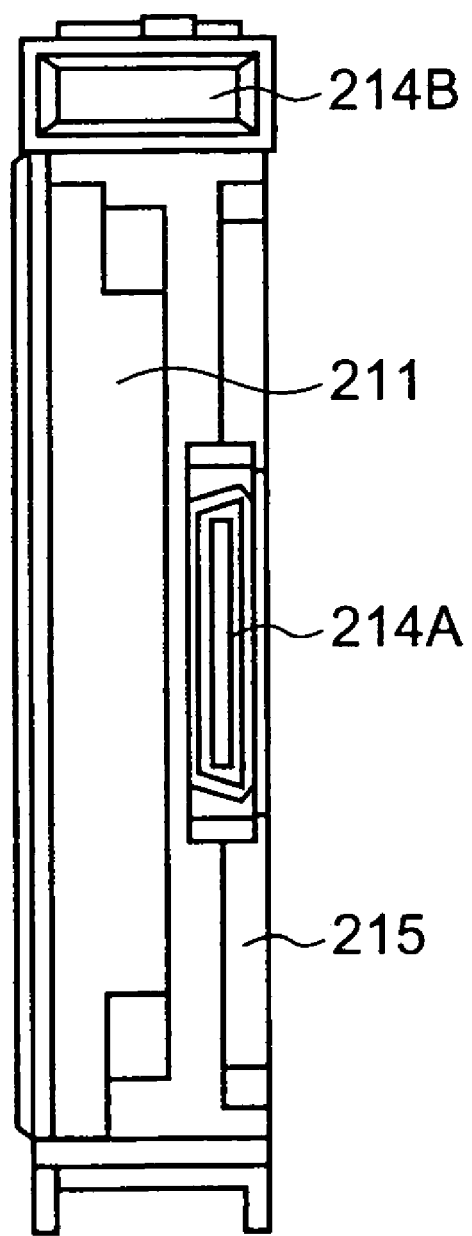
FIG. 14 is a back view of the canister.
Figure 15:
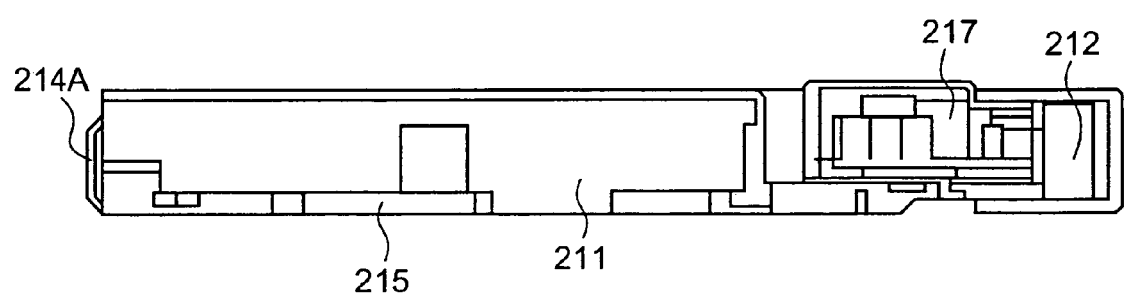
FIG. 15 is a view from the direction of the arrow XV in FIG. 13.

FIG. 13 is a left side view of the canister 21 shown in FIG. 11. FIG. 14 is a rear view of the canister 21. FIG. 15 is a view from the direction of the arrow XV in FIG. 13. A power supply circuit 217 which is used to supply electric power to the disk drive 211 is disposed to the rear of the front panel 212. A gap is maintained by circuit parts and the like in this power supply circuit 217, and a cooling air draft also flows into this gap.

Next, the amount of the cooling air draft that flows through the chassis 200 will be considered. As is shown in FIG. 16, a canister group consisting only of canisters 21 and a dummy canister group consisting only of dummy canisters are present in a mixed configuration adjacent to each other inside the chassis 200.

In the present embodiment, the shape of the dummy canister 22 (N5) that is positioned on the boundary area between both groups is set as the first shape, and the shapes of the other dummy canisters 22 (N6 through N16) are respectively set as the second shape.

Figure 16:
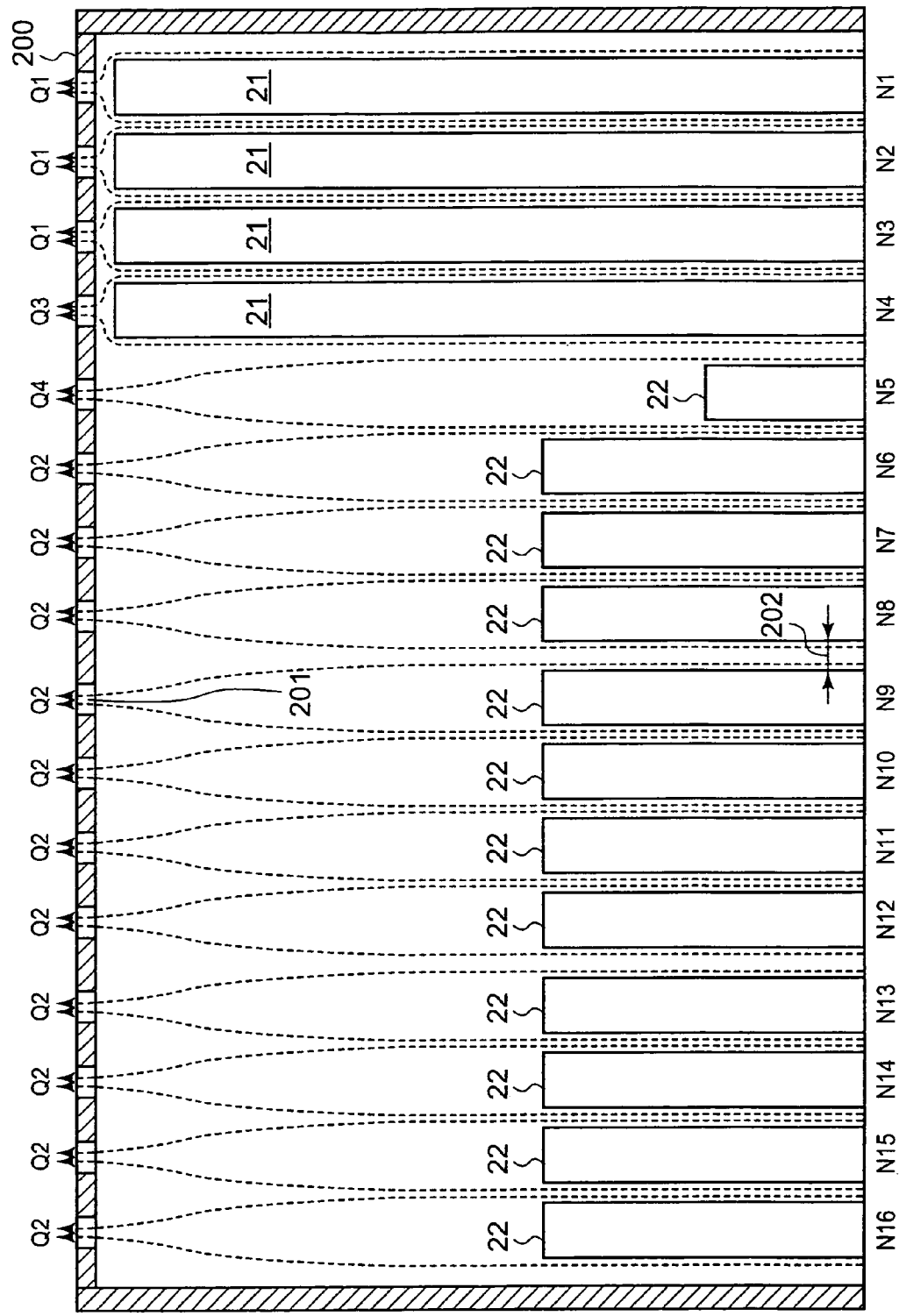
FIG. 16 is an explanatory diagram which shows the distribution of the draft amount inside the chassis in model form.

The dummy canisters 22 are formed so that even in cases where these dummy canisters 22 are set in the second shape with a maximum length, the length dimension (i.e., the length dimension in the attachment direction; this is the length in the vertical direction in FIG. 16) is shorter than that of the canisters 21. Accordingly, the dimension of separation between the dummy canisters 22 (N6 through N16) and the back board 200A is greater than that of the canisters 21. Since the dummy canister 22 (N5) that is positioned in the boundary area adopts the first shape which has the shortest length, the separation distance between this dummy canister 22 (N5) and the back board 200A is the longest.

As is shown in FIG. 16, the amount Q1 of the cooling air draft that flows into the exhaust ports 201 from the respective canisters 21 is greater than the amount Q2 of the cooling air draft that flows between the respective dummy canisters 22 and flows into the exhaust ports 201. As was described above, a plurality of air holes 212A are formed in the front panels 212 of the canisters 21, a wider gap (flow passage) 215 is maintained on the side surfaces and the like, so that a larger cooling air draft is taken in.

Accordingly, the apparent width dimensions of the canisters 21 and dummy canisters 22 (the width dimensions in the left-right direction in FIG. 11) appear to be substantially the same; however, a larger flow passage is formed in the canisters 21, and the substantial width dimension is shorter in the case of the canisters 21. On the other hand, the dummy canisters 22 have a construction that prevents the inflow of an excessive cooling air draft, and the front wall 221 and respective side walls 222 and 223 are substantially free of opening parts; moreover, the gaps between the respective dummy canisters 22 are also narrow. Accordingly, the amount Q2 of the draft that flows between the dummy canisters 22 is relatively small. Q2 is approximately 0.44 where Q1 is taken as 1.

The amount Q4 of the draft that flows around the dummy canister 22 (N5) that is positioned in the boundary area is greater than the draft amount Q2, but smaller than the draft amount Q1. In the abovementioned example, Q4 is approximately 0.75. The length dimension of the dummy canister 22 (N5) in this boundary area is set at a short value, and the dimension L of the separation between this dummy canister 22 (N5) and the back board 200A is the longest. Accordingly, a wider space is maintained on the back surface side of this dummy canister 22 (N5), and the inflow resistance is small compared to that between the other dummy canisters 22. Accordingly, a draft amount Q4 that is greater than the draft amount Q2 can be obtained.

Furthermore, the amount Q3 of the cooling air draft that flows trough the dummy canister 22 (N4) that is adjacent to the dummy canister 22 (N5) is greater than the draft amount Q4, but slightly smaller than the draft amount Q1. Since a larger draft amount Q4 is maintained by the dummy canister 22 (N5), the amount Q3 of the cooling air draft that flows through the canister 21 (N4) positioned in the boundary area can be increased. In the abovementioned example, Q3 is approximately 0.9.

Figure 17:
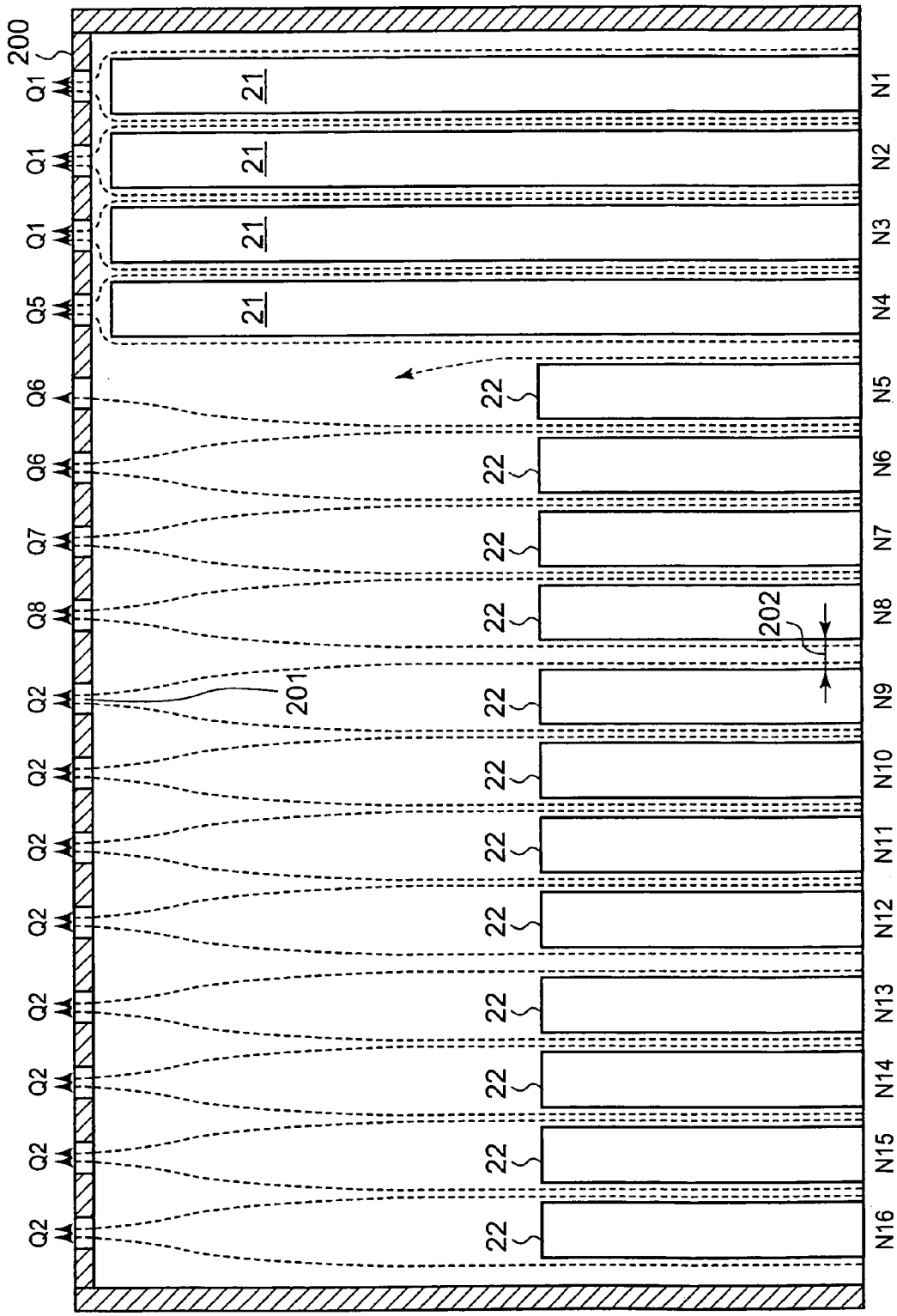
FIG. 17 is an explanatory diagram which shows the distribution of the draft amount in a case where the length of the dummy canisters adjacent to the canisters is varied.

FIG. 17 is an explanatory diagram showing the draft amount in a case where the dummy canister 22 (N5) in the boundary area is set in the second shape. This is a figure that is used for comparison with FIG. 16, and does not indicate the prior art.

As is shown in FIG. 17, in a case where the dummy canister 22 (N5) in the boundary area is set in the second shape, the dimension of separation with the back board 200A is contracted, so that the inflow resistance increases. Accordingly, the amount Q6 of the cooling air draft that flows around this dummy canister 22 (N5) is decreased to a value that is smaller than Q4. In the abovementioned example, Q6 is approximately 0.5. Consequently, the amount Q5 of the draft that is supplied to the canister 21 (N4) positioned in the boundary area drops to a value that is smaller than the draft amount Q3. In the abovementioned example, the draft amount Q5 is approximately 0.6.

Furthermore, as a result of the dummy canister 22 (N5) in the boundary area being set in the second shape, the draft amounts Q7 and Q8 of the dummy canisters 22 (N7 and N8) also vary slightly. In the abovementioned example, Q7 is approximately 0.48, and Q8 is approximately 0.46.

As is clear from a comparison of FIG. 16 and FIG. 17, a larger draft amount Q3 can be supplied to the canister 21 (N4) positioned in the boundary area by setting the dummy canister 22 (N5) positioned in the boundary area between the canister group and the dummy canister groups in the first shape, and increasing the dimension L of the separation from the back board 200A.

FIG. 18 is an explanatory diagram of the table T1 showing the relationship between the mounting rate of the dummy canisters 22 and the draft amount that is required for the cooling of the canisters 21. For example, this table T1 can be determined by experiment, simulation or the like. For instance, this table T1 is taken into consideration when the specifications of the cooling fan 13 and the like are set. Here, the table T1 shown in FIG. 13 shows the values in a case where the dimension L of separation between the dummy canisters 22 and the back board 200A is 175 mm (L=175 mm). In cases where this value is set at a value that is less than 175 mm (L<175 mm), the values of the draft amounts that are required for cooling are also smaller than the values shown in FIG. 18.

Here, in the present embodiment, since 16 slots are respectively disposed in the respective stages of the chassis 200, there may be cases in which the mounting rate, which is obtained by dividing the number of dummy canisters 22 mounted by 16 (the maximum number of slots), is not an integer. In the present embodiment, the number of items (No. 0 to 16) in the table T1 is equal to the number of dummy canisters 22 mounted.

For example, in cases where not even a single dummy canister 22 is mounted (No. 0), i.e., in cases where all of the slots in a given stage of the chassis 200 are embedded by canisters 21, the draft amount that is required for the respective cooling of these 16 canisters 21 is taken as 100%. For example, the draft amount that is required for cooling is defined as the total amount of the cooling air draft that must be supplied to the respective canisters 21 in order to ensure normal operation of the respective canisters 21 in a certain room temperature range. Furthermore, in cases where dummy canisters 22 are mounted, as is shown in FIG. 16, the dummy canisters 22 that are adjacent to the canisters 21 are set in the first shape, which has a minimum length, and the other dummy canisters 22 are set in the second shape.

As is shown in the table T1, the draft amount that is required for cooling drops slightly each time that a dummy canister 22 is mounted. For example, if a single dummy canister 22 is mounted (No. 1), the draft amount that is required for cooling is 97.8%, and if two dummy canisters 22 are mounted (No. 2), the required draft amount is 94.3%. In a case where dummy canisters 22 are attached to all of the slots in a given stage (No. 16), the draft amount that is required for cooling is 45.3%.

As is shown in the table T1, the draft amount that is required for cooling can be lowered by attaching the dummy canisters 22 that have a variable structure according to the present embodiment with the shape varied between dummy canisters 22 that are positioned in the boundary area and other dummy canisters 22. Accordingly, the operation of the cooling fan 13 can be controlled in accordance with he number of dummy canisters 22 mounted, as described in the following embodiment.

Figure 19:
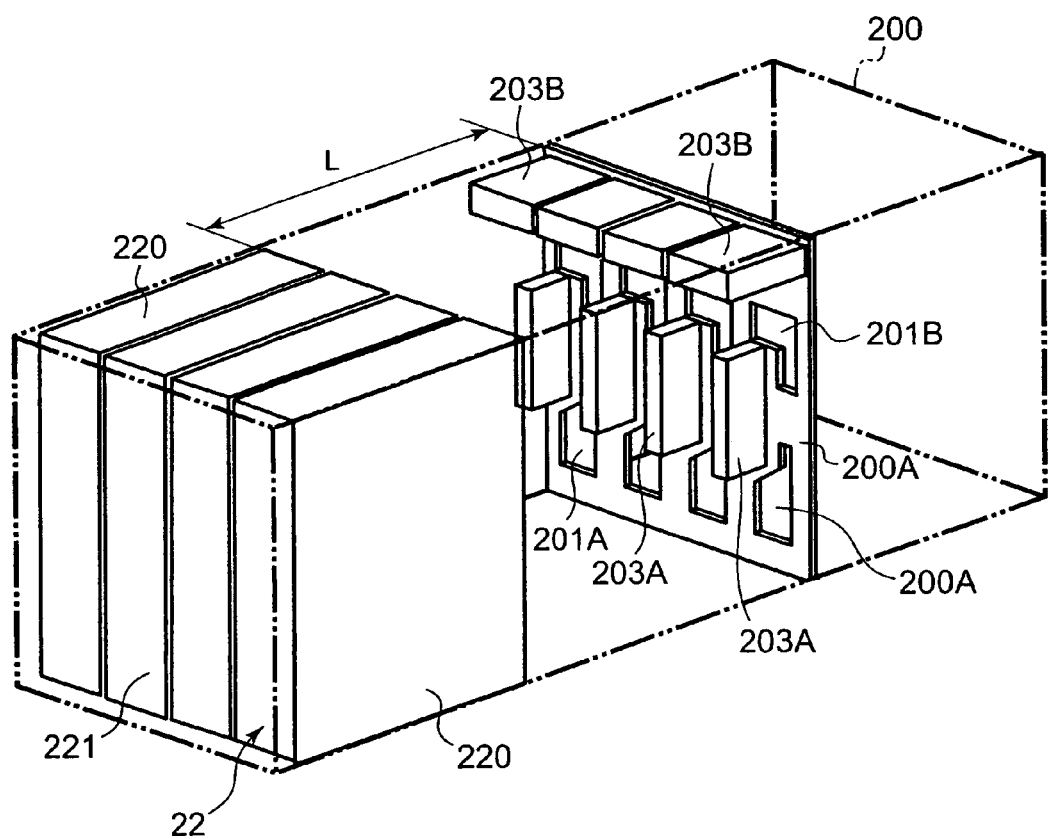
FIG. 19 is an explanatory diagram which shows the cooling air draft analysis model that is used to analyze the draft amount in model form.
Figure 20:
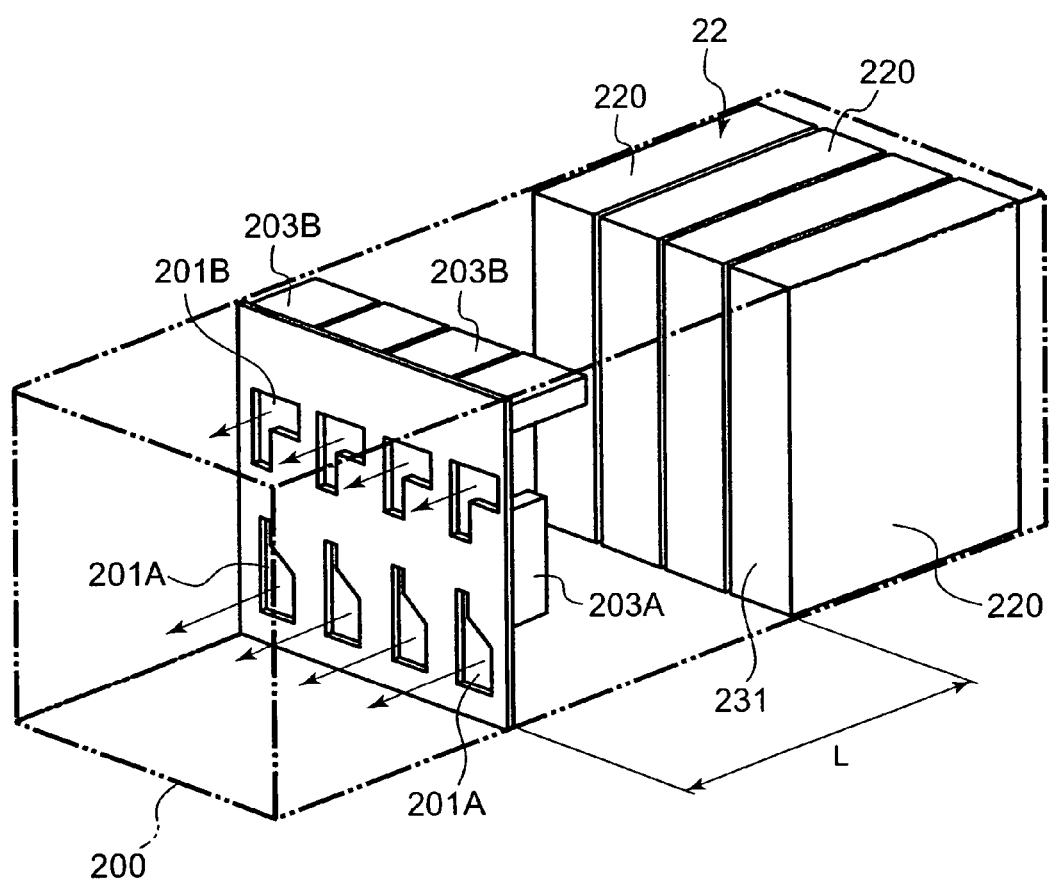
FIG. 20 is an explanatory diagram which shows the cooling air draft analysis model shown in FIG. 19 from the back surface side in model form.
Figure 21:
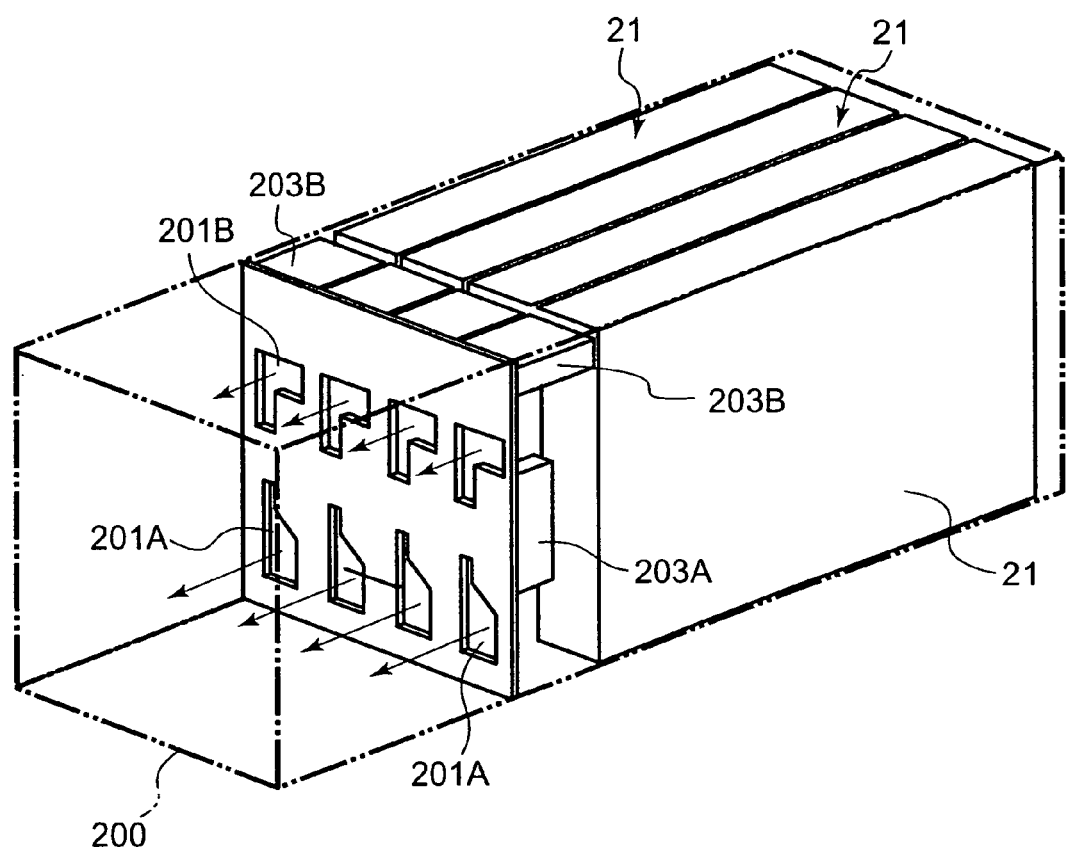
FIG. 21 is an explanatory diagram which shows the cooling air draft analysis model of the canister from the back surface side in model form.

An analysis of the draft amount will be performed with reference to FIGS. 19 through 22. FIGS. 19 and 20 show a cooling air draft model for the dummy canisters 22, and FIG. 21 shows a cooling air draft model for the canisters 21.

As is shown in the model illustrated in FIG. 19, the respective dummy canisters 22 and the back board 200A are separated by a dimension L. FIG. 20 shows the state of the model shown in FIG. 19 as seen from the side of the back board 200A. The cooling air draft that flows into the gaps between the dummy canisters 22 flows into the space between the respective dummy canisters 22 and the back board 200A. The length dimension of this space is L. The cooling air draft that flows into the space that is formed to the rear of the dummy canisters 22 flows into the housing 11 via respective exhaust ports 201A and 201B that are formed in the back board 200A.

FIG. 21 shows a cooling air draft model for the canisters 21. The canisters 21 are attached in close proximity to the back board 200A. The external cooling air draft respectively passes through the gaps between the respective canisters 21 and the interiors of the respective canisters 21, and flows into the housing 11 via the respective exhaust ports 201A and 201B of the back board 200A.

Figures 22A, 22B:
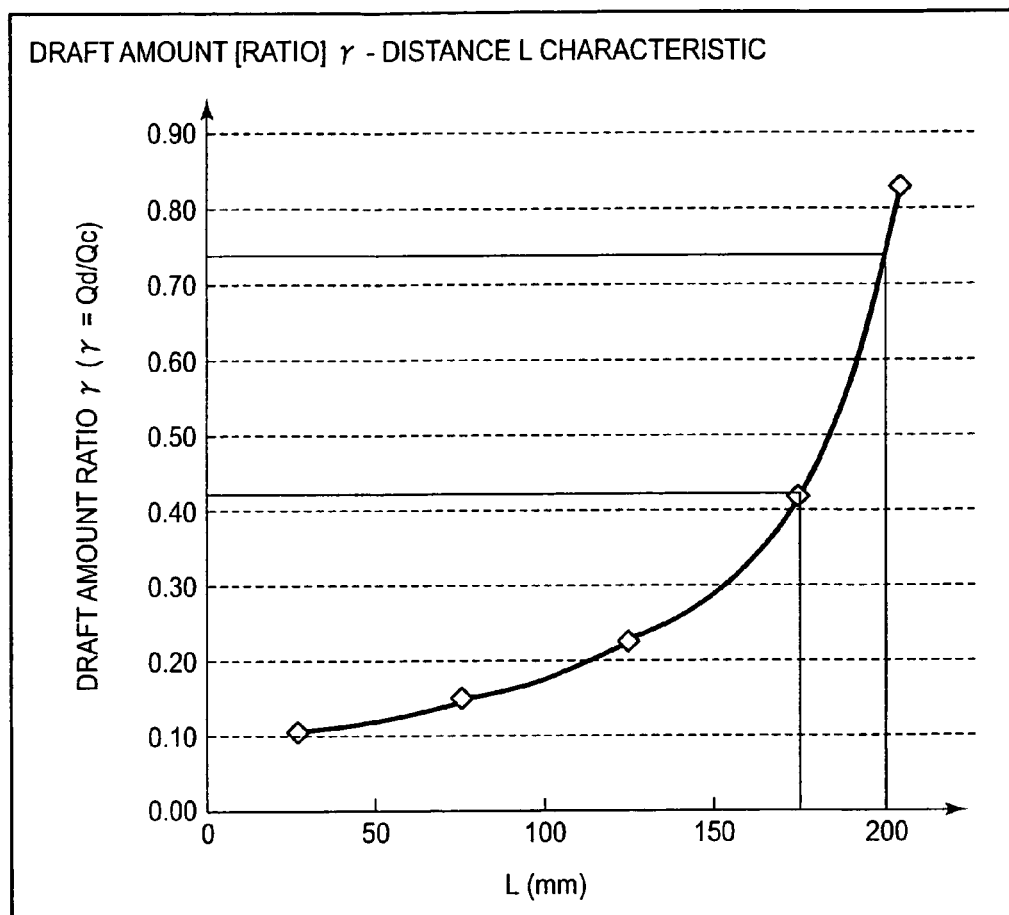
FIG. 22 is a characteristic graph which shows the relationship between the draft amount ratio and the separation dimensions.

FIG. 22 is a characteristic graph showing the relationship between the draft amount ratio $\gamma$ an the separation dimension L analyzed on the basis of the respective cooling air draft models described above. Here, the draft amount ratio $\gamma$ is a quantity that is obtained by dividing the amount Qd of the cooling air draft that is supplied to dummy canisters 22 by the amount Qc of the cooling air draft that is supplied to the canisters 21 ($\gamma = Qd/Qc$).

The draft amount ratio $\gamma$ increases as the separation dimension L between the dummy canisters 22 and the back board 200A increases. An increase in the draft amount ratio $\gamma$ means that the amount Qd of the draft supplied to the dummy canisters 22 and the amount Qc of the draft supplied to the canisters 21 approach each other. As is shown in FIG. 22 (b), for example, in a case where L is 205 mm, $\gamma$ is 0.83. In a case where L is 175 mm, $\gamma$ is 0.42. In a case where L is 125 mm, $\gamma$ is 0.23. Furthermore, in cases where the dummy canisters 22 of the present embodiment are not used, $\gamma$ is set at 1.17.

Here, for example, in cases where the dummy canisters 22 of the present embodiment are not used, dust adheres to and accumulates in the connectors 203 for approximately 3 years. The amount of dust that adheres to the empty connectors 203 is proportional to the amount of the cooling air draft that contacts the empty connectors 203. Specifically, the amount of this cooling air draft is proportional to the operating time of the storage device 10. Here, the number of years of operation of the storage device 10 is tentatively set at eight years. The upper limit value of the draft amount ratio $\gamma$ at which dust does not accumulate in the empty connectors 203 even after this operating period of eight years has elapsed can be determined by multiplying the value of $\gamma$ in a case in which the dummy canisters 22 of the present embodiment are not used by (3/8) ($\gamma \circledR 1.17 \times 3/8 \circledR 0.44$).

If the draft amount ratio $\gamma$ is 0.44 or less, the amount Qd of the cooling air draft that is supplied to the dummy canisters 22 is reduced, and the amount of dust that adheres to the empty connectors 203 also shows the greatest drop. Accordingly, if reference is made to FIG. 22, it is seen that the upper limit value of the separation dimension L at which the draft amount ratio $\gamma$ is 0.44 or less is approximately 175 mm.

Meanwhile, as the separation distance L is shortened, the amount of the draft that is supplied to the dummy canisters 22 drops, so that the total amount of the draft that is required for the cooling of the canisters 21 drops, thus improving the cooling efficiency. Accordingly, from the standpoint of the cooling efficiency, it is desirable to shorten L as far as possible. However, if L is shortened, the length of the dummy canisters 22 in the attachment direction increases, so that the size of the dummy canisters 22 is increased. Such an increase in the size of the dummy canisters 22 leads to an increase in the manufacturing cost, an increase in the storage space required for the dummy canisters 22 and the like. Accordingly, it is desirable that L be 140 mm or greater.

Accordingly, in the present embodiment, considering the cooling efficiency, dust-proof performance, compact size and the like, the dimension L of the separation from the back board 200A is set at 140 mm to 175 mm (145 mm$\leq$L$\leq$175 mm).

On the other hand, in the case of dummy canisters 22 that are adjacent to canisters 21, it is necessary to increase the value of the draft amount ratio $\gamma$, and to increase the amount of the draft that flows into the adjacent canisters 21. Accordingly, in the present embodiment, 0.75 is selected as the target value of the draft amount ratio $\gamma$, and the lower limit value of the separation dimension L is set at 200 mm (L$\geq$200 mm).

In the present embodiment, because of the above, the respective length directions are made adjustable so that the dimension L of separation from the back surface side to the back board 200A is 200 mm or greater in the case of dummy canisters 22 that are adjacent to canisters 21, and so that the separation dimension L is 145 mm to 175 mm in the case of other dummy canisters 22.

Since the present embodiment is constructed as described above, this embodiment possesses the following merits. In the present embodiment, a construction is used in which dummy canisters 22 that are adjacent to canisters 21 are set in the first shape, and the separation dimension L to the back board 200A is lengthened. Accordingly, the inflow resistance around dummy canisters 22 that are adjacent to canisters 21 can be reduced, so that a larger cooling air draft can be obtained. As a result, a larger cooling air draft can be supplied to canisters 21 that are adjacent to dummy canisters 22 in the first shape, so that these canisters 21 can be cooled to approximately the same degree as other canisters 21 that are not adjacent to dummy canisters. Specifically, the occurrence of a large variation in the draft amount between the respective canisters 21 can be suppressed, so that the cooling efficiency can be improved.

In the present embodiment, a construction is used in which dummy canisters 22 that are not adjacent to canisters 21 (non-adjacent dummy canister group) are set in the second shape, so that the separation dimension L to the back board 200A is shortened in relative terms, and the amount of the cooling air draft that is supplied to these dummy canisters 22 is lowered. As a result, the amount of the draft that is supplied to the canisters 21 can be increased in relative terms, so that the cooling efficiency can be heightened.

In the present embodiment, the amount of the draft that flows through dummy canisters 22 other than those in the boundary area can be lowered; consequently, the total amount of the draft that is required for the cooling of the storage part 20 can be reduced. Accordingly, the output of the cooling fan 13 can be lowered, or the storage part 20 can be cooled using a smaller fan. As a result, the energy and cost required for cooling can be reduced; furthermore, the noise that is generated by the fan can be reduced.

In the present embodiment, since the amount of the draft that flows through the dummy canisters 22 can be lowered, the adhesion of dust to connectors 203 that are not used can be suppressed, so that the dust-proof performance can be improved.

In the present embodiment, since the respective dummy canisters 22 are constructed so that these dummy canisters 22 are respectively deformable, the dummy canisters 22 can be folded into a small size and stored at the time of storage. Accordingly, the storage space required for the dummy canisters 22 can be reduced, thus improving the maintenance characteristics. Furthermore, since the respective dummy canisters 22 are respectively constructed with the same deformable structure, the manufacturing cost of the dummy canisters 22 can be reduced. In other words, although a construction in which two types of dummy canisters, i.e., a dummy canister used exclusively for the first shape and a dummy canister used exclusively for the second shape, are respectively prepared is also conceivable, the manufacturing cost of the dummy canisters is increased in this case; furthermore, storage and the like are also bothersome. In the present embodiment, on the other hand, since a construction is used in which dummy canisters 22 with a deformable structure are employed, and the shape of these dummy canisters 22 is varied according to the attachment position, the manufacturing cost and maintenance cost can be reduced.

2. Second Embodiment

A second embodiment will be described with reference to FIGS. 23 through 29. In this embodiment, the dummy canisters 22A are constructed so that these dummy canisters 22A can expand and contract in the lateral direction (direction of disposition of the dummy canisters).

Figure 23:
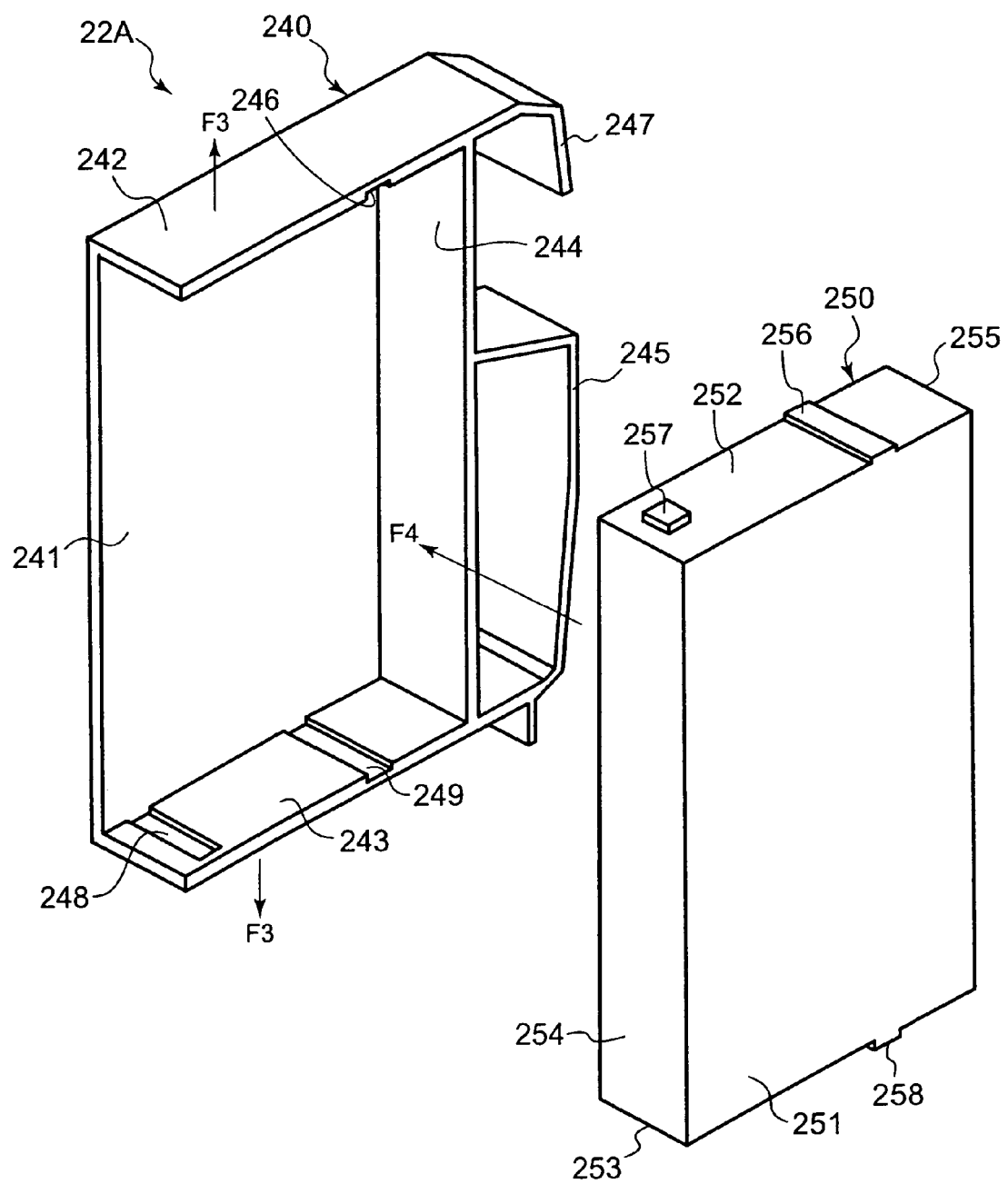
FIG. 23 is a perspective view which shows the dummy canister of the second embodiment in an exploded state.

FIG. 23 is a perspective view of one of the dummy canisters 22A in an exploded state. This dummy canister 22A can be constructed from a main part 240 on the left side facing the front surface (left side in FIG. 23), and a side part 250 that is inserted into this main part 240.

For example, the main part 240 can be constructed so that this main part 240 comprises a side wall 241, a ceiling part 242 that is integrally formed on the upper part of the side wall 241, a bottom part 243 that is integrally formed on the lower part of the side wall 241, and a front wall 244 which is disposed on the end part of the side wall 242 so as to connect the ceiling part 242 and bottom part 243. A protruding part 245 and above-described a gripping part 247 are respectively disposed on the surface side of the front wall 244.

Furthermore, a guide groove 246 is formed in the undersurface side of the ceiling part 242, and a guide groove 249 is also formed in the upper surface side of the bottom part 243. Guide projections 256 and 258 on the side part 250 are respectively fitted into these respective guide grooves 245 and 249 so that sliding movement is possible.

Another guide groove 248 is formed in the lower surface side of the bottom part 243. Furthermore, a guide groove 248 is also formed in the underside of the ceiling part 242. Stoppers 257 on the side part 250 are respectively fitted into these respective guide grooves 248 so that sliding movement is possible.

For example, the side part 250 is formed in the shape of a square tube with a bottom. For instance, the side part 250 can be constructed so that this side part 250 comprises a side wall 251 that faces the side wall 241 of the main part 240, a ceiling part 252 that is integrally formed on the upper part of this side wall 251, a bottom part 253 that is integrally formed on the lower part of the side wall 251, and a rear wall 254 and side wall 255 that are disposed on the side wall 251 so as to connect the ceiling part 252 and bottom part 253.

Furthermore, a guide projection 256 and a stopper 257 are integrally formed on the upper surface side of the ceiling part 252. Moreover, a guide projection 258 and a stopper 257 (not shown in the figures) are also integrally formed on the undersurface side of the bottom part 253.

When the dummy canister 22A is to be assembled, the user pushes open the ceiling parts 242 and bottom part 243 of the main part 240 in the directions respectively indicated by the arrows F3, and inserts the side part 250 into the pushed-open main part 240 from the direction indicated by the arrow F4.

Figure 24:
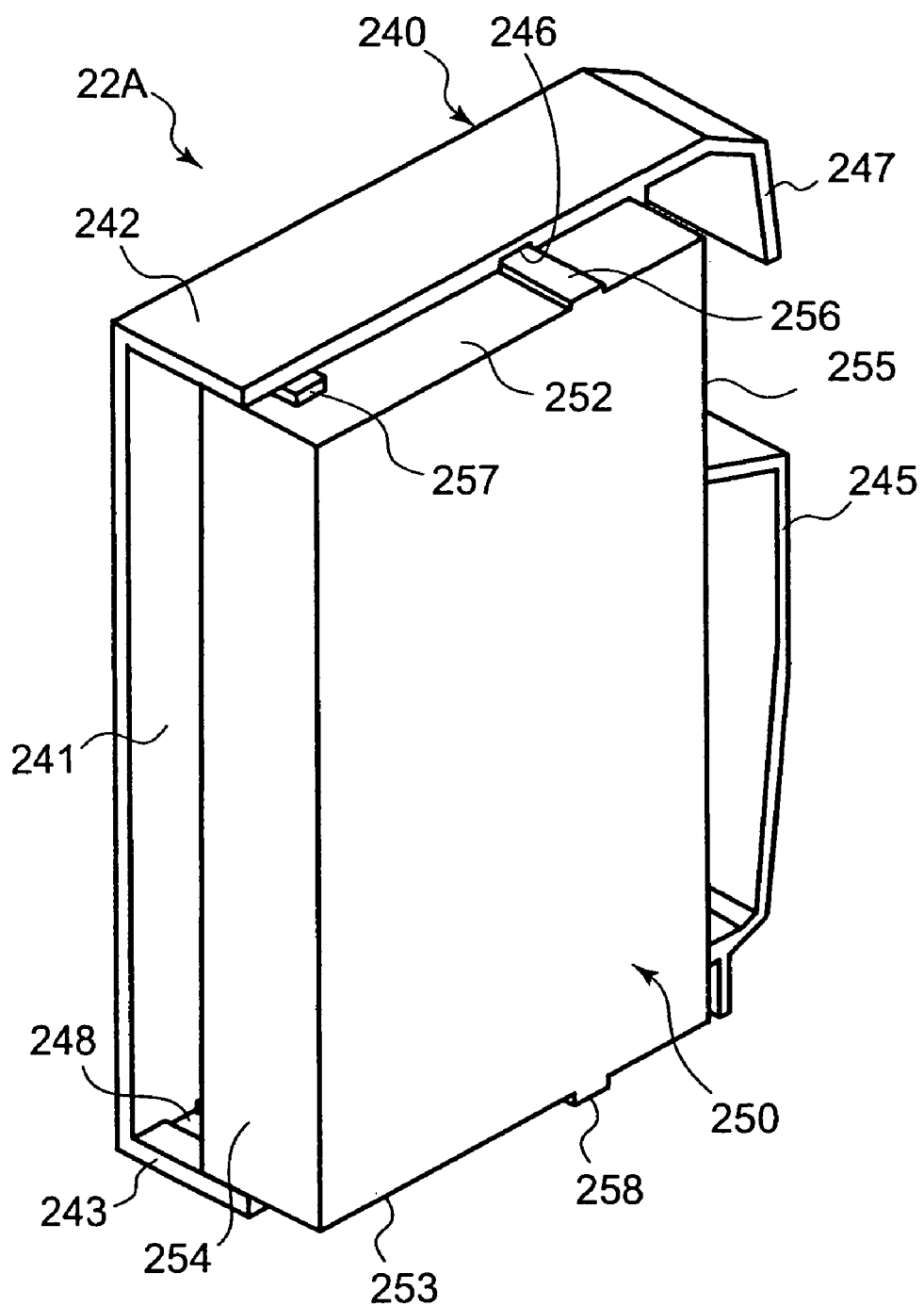
FIG. 24 is a perspective view which shows the installation of the dummy canister.
Figure 25:
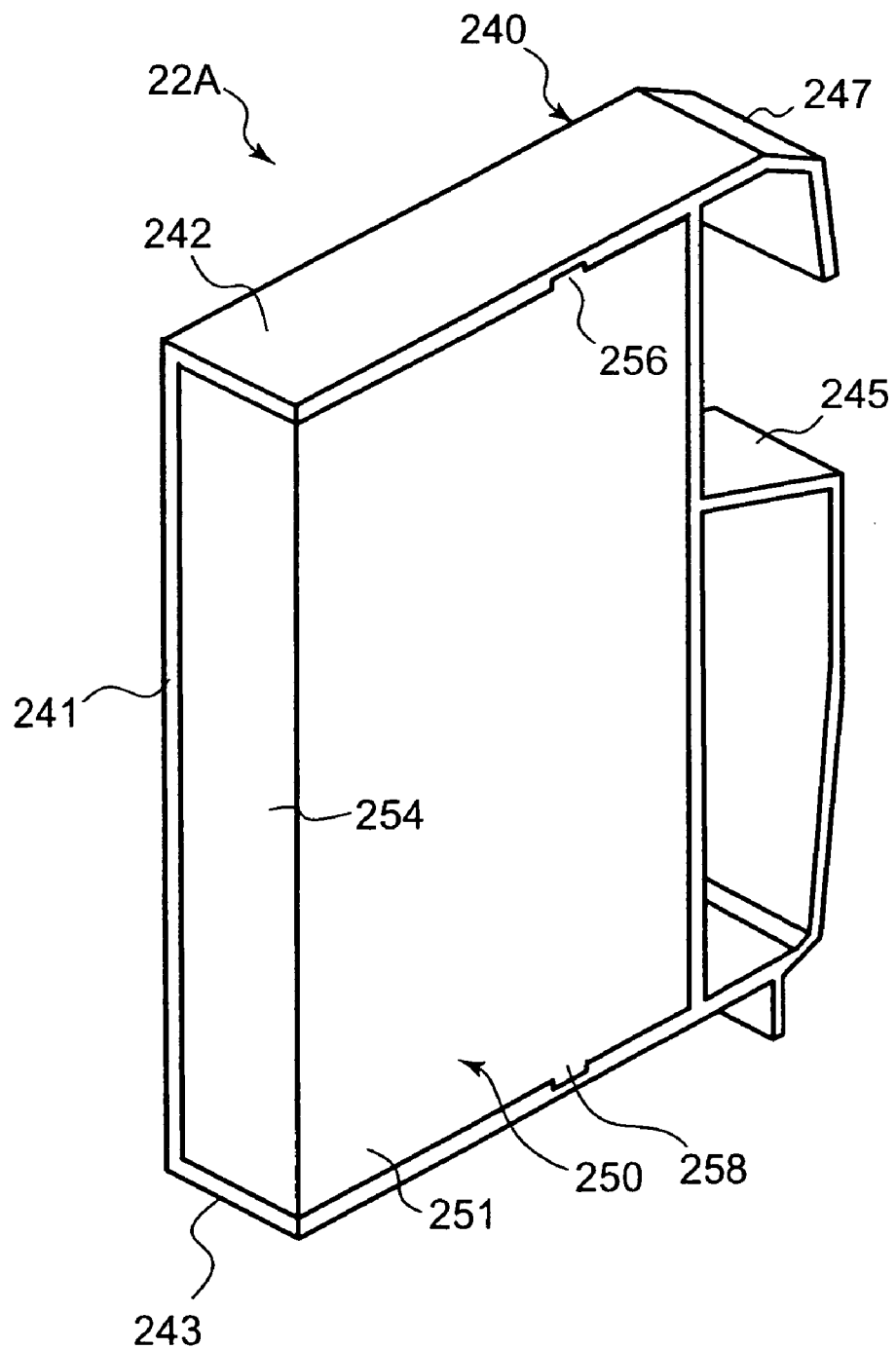
FIG. 25 is a perspective view showing a state in which the dummy canister is set in the first shape.

As is shown in FIG. 24, when the side part 250 is to be fitted into the main part 240, the respective guide projections 256 and 258 are inserted and positioned in the respective guide grooves 246 and 249, and the respective stoppers 257 are respectively inserted and positioned in the respective guide grooves 248. When the side part 250 is inserted as far as the deepest part of the main part 240, the state shown in FIG. 25 is assumed. The state shown in FIG. 25 indicates one example of the first shape of the dummy canisters 22A. Furthermore, a state in which the side part 250 is pushed slightly further into the main part 240 from the state shown in FIG. 24 and stopped indicates one example of the second shape. In other words, in the first shape, the lateral width is relatively narrow, and in the second shape, the lateral width is relatively broad.

Figure 26:
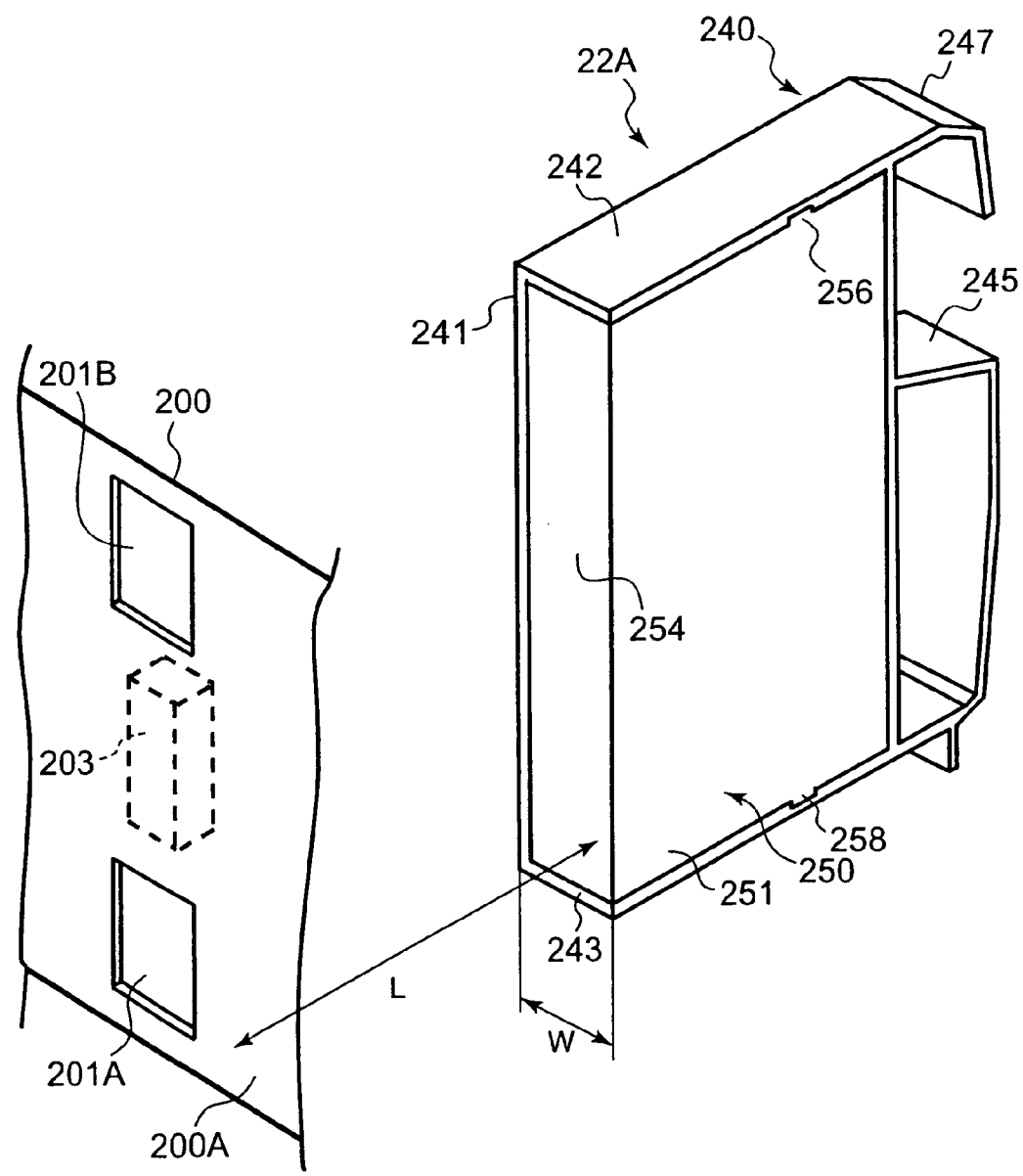
FIG. 26 is a perspective view which shows the relationship between the dummy canister and the back board in model form.

FIG. 26 is a model diagram which shows the relationship between the dummy canisters 22A and the back board 200A. Here, the rear walls 254 of the dummy canisters 22A and the back board 200A are separated by a dimension L. Furthermore, the dummy canisters 22A of the present embodiment do not expand and contract in the attachment direction of the dummy canisters 22A, but instead expand and contract in the disposition direction of the dummy canisters 22A. Accordingly, this separation dimension L is a fixed value. On the other hand, the width dimension W of the dummy canisters 22A varies in at least two stages. The width dimension W2 of the second shape is shorter than the width dimension W1 of the first shape (W2>W1).

Figures 27A, 27B:
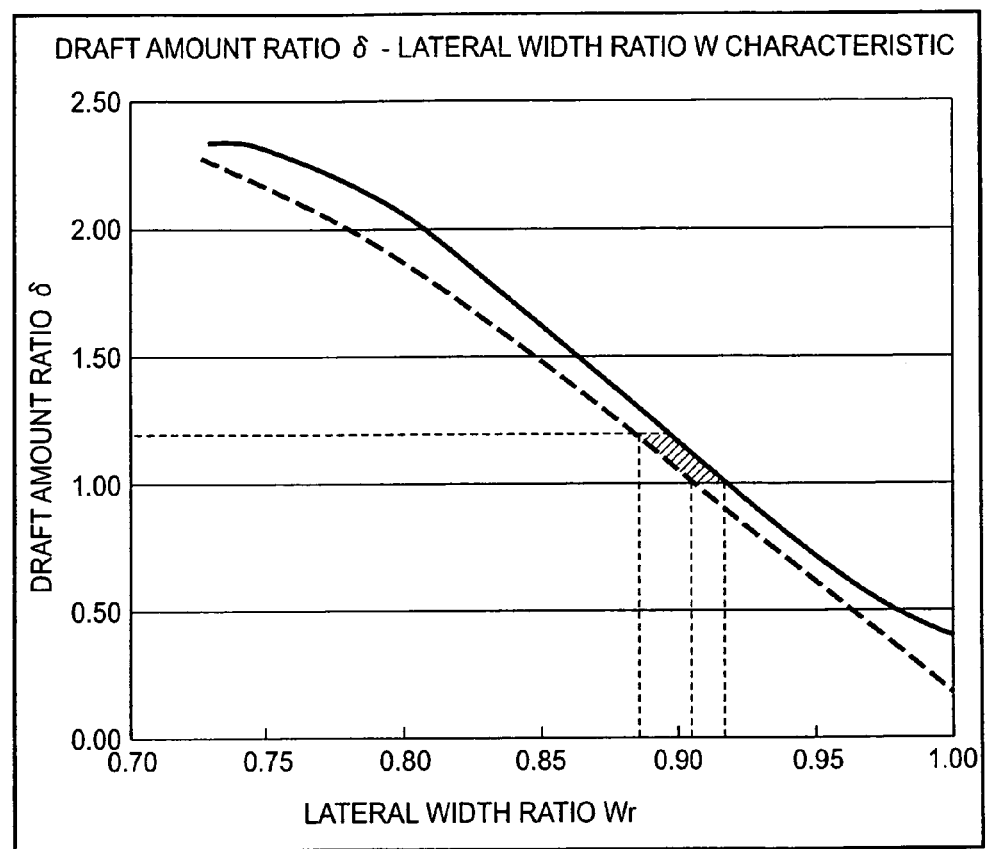
FIG. 27 is a characteristic graph which shows the relationship between the draft amount ratio and the separation dimensions.

FIG. 27 is a characteristic graph which shows the relationship between the draft amount ratio δ and the lateral width ratio Wr. The characteristic curve indicated by a thick solid line in FIG. 27 (a) shows a case in which the separation dimension L is set at 175 mm, and the characteristic curve indicated by the thick dotted line shows a case in which the separation dimension L is set at 140 mm.

The lateral width ratio Wr is a value obtained by dividing the width dimension W of the dummy canisters 22A by the width dimension Wc of the canisters 21 (Wr=W/Wc). Like the draft amount ratio γ, the draft amount ratio δ is a value obtained by dividing the amount Qd of the cooling air draft that is supplied to the dummy canisters 22A by the amount Qc of the cooling air draft that is supplied to the canisters 21 (δ=Qd/Qc).

As is shown in FIG. 27, the draft amount ratio δ drops as the width dimension W of the dummy canisters 22A is caused to approach the width dimension of the canisters 21 (i.e., as Wr approaches 1). This drop in the draft amount ratio δ signifies a drop in the amount of the draft that flows into the gaps between the dummy canisters 22A. In other words, this means that the canisters 21 can be cooled by a smaller draft amount as the draft amount ratio δ decreases. Accordingly, the draft amount ratio δ also serves as a value that indicates the cooling performance of the dummy canisters 22A. The same thing may be said of the draft amount ratio γ in the abovementioned embodiment.

In the present embodiment, the dummy canisters 22A that are adjacent to canisters 21 are set in the first shape, so that the draft amount ratio δ of these dummy canisters is increased, thus increasing the amount of the draft to the adjacent canisters 21. Furthermore, the other dummy canisters 22A that are not adjacent to canisters 21 are set in the second shape, so that the draft amount ratio δ of these dummy canisters is reduced, thus reducing the amount of the draft that flows into the spaces between the dummy canisters, so that the cooling efficiency is improved.

In order to effectively achieve this object, as one example, the lateral width ratio Wr of the dummy canisters 22A that are adjacent to canisters 21 is set so that the draft amount ratio δ is in the range of 1.0 to 1.2. It is seen from FIG. 27 that the lateral width ratio Wr at which the draft amount ratio δ is 1.0 to 1.2 is in vicinity of 0.90.

On the other hand, the lateral width ratio Wr of the dummy canisters 22A that are not adjacent to canisters 21 is set at 1.0, thus reducing the amount of the draft that is supplied to these respective dummy canisters 22A, so that the cooling efficiency is heightened. In a case where the lateral width ratio Wr is 1.0, this indicates that the width dimension W of the dummy canisters 22A and the width dimension Working configuration of the canisters 21 are equal (W=Wc).

FIG. 28 is an explanatory diagram showing the draft amount inside the chassis 200. The amount Q9 of ht cooling air draft that flows into the exhaust ports 201 after passing around the dummy canister 22A (N5) that is adjacent to the canister 21 (N4) is approximately 1.1.

By thus setting the width dimension of the dummy canister 22A (N5) that is adjacent to a canister 21 at a value that is shorter than the width dimension of the canisters 21 (the width dimension of dummy canisters that are not adjacent to canisters 21), it is possible to increase the gap between N4 and N5, thus increasing the draft amount. As a result, the amount of the draft that is supplied to adjacent canister 21 (N4) can b increased, and a draft amount comparable to that of the other canisters 21 (N1) through (N3) can be ensured.

FIG. 29 shows a draft amount table T1A similar to that shown in FIG. 18. It is indicated in this table T1A how the draft amount required for cooling varies according to the mounting rate of the dummy canisters 22A. Furthermore, the variation in the draft amount is show both for a case in which the separation dimension L is 175 mm and a case in which the separation dimension L is 140 mm. Specifically, the present embodiment can be applied to a plurality of cases, i.e., a case in which the separation dimension L is 175 mm, and a case in which the separation dimension L is 140 mm.

Furthermore, these numerical values (L=175 mm, L=140 mm) are examples; the present invention can also be used with other values.

Effects and merits similar to those of the first embodiment described above can also be obtained in the present embodiment constructed as described above.

3. Third Embodiment

A third embodiment will be described with reference to FIGS. 30 and 31. In the present embodiment, specified guidance messages are sent to the user when a canister 21 is attached to the storage part 20 (addition), and when a canister 21 is removed from the storage part 20 (removal).

Figure 30:
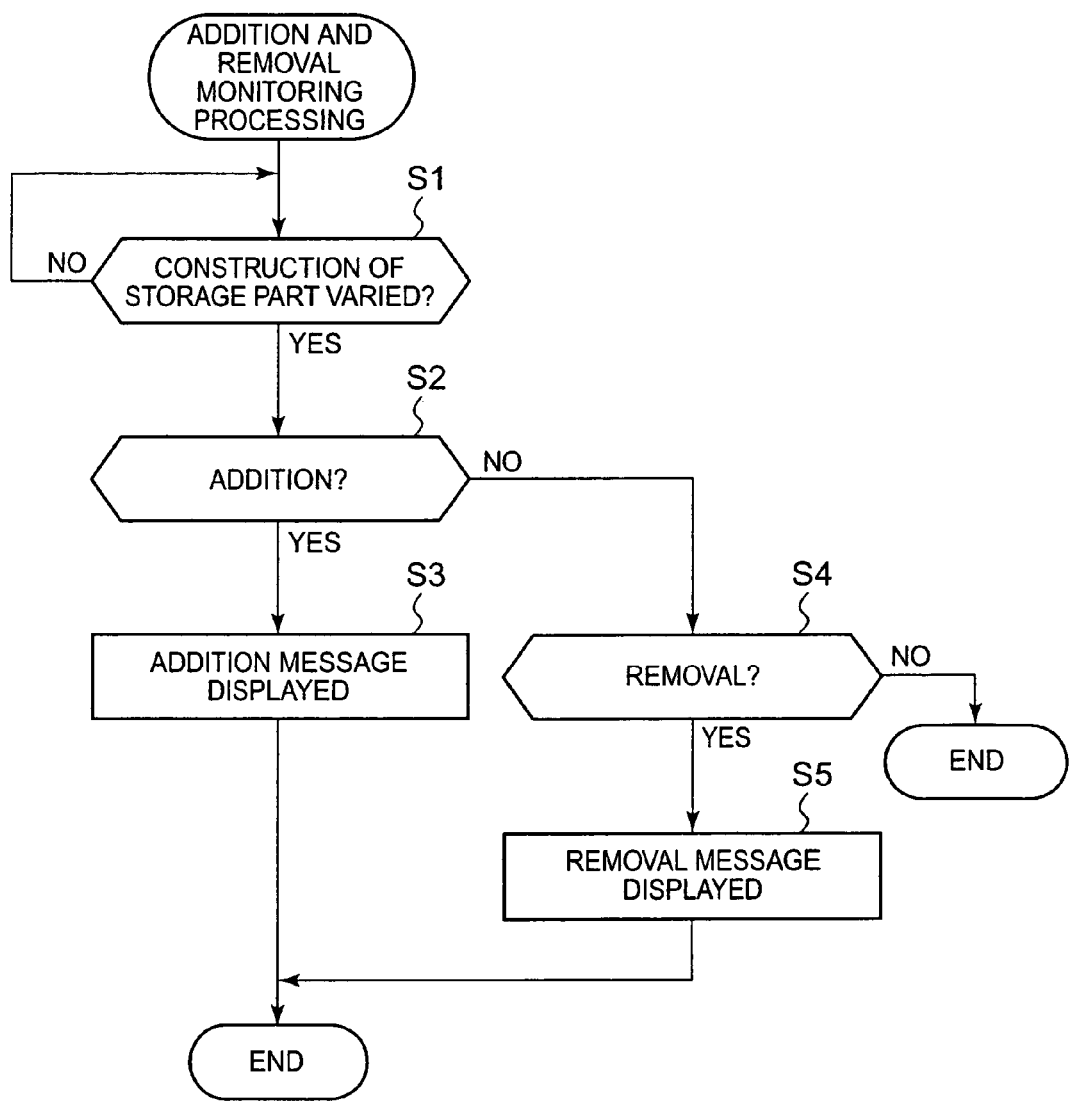
FIG. 30 is a flow chart of the canister addition and removal monitoring processing in a third embodiment.

FIG. 30 is a flow chart which shows an outline of addition and removal monitoring processing. For example, this processing is performed by the SVP 160. First, on the basis of information from the DKA 120, the SVP 160 judges whether or not the construction of the storage part 20 has been altered (S1). Here, alterations of the construction of the storage part 20 includes the addition or removal of canisters 21.

In cases where the construction of the storage part 20 has varied (S1: YES), the SVP 160 judges whether or not a canister 21 has been added (S2). In cases where a canister 21 has been added (S2: YES), the SVP 160 displays a specified addition message on the terminal screen of the control terminal M1 (S3).

In cases where a canister 21 is removed (S4: YES), the SVP 160 displays a specified removal message on the terminal screen of the control terminal 31 (S5). Furthermore, in the case of an alteration other than the addition or removal of a canister 21 (S4: NO), the SVP 160 ends the processing.

Figure 31:
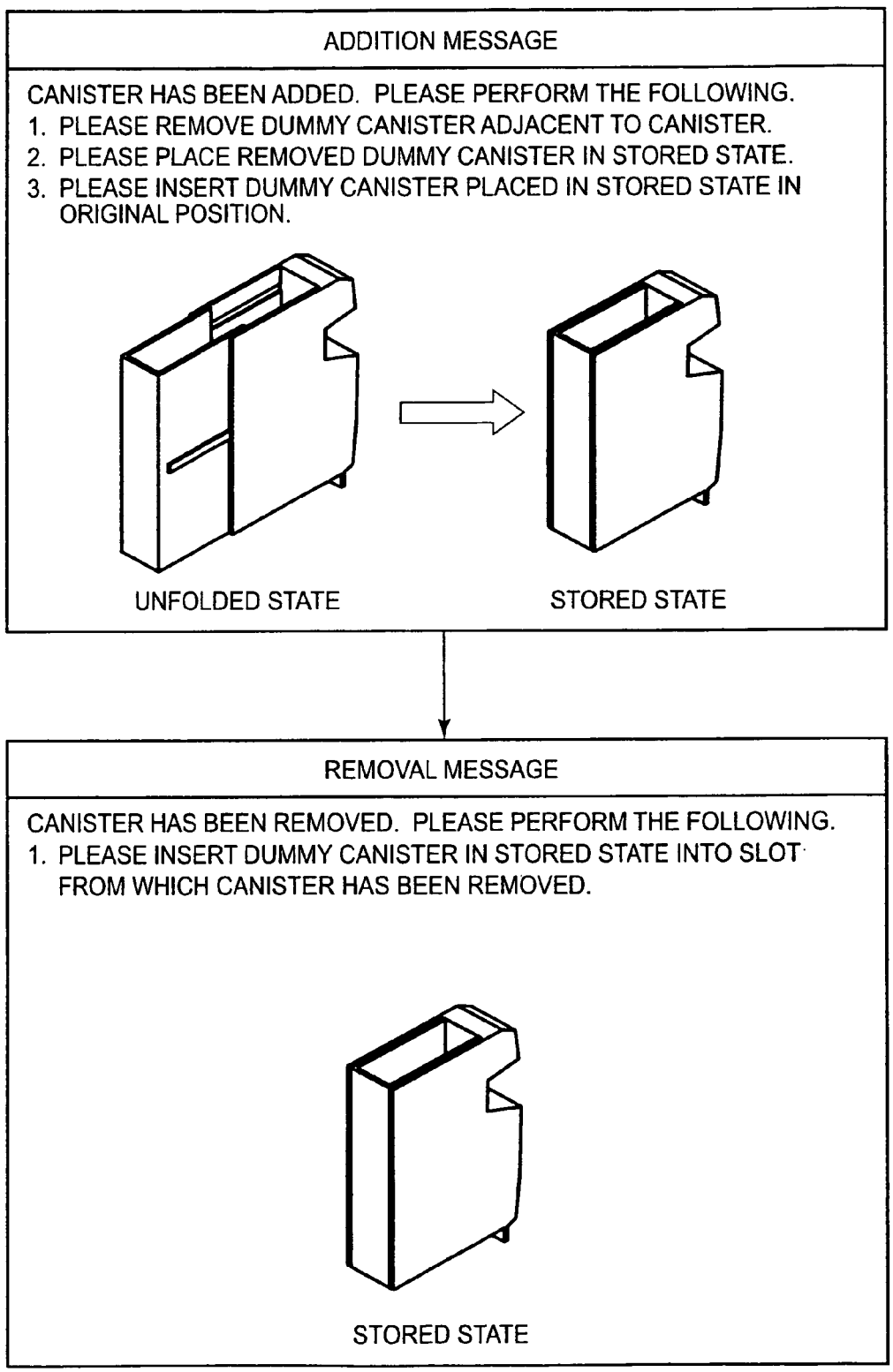
FIG. 31 is an explanatory diagram respectively showing the addition message and the removal message.

Examples of an addition message and a removal message are shown in FIG. 31. In the addition message, for example, the shape setting procedure for the dummy canisters 22 at the time of canister addition is indicated, as "1. Please remove dummy canister adjacent to canister.", "2. Please place removed dummy canister in stored state (first shape).", "3. Please insert dummy canister placed in stored state in original position." or the like. Furthermore, concrete shape variations of the dummy canisters 22 are shown in the figures along with this procedure.

In the removal message, for example, a procedure such as "1. Please insert dummy canister in stored state into slot from which canister has been removed." or the like is indicated.

In the present embodiment, messages are sent to the user at the time of addition or removal of canisters 21. Accordingly, when a canister 21 is added or removed, the user can be prevented from forgetting to set the dummy canisters 22 adjacent to the canister 21 in the first shape, so that the convenience of the system is improved.

4. Fourth Embodiment

Figure 32:
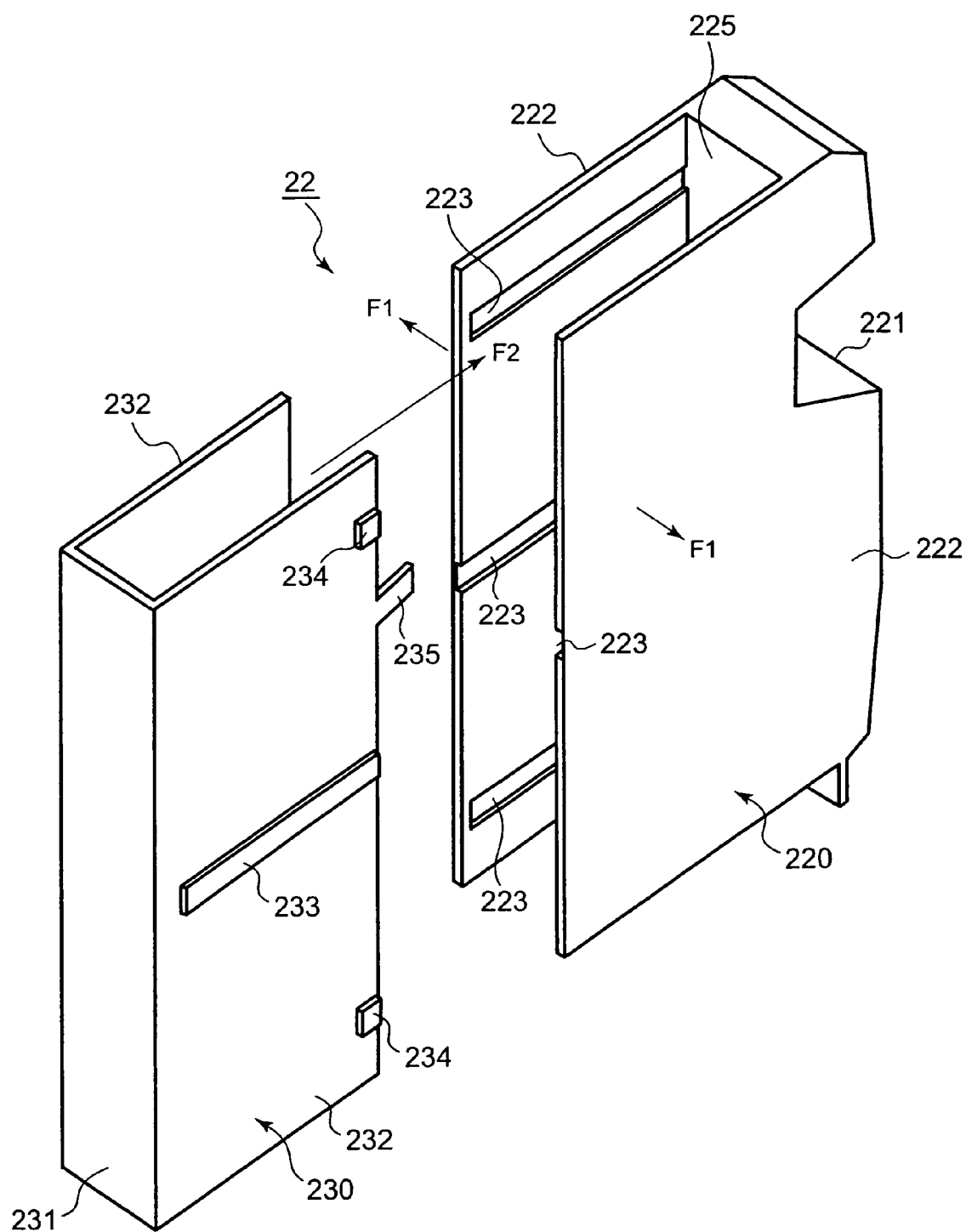
FIG. 32 is a perspective view showing the dummy canister of the fourth embodiment in an exploded state.

A fourth embodiment will be described on the basis of FIGS. 32 through 34. In the present embodiment, a structure for notifying the outside of shape changes in the dummy canisters 22 is disclosed.

For example, a protruding part 235 used for notification is integrally formed on the rear part 230 of each dummy canister 22 so that this protruding part 235 is caused to protrude to the outside from the front end part of one of the side walls 232. Furthermore, as is shown in the left side of FIG. 34, an opening part 226 that corresponds to the protruding part 235 used for notification is disposed on the front wall 221 of the front part 220.

Figure 33:
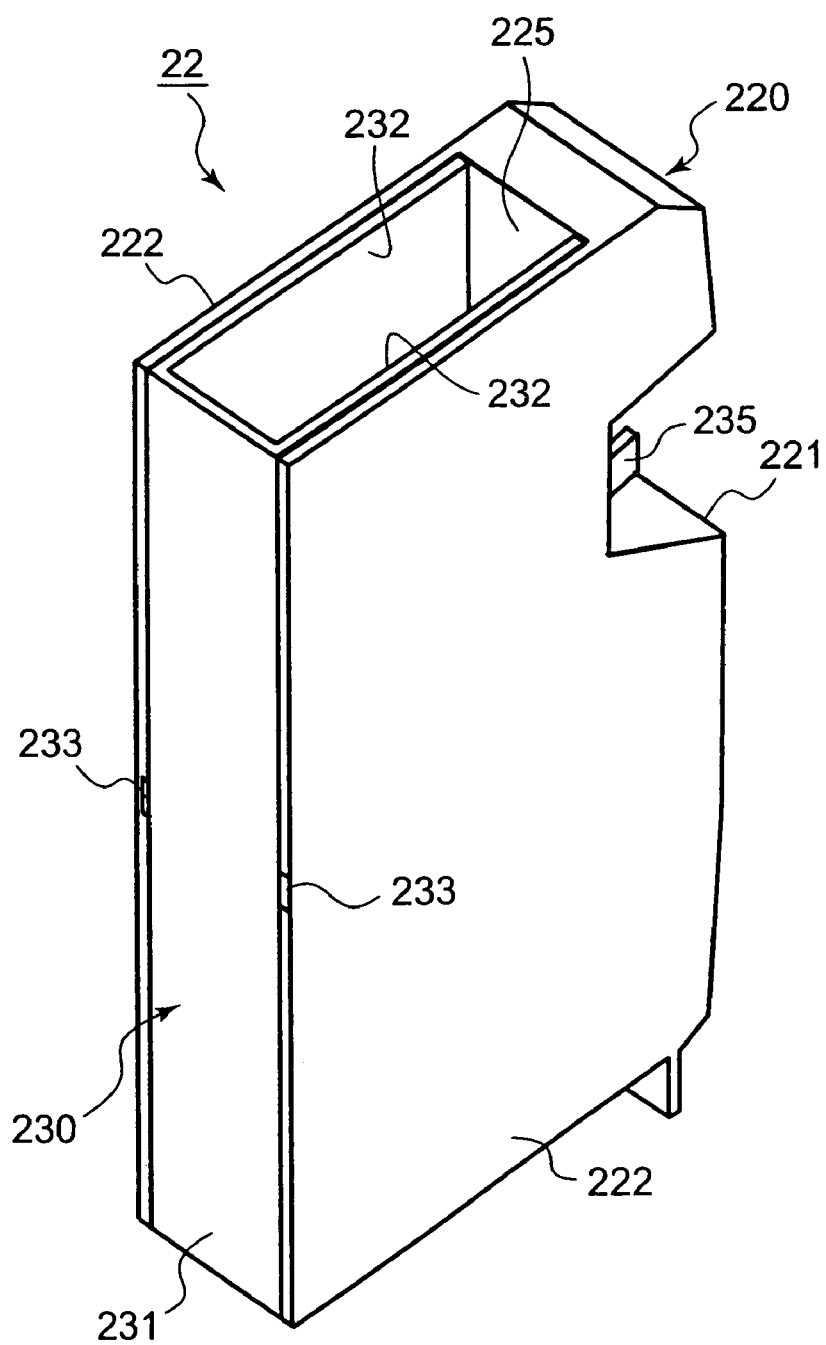
FIG. 33 is a perspective view showing a state in which the dummy canister is assembled and set in the first shape.

FIG. 33 shows a case in which a dummy canister 22 is assembled and set in the first shape. When a dummy canister 22 is set in the first shape, the protruding part 235 used for notification protrudes slightly to the outside from the opening part 226.

Figure 34:
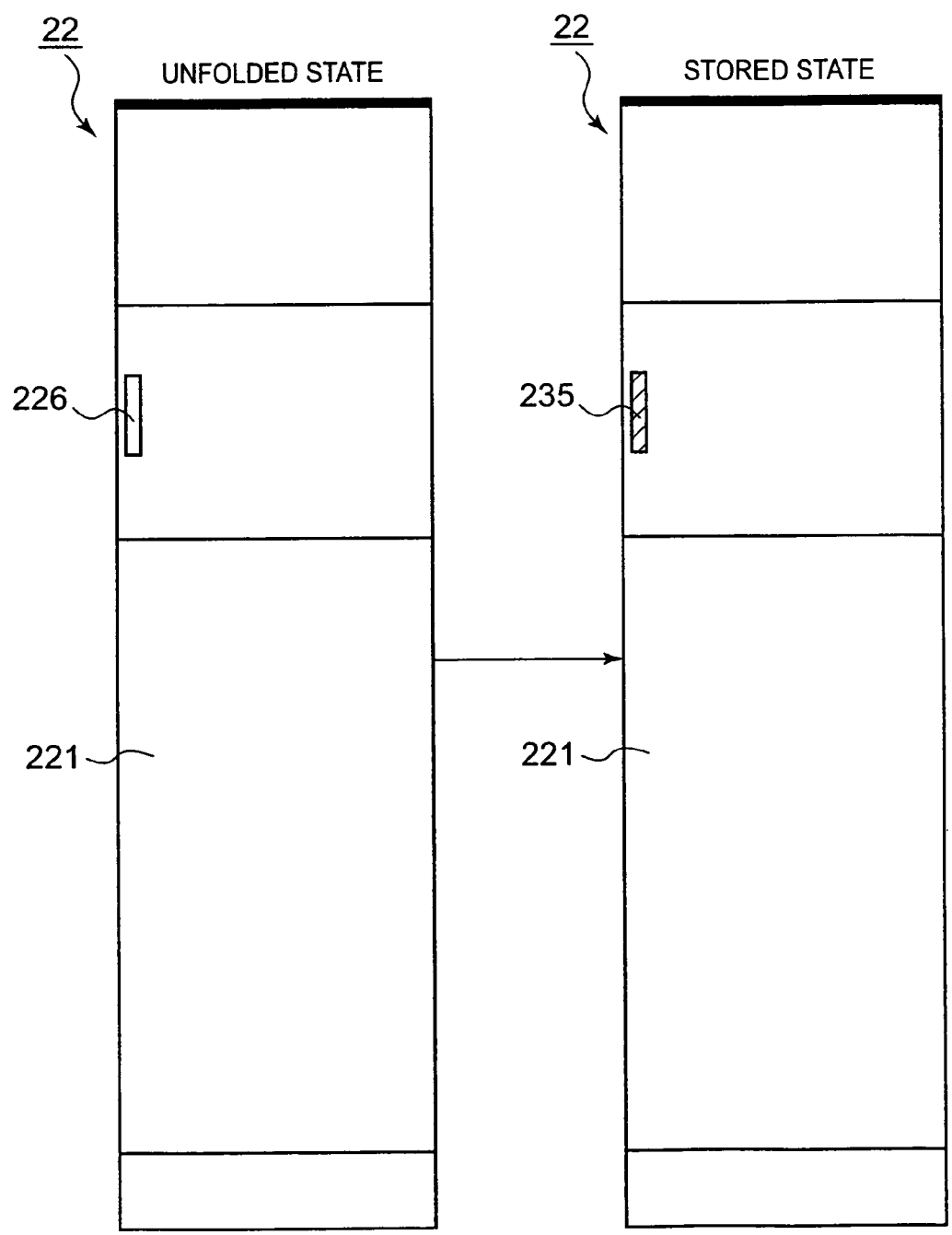
FIG. 34 is a front view showing cases in which the dummy canister is set in the first shape and second shape.

FIG. 34 shows a front view of a case in which a dummy canister 22 is set in an unfolded state (second shape) and a case in which this dummy canister 22 is set in a stored state (first shape). As is shown in FIG. 34, in case where the dummy canister 22 is set in the second shape, the protruding part 235 used for notification does not protrude from the opening part 226, but is rather sunk into the back side of the front wall 221. On the other hand, in cases where the dummy canister 22 is set in the first shape, the protruding part 235 used for notification is exposed via the opening part 226.

Accordingly, the user can ascertain the shape of a dummy canister 22 merely by visually inspecting the state of the protruding part 235 used for notification. Since there is no need to confirm this by removing the dummy canister 22 from the chassis 200, the working characteristics are improved. Furthermore, the visual recognition characteristics can be heightened by coloring the front surface of the protruding part 235 used for notification. Moreover, since it is sufficient if the state of the protruding part 235 used for notification can be confirmed, a construction may also be used which is devised so that in cases where the dummy canister 22 is set in the first shape, the tip end of the protruding part 235 used for notification is not caused to protrude from the opening part 226, but is instead positioned on the same plane as the opening part 226, or is positioned in a position that is located slightly further to the inside than the opening part 226.

5. Fifth Embodiment

Figure 35:
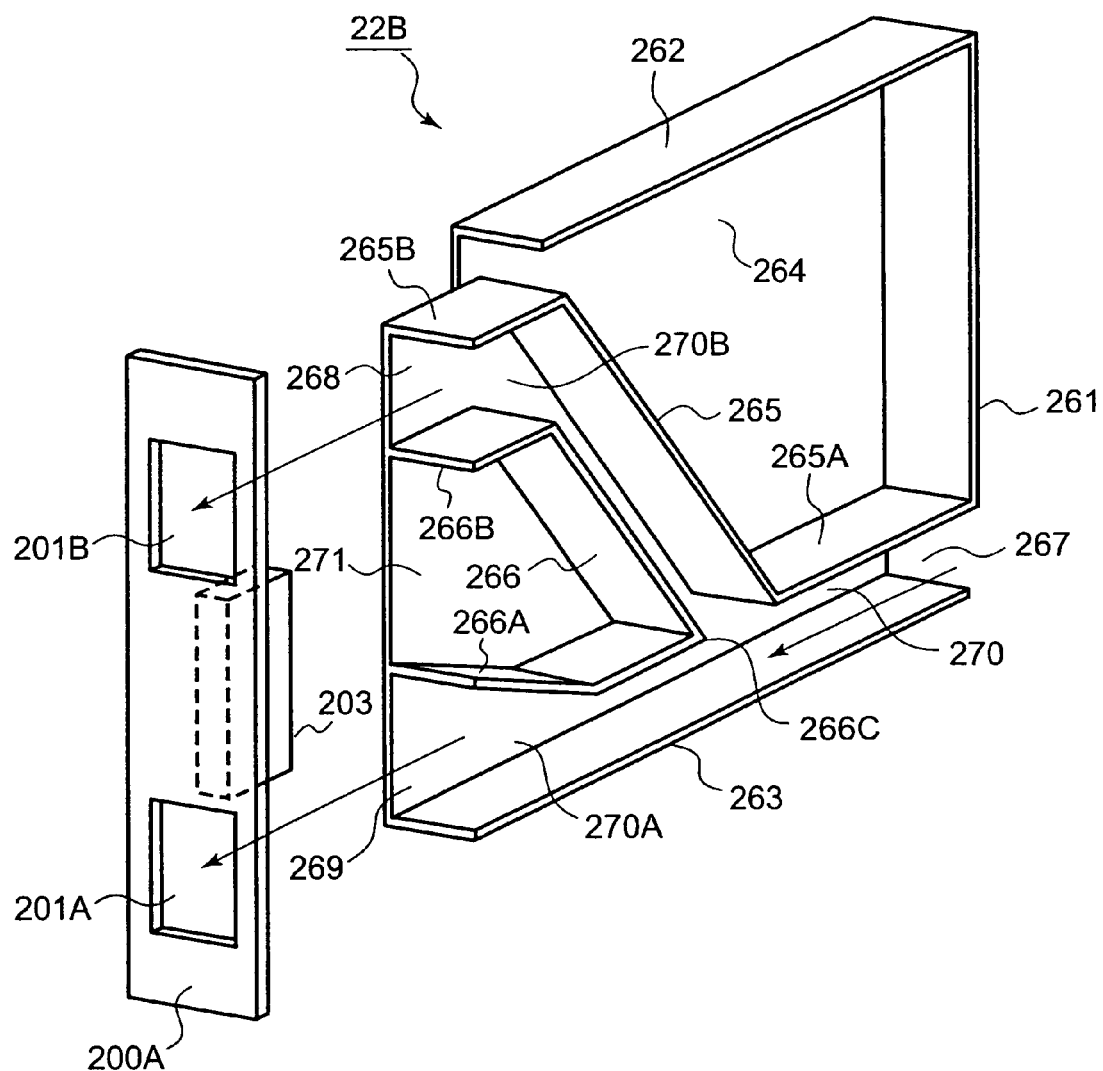
FIG. 35 is a perspective view of the dummy canister of the fifth embodiment.

A fifth embodiment will be described with reference to FIG. 35. In this embodiment, a duct part 270 is disposed inside each communications controller 22B so that the cooling air draft does not directly contact the connector 203.

For example, the dummy canister 22B comprises a front wall 261, a ceiling part 262, a bottom part 263, a side wall 264, an upper partition wall 265, and a lower partition wall 266, and is formed in a shape that models the canisters 21.

Furthermore, an inlet port 267 is formed in the lower side of the front wall 261, and two outlet ports 268 and 269 that are separated in the vertical direction are respectively formed in the rear surface of the dummy canister 22B. Furthermore, the duct part 270 is disposed inside the dummy canister 22B so that the inlet port 268 and the respective outlet ports 268 and 269 communicate with each other.

The duct part 270 respectively branches into two flow passages 270A and 270B in a bent part 266C of the lower partition wall 266. The lower flow passage 270A causes the outlet port 269 and the inlet port 267 to communicate. The upper flow passage 270B causes the outlet port 268 and the inlet port 267 to communicate.

The lower outlet port 268 is formed by being surrounded on three sides by the wall part 266A of the lower partition wall 266, the side wall 264 and the bottom part 263. The remaining surface (the surface in front in FIG. 35) is open. The upper outlet port 269 is formed by being surrounded on three sides by the wall part 266B of the lower partition wall 266, the side wall s64 and the wall parts 265B of the upper partition wall 265. The remaining surface is open. Furthermore, the inlet port 267 is formed by being surrounded on three sides by the bottom part 263, the side wall 264 and the wall part 265A of the upper partition wall 265. The remaining surface is open.

In cases where a dummy canister 22B is mounted in the chassis 200, the lower outlet port 269 is connected to the lower exhaust port 201A formed in the back board 200A. Similarly, the upper outlet port 268 is connected to the upper exhaust port 201B formed in the back board 200A. Furthermore, in cases where a dummy canister 22B is mounted in the chassis 200, the system is arranged so that the connector 203 is clamped from above and below by the wall parts 266A and 266B of the lower partition wall 266. As a result, in cases where such a dummy canister 22B is attached to the chassis 200, the connector 203 is accommodated in a space 271 formed by the side wall 264 and the lower partition wall 266. However, one surface of this space 271 (which is perpendicular to the direction in which the cooling air draft flows through) is open.

Thus, in this dummy canister 22B, the surface on the front side in the figures is open; however, this another adjacent dummy canister 22B or a canister 21 is located in close proximity to this open surface.

Figure 36:
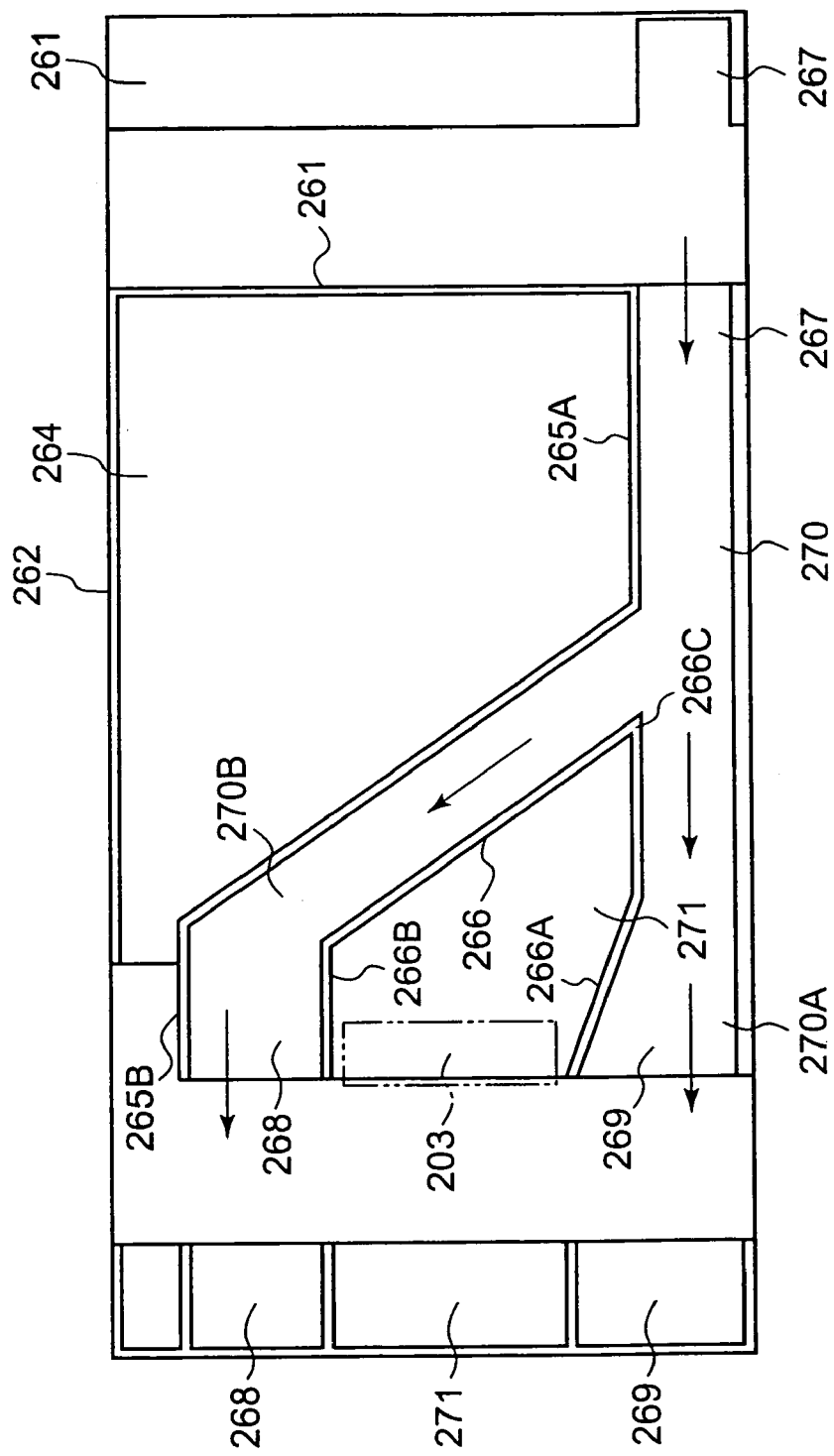
FIG. 36 is a partial unfolded view showing a case in which the dummy canister is set in the second shape.

FIG. 36 shows the front surface, side surface and back surface in a case where the dummy canister 22B is set in the second shape. The cooling air draft that flows into the duct part 270 from the inlet port 267 is divided and respectively flows through the lower flow passage 270A and upper flow passage 270B; these drafts then respectively flow out from the respective outlet ports 268 and 269. In the case of the second shape, the inlet port 267 is open, so that the inflow of the cooling air draft into the duct part 270 is permitted. However, since the connector 203 is accommodated inside a space 271 with a relatively high inflow resistance, the cooling air draft does not flow extensively into the space 271.

Figure 37:
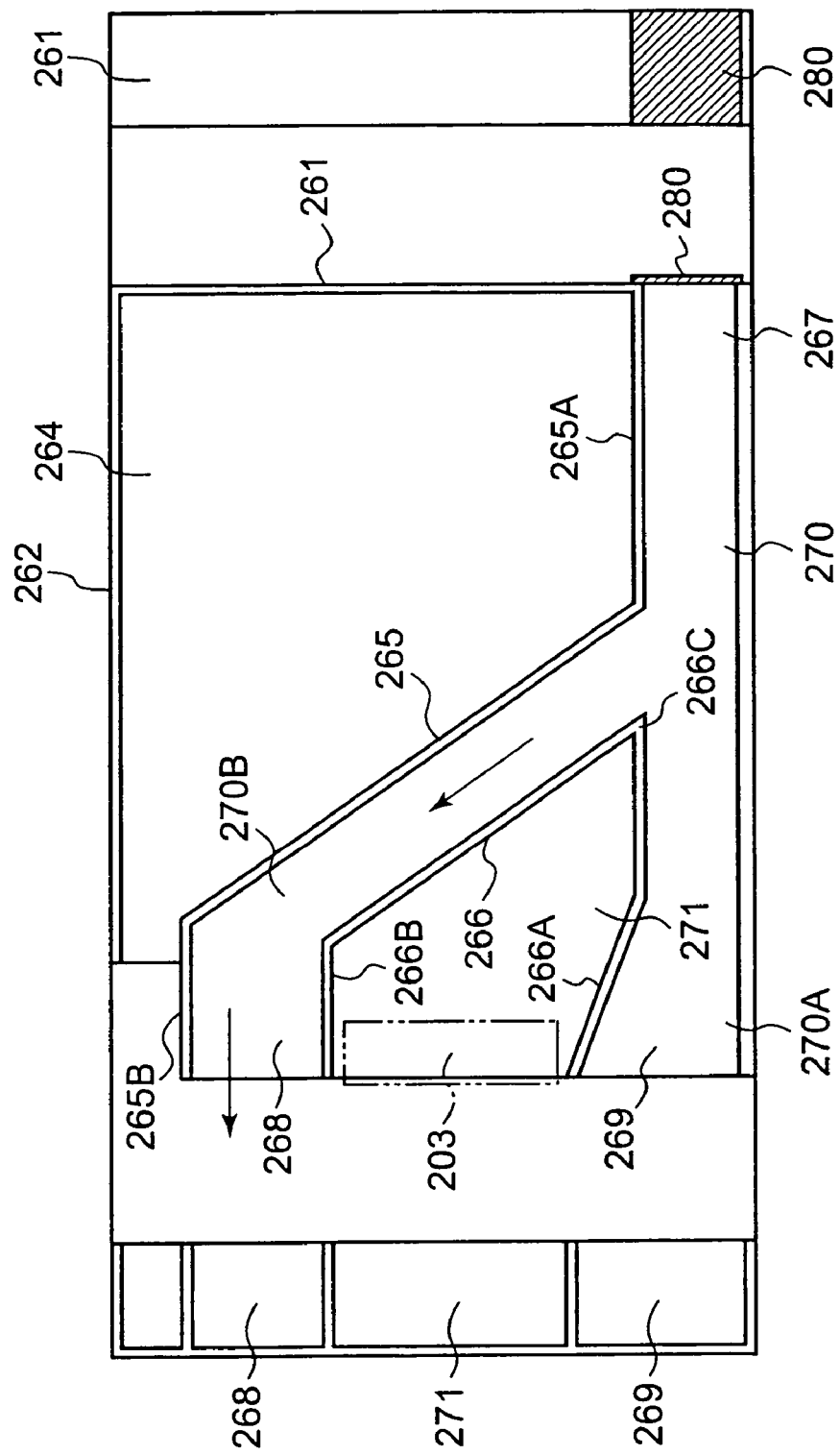
FIG. 37 is a partial unfolded view showing a case in which the dummy canister is set in the first shape.

FIG. 37 shows the front surface, side surface and back surface in a cases where the dummy canister 22B is set in the first shape. In a case where the dummy canister 22B is set in the first shape, the inlet port 267 is closed off by a covering part 280. For example, the covering part 280 can be constructed as a detachable sealing member. Alternatively, the covering member 280 can be constructed as a shutter structure that opens and closes above and below.

Figure 38:
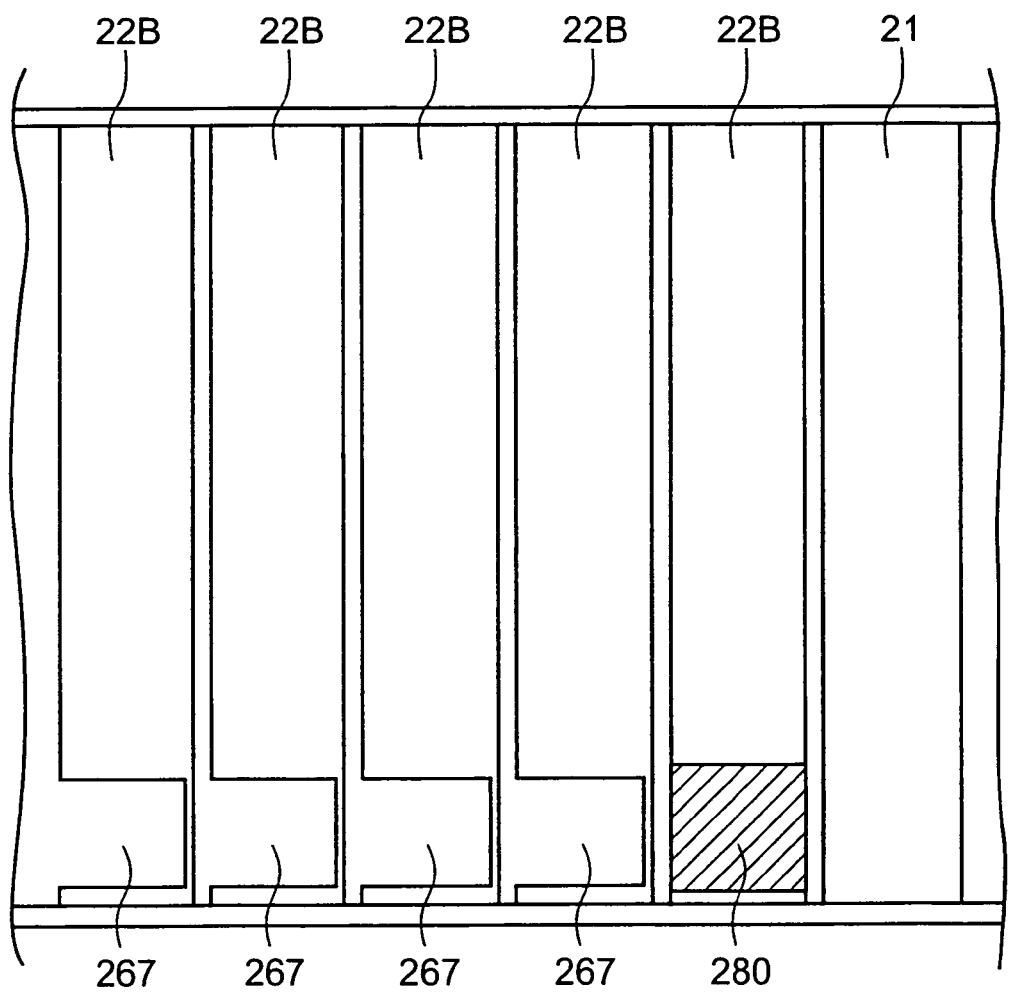
FIG. 38 is a front view showing an enlargement of the chassis.

FIG. 38 is a front view which shows an enlarged view of a state in which dummy canisters 22B and a canister 21 are attached to the chassis 200. The inlet port 267 of the dummy canister 22B that is adjacent to the canister 21 is covered by a covering member 280, and is set in the first shape. Accordingly, the cooling air draft is conducted into the gap between the dummy canister 22B and the canister 21.

On the other hand, the inlet ports 267 of the respective dummy canisters 22B that are not adjacent to the canister 21 are respectively open. Accordingly, the cooling air draft respectively flows into duct parts 270 that have a low inflow resistance. However, since the connectors 203 are accommodated inside spaces 271 in which one surface is open, the amount of the cooling air draft that contacts the connector 203 is small. Accordingly, the adhesion of dust to the connectors 203 can be suppressed.

6. Sixth Embodiment

Figure 39:
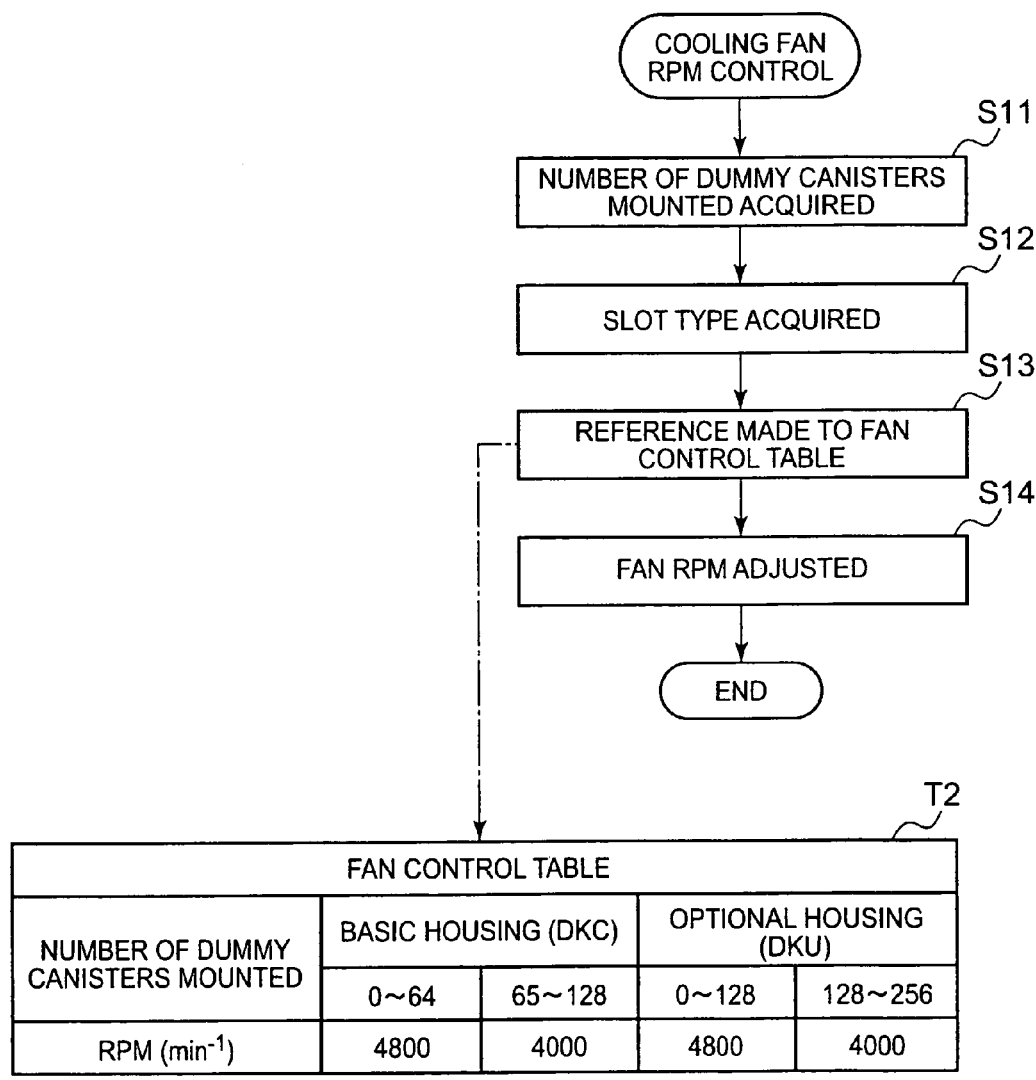
FIG. 39 is a flow chart showing the cooling fan rpm control processing in the sixth embodiment.

A sixth embodiment will be described with reference to FIG. 39. In this embodiment, the output of the cooling fan 13 (and/or the cooling fan 12) is controlled in accordance with the number of dummy canisters 22 that are mounted. FIG. 39 8s a flow chart which shows an outline of the processing that is performed in order to control the rpm of the cooling fan. For example, this processing can be performed by control circuits or the like in the SVP 160 and power supply part 140. Furthermore, this processing may also be performed by a control function outside the power supply part 140.

Here, it will be assumed that the processing is performed with the SVP 160 as the center. The SVP 160 acquires the number of dummy canisters 22 that are mounted (S11). Furthermore, the SVP 160 acquires the type slot used (S12). The "slot type" is information indicating whether the location where the dummy canister 22 is mounted is a basic housing (DKC) or an OPTIONAL HOUSING (DKU).

When the number of dummy canisters 22 mounted and the slot type (mounting location) are respectively acquired, the SVP 160 refers to a fan control table T2 (S13). For example, this fan control table T2 is stored in the shared memory 140. In the fan control table T2, respective target rpm values are set for cases where the number mounted is small (0 to 64 units) and cases where the number mounted is large (65 to 128 units) for each slot type. Furthermore, the present invention is not limited to the two stages shown in the figures; a construction in which the target rpm is controlled even more finely may also be used.

When the SVP 160 acquires the target rpm from the fan control table T2 (S13), the SVP 160 adjusts the voltage of the cooling fan 13 so that this target rpm is realized (S14).

Thus, in the present embodiment, since the fan capacity of the cooling fan 13 can be adjusted according to the number of dummy canisters 22 that are mounted, the power consumption of the cooling fan 13 can be lowered in connection with the effect of improving the cooling efficiency by means of the dummy canisters 22.

Furthermore, the present invention is not limited to the embodiments described above; a person skilled in the art may make various additions, alterations and the like within the scope of the present invention.

What is claimed is:

1. A storage device comprising:
    a storage part that is used to store data;
    a control part that respectively controls the exchange of data between said storage part and a higher device; and
    a cooling part that supplies a cooling air draft to at least said storage part;
    wherein said storage part comprises:
        a housing;
        one or a plurality of storage units that are respectively detachably attached to said housing, and that respectively provide storage regions; and
        one or a plurality of dummy units that are detachably attached to empty locations in said housing;
    said dummy units are constructed so that said dummy units are deformable into at least a first shape or a second shape; and
    in cases where said dummy units are attached adjacent to said storage units, said dummy units are set in said first shape, while in cases where said dummy units are attached without being adjacent to said storage units, said dummy units are set in said second shape.

2. The storage device according to claim 1, wherein said first shape is set so as to have a smaller volume than said second shape.

3. The storage device according to claim 1, wherein said first shape is set so that there is a relative increase in the amount of the cooling air draft that flows around said dummy units, and said second shape is set so that there is a relative decrease in the amount of the cooling air draft that flows around said dummy units.

4. The storage device according to claim 3, wherein said housing comprises a tubular chassis, and a board which is disposed so as to cover one open surface of said tubular chassis, and which has exhaust ports signal connectors that are formed respectively corresponding to each of said storage units;
    said dummy units have duct parts used to allow said cooling air draft to flow through, the outlet ports of said duct parts are connected to said exhaust ports, and the inlet ports of said duct parts open at the open surface of said housing; and
    said inlet ports are covered when the shape is set as said first shape, and said inlet ports are opened when the shape is set as said second shape.

5. The storage device according to claim 1, wherein said housing comprises a tubular chassis, and a board which is disposed so as to cover one open surface of said chassis, and which has exhaust ports that are formed respectively corresponding to each of said storage units, and said first shape and said second shape are respectively set so that the distance between said dummy units and said board is longer than the distance between said storage units and said board.

6. The storage device according to claim 1, wherein said dummy units are constructed so that said dummy units can expand and contract in the direction of attachment to said housing, and said first shape is set so that the length dimension in said direction of attachment is shorter than that of said second shape.

7. The storage device according to claim 1, wherein said dummy units are constructed so that said dummy units can expand and contract in the direction of disposition inside said housing, and said first shape is set so that the width dimension in said direction of disposition is shorter than that of said second shape.

8. The storage device according to claim 1, wherein at least two surfaces among the respective surfaces of said dummy units are covered by said housing.

9. The storage device according to claim 1, wherein said dummy units each comprises an indicator indicative of said each dummy unit being in said first shape or said second shape, said indicator being visually perceived from a location external to said storage device.

10. The storage device according to claim 1, further comprising:
    a monitoring part which monitors whether or not the number of said storage units has been increased or decreased in said storage parts; and
    a display part which displays a specified message according to the monitoring results of said_monitoring part;
    wherein said display part is devised so that in cases where addition of said storage units is detected by said monitoring part, said_display part displays a specified addition message relating to said dummy units that are adjacent to storage units that were added, and so that in cases where removal of said storage units is detected by said monitoring part, said display part displays a specified reduction message relating to said dummy units that are attached in place of storage units that were removed.

11. The storage device according to claim 1, which further comprises a cooling control part that controls the operating state of said cooling part in accordance with the number of said dummy units that are attached to said storage part.

12. A storage device storage part that is used to attach a storage unit, comprising:

a housing;

one or a plurality of storage units which are respectively detachably attached to said housing, and which respectively provide storage regions; and one or a plurality of dummy units which are detachably attached in empty locations of said housing;

wherein said dummy units are deformable into at least a first shape or a second shape; and said dummy units are set in said first shape in cases where said dummy units are attached adjacent to said storage units, and said dummy units are set in said second shape in cases where said dummy units are attached without being adjacent to said storage units.

13. The storage device storage part according to claim 12, wherein said first shape is set so that there is a relative increase in the amount of the cooling air draft that flows around said dummy units, and said second shape is set so that there is a relative decrease in the amount of the cooling air draft that flows around said dummy units.

14. The storage device storage part according to claim 12, wherein said housing comprises a tubular chassis, and a board which is disposed so as to cover one open surface of said tubular chassis, and which has exhaust ports that are formed respectively corresponding to each of said storage units, and said first shape and said second shape are respectively set so that the distance between said dummy units and said board is longer than the distance between said storage units and said board.

15. The storage device storage part according to claim 12, wherein said dummy units are constructed so that said dummy units can expand and contract in the direction of attachment to said housing, and said first shape is set so that the length dimension in said direction of attachment is shorter than that of said second shape.

16. The storage device storage part according to claim 12, wherein said dummy units are constructed so that said dummy units can expand and contract in the direction of disposition inside said housing, and said first shape is set so that the width dimension in said direction of disposition is shorter than that of said second shape.

17. The storage device storage part according to claim 12, wherein said housing comprises a tubular chassis, and a board which is disposed so as to cover one open surface of said tubular chassis, and which has exhaust ports and signal connectors that are formed respectively corresponding to each of said storage units;

said dummy units have duct parts used to allow said cooling air draft to flow through, the outlet ports of these-said_duct parts are connected to said exhaust ports, and the inlet ports of said duct parts open at the open surface of said housing; and said inlet ports are covered when the shape is set as said first shape, and said inlet ports are opened when the shape is set as said second shape.

18. A dummy unit which is disposed adjacent to storage units that provide storage regions, wherein said dummy unit is deformable into at least a first shape or a second shape, and said dummy unit is set in said first shape in cases where said dummy unit is disposed adjacent to said storage unit and is set in said second shape in cases where said dummy unit is disposed without being adjacent to said storage unit, wherein said dummy unit is constructed from a first split body and a second split body that can be split along an attachment direction perpendicular to direction of deformation, so that said dummy unit can expand and contract in said attachment direction, and said first shape is set so that the length dimension of said first shape in said attachment direction is shorter than that of said second shape.

19. A dummy unit which is disposed adjacent to storage units that provide storage regions, wherein said dummy unit is deformable into at least a first share or a second shape, and said dummy unit is set in said first shape in cases where said dummy unit is disposed adjacent to said storage unit and is set in said second shape in cases where said dummy unit is disposed without being adjacent to said storage unit, wherein said dummy unit is constructed from a third split body and a fourth split body that can be split along a direction of deformation, so that said dummy unit can expand and contract in said direction of deformation, and said first shape is set so that the width dimension of said first shape in said direction of deformation is shorter than that of said second shape.

* * * * *